(12) United States Patent
Imai et al.

(10) Patent No.: US 6,371,925 B1
(45) Date of Patent: Apr. 16, 2002

(54) RADIATION CLINICAL THERMOMETER

(75) Inventors: Hirohisa Imai, Nara; Kazunari Nisii; Kiyoshi Kanazawa, both of Osaka; Makoto Shibuya; Miki Moriguchi, both of Nara; Naohumi Nakatani, Osaka; Hirohumi Inui, Osaka; Kazuko Awaya, Osaka; Kanzi Nisii, Osaka; Kazumasa Takada, Osaka; Motomiti Kato, Nara; Hirosi Kobayasi, Nara; Kozi Yosimoto, Nara; Masanori Nisikawa, Nara, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/269,530

(22) PCT Filed: Jul. 27, 1998

(86) PCT No.: PCT/JP98/03333

§ 371 Date: May 27, 1999

§ 102(e) Date: May 27, 1999

(87) PCT Pub. No.: WO99/05489

PCT Pub. Date: Feb. 4, 1999

(30) Foreign Application Priority Data

| Jul. 28, 1997 | (JP) | 9-201095 |
| Nov. 6, 1997 | (JP) | 9-304194 |
| Jan. 9, 1998 | (JP) | 10-003000 |
| Jan. 9, 1998 | (JP) | 10-003003 |

(51) Int. Cl.⁷ .............................. A61B 5/00; A61B 6/00
(52) U.S. Cl. ........................................ 600/549; 600/474
(58) Field of Search ................................. 600/474, 549; 374/100, 121, 130

(56) References Cited

U.S. PATENT DOCUMENTS 5,017,018 A * 5/1991 Iuchi et al. ............... 374/130

(List continued on next page.)

FOREIGN PATENT DOCUMENTS

JP        56-33517        4/1981

(List continued on next page.)

OTHER PUBLICATIONS

Japanese language search report for Int'l Appln. No. PCT/JP98/03333 dated Oct. 27, 1998.

English translation of Form PCT/ISA/210.

*Primary Examiner*—Robert L. Nasser
*Assistant Examiner*—Charles Marmor, II
(74) *Attorney, Agent, or Firm*—Ratner & Prestia, PC

(57) ABSTRACT

A radiation thermometer measures temperature of the eardrum. The thermometer comprises a signal processor for calculating a temperature from an output of a light receptor, which receives only the infrared rays radiated directly from the eardrum and/or vicinity of it, and a notification system for notifying the temperature resulted from the calculation. Since the structure does not receive an influence of any radiant heats from other than those of the eardrum and/or vicinity of it, temperature change of a probe does not become a factor of measuring errors, so as to offer an accurate measurement of temperatures. An infrared-receiving element is positioned within a triangle configured by an intersection between a light path and an optical axis, and two image points of hypothetical end points formed by an optical condenser, when viewed in a cross sectional plane including the optical axis of the optical condenser, where (a) the light path is a path that extends from the hypothetical end point to the image point of the hypothetical end point formed by the optical condenser by passing through a rim of the optical condenser on the same side as the hypothetical end point with respect to the optical axis, and (b) the hypothetical end point is a point at which a straight line drawn from the rim of the optical condenser toward the probe in a manner to be tangent to an inner surface of the probe on the same side as the rim of the optical condenser with respect to the optical axis crosses a plane at a tip of the probe.

30 Claims, 30 Drawing Sheets

U.S. PATENT DOCUMENTS

| | | | | |
|---|---|---|---|---|
| 5,024,533 A | * | 6/1991 | Egawa et al. | 374/126 |
| RE34,507 E | * | 1/1994 | Egawa et al. | 374/126 |
| 5,293,877 A | * | 3/1994 | O'Hara et al. | 600/549 |
| RE34,789 E | * | 11/1994 | Fraden | 364/557 |
| 5,445,158 A | * | 8/1995 | Pompei | 600/474 |
| 5,991,652 A | * | 11/1999 | Barthelemy et al. | 600/474 |

FOREIGN PATENT DOCUMENTS

| | | |
|---|---|---|
| JP | 63-157626 | 10/1988 |
| JP | 1-18973 | 6/1989 |
| JP | 2-110836 | 9/1990 |
| JP | 4-7515 | 1/1992 |
| JP | 5-45229 | 2/1993 |
| JP | 5-503440 | 6/1993 |
| JP | 5-277079 | 10/1993 |
| JP | 5-346347 | 12/1993 |
| JP | 6-165 | 1/1994 |
| JP | 6-94538 | 4/1994 |
| JP | 6-142061 | 5/1994 |
| JP | 6-53939 | 7/1994 |
| JP | 7-155296 | 6/1995 |
| JP | 7-253358 | 10/1995 |
| JP | 7-280652 | 10/1995 |
| JP | 7-318432 | 12/1995 |
| JP | 8-54281 | 2/1996 |
| JP | 8-126615 | 5/1996 |
| JP | 8-275925 | 10/1996 |
| JP | 8-292093 | 11/1996 |
| JP | 8-313342 | 11/1996 |

* cited by examiner

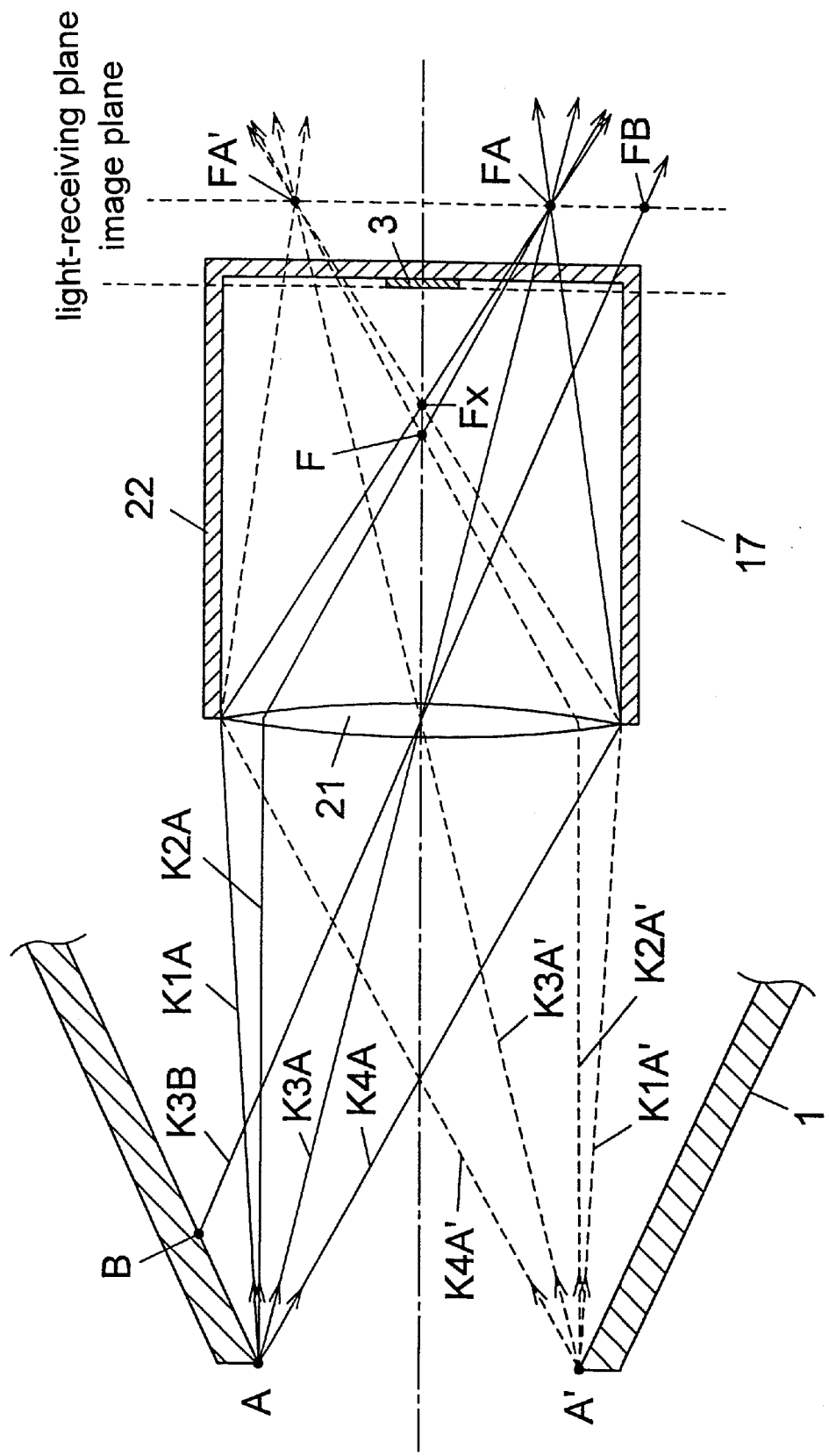

RADIATION CLINICAL THERMOMETER

FIELD OF THE INVENTION

The present invention relates to a radiation thermometer for measuring body temperature of a living body by detecting an amount of the infrared rays radiated from inside of an ear canal.

BACKGROUND OF THE INVENTION

Radiation thermometers for use as the clinical thermometers have been heretofore available, with which an amount of the infrared rays radiated from inside of an ear canal is detected at noncontact, and converted into body temperature. An advantage of these radiation thermometers is that they can take the measurement in a short period of time as compared to the contact type thermometers utilizing mercury and thermocouples.

As an ordinary example, the radiation thermometer of this type shown in Japanese Patent Laid-Open Publication, No. H06-165 will be described hereinafter by referring to FIG. 27. As shown in FIG. 27, the radiation thermometer comprises a probe 1, a waveguide 2 extending within the probe 1 in a longitudinal direction, an infrared-ray-receiving element 3 for converting a radiant intensity of the infrared rays traveled through the waveguide 2 into an electric signal, and a signal processor 4 for measuring temperature from the converted electric signal.

By inserting the probe 1 into an external auditory canal ("ear canal"), the infrared-ray-receiving element 3 receives the infrared rays radiated from the tympanic membrane ("eardrum") and/or vicinity of it, and outputs an electric signal corresponding to an amount of the received infrared rays. Then, the signal processor 4 calculates a temperature of the eardrum and/or its vicinity from the electric signal.

Generally, the infrared-ray-receiving element 3 outputs an electric signal that corresponds to an aggregate amount of the infrared rays incident on it from all directions, and the waveguide 2 is made of a metal or processed with plating or the like on its at least inner surface so as to maintain a high reflectivity. The infrared rays radiated from the eardrum and/or vicinity of it reach the infrared-ray-receiving element 3 directly or by being reflected repetitively off the inner surface of the waveguide 2 of the foregoing structure. On the other hand, undesired infrared rays radiated from an inner surface, etc. of the probe 1 do not reach the infrared-ray-receiving element 3.

However, the incident rays reflected repetitively suffer a reflection loss equal to the reflection factor raised to the n-th power, since it is unfeasible to make the inner surface of the waveguide 2 a perfect reflecting body (the reflection factor of 1). Also, the light reflected at a low angle for a single reflection generally gains a lower reflectivity than the perpendicular light, thus resulting in a reflection loss. Since an amount corresponding to these reflection losses enters into the infrared-ray-receiving element 3 as a part of the infrared radiation emitted from the waveguide 2, an accurate measurement of the body temperature can not be attained because the infrared-ray-receiving element 3 is influenced by it, if temperature of the waveguide 2 changes when the probe 1 is inserted into the ear canal.

In order to avoid the above problem, the foregoing example of the prior art alleviates the temperature changes of the waveguide 2 by tapering off to a tip from a main base of the probe 1 so as to reduce likeliness of contact with the ear canal. Also, an example shown in Japanese Patent Laid-Open Publication, No. H05-45229, adopts a design in that a probe is constructed of a thermal insulation material on its surface, and of a thermally high conductive material in the core, so that it averts an influence of heat from the ear canal, and offsets the influence by quickly transmitting the heat it receives to an infrared-ray-receiving element. Furthermore, still another example shown in Japanese Patent Laid-Open Publication, No. H08-126615 adopts an idea that a probe is detachable, so as to eliminate an influence of heat retained in the probe by replacing it after each measurement.

However, none of the foregoing techniques are flawless for accurately measuring temperature of the eardrum and/or vicinity of it by eliminating an influence of the heat conducted from the ear canal to the waveguide, and they all have a problem of lacking accuracy in measuring body temperature due to the influence of temperature changes of the waveguide. In particular, there is a problem that measured temperature gradually shifts even for one and the same measuring subject, when the measurements are made repeatedly at short intervals, because of an influence of the waveguide as its temperature gradually changes.

If a thermally high conductive material is used for the waveguide in order to avert the effect of measuring errors caused by the aforementioned problem, a new problem arises in that the waveguide becomes liable to produce condensation on the inner surface at low temperature environment. This is because temperature of the metal surface does not rise readily at the low temperature environment, even when it comes in contact with air near a body temperature by being inserted into the ear canal. Hence, the condensation occurs on the metal surface, as the air containing moisture is chilled by the metal in a temperature below dew point. If a phenomenon of the condensation occurs on a component such as the waveguide having a function of reflecting the infrared rays, a measuring error can result because the infrared rays reaching the infrared-ray-receiving element is substantially reduced due to absorption and dispersion of the infrared rays by the condensation.

It is a common practice to use a sanitary cover on the probe when inserting a radiation thermometer into the ear canal, and the cover is discarded when removed after each use for the sake of sanitary protection, in the case the radiation thermometer is used for many and unspecified persons. Such a sanitary cover shall conceal a part contacting the tip of the probe with a membrane. This is because a tip of the waveguide extends to the tip of the probe, so that the tip shall be provided with the membrane in order to prevent dirt from adhering to the waveguide.

On the one hand, the sanitary cover is not necessary, and waste of resources by discarding them is avoidable, if subjects to be measured are limited to a few and specific persons such as those in a family or in an office of a small number of people, since spread of disease via the ear can be prevented by assigning a separate probe for each person. Even in the above case, however, the tip of the probe needs to be covered with a membrane made of an infrared transparent material in order to avoid dirt from adhering to the waveguide.

In any case, what is measured is an amount of the infrared rays passed through the membrane provided on the tip of the probe for the purpose of sanitation. It is not feasible to let the infrared rays pass through completely, since there is a component in the infrared rays that is absorbed and/or reflected when they pass through the membrane. Because a transmission factor of the infrared rays through the membrane disperses depending on thickness, etc. of the membrane, it raises a problem of causing an error in temperature due to the dispersion in the transmission factor when a new membrane is replaced, even if the thermometer is adjusted in advance with a specific membrane.

Announcing a measured temperature with voice can provide a good advantage, as the measured result is readily known when the thermometer is used by a blind person, or when measured in the dark. For example, one of the known methods is shown in Japanese Patent Laid-Open Publication, No. H06-142061.

However, it takes 2 to 3 seconds in order to announce the temperature vocally, while only 0.1 to 0.2 second suffices to notify a completion of the measurement with a beeping sound. In other words, temperature of the waveguide changes due to conduction of heat from the ear while the probe is kept inserted in the ear until the announcement ends, if a radiation thermometer of the foregoing structure makes an audible announcement. If the measurements are made repeatedly, it results in a problem that the temperature change of the waveguide during the announcing time causes a measuring error in the subsequent measurement, although it is not a problem if only one measurement is made.

On the other hand, if an infrared-ray-receiving element of a pyroelectric type is used, there arises a problem as follows. In general, two types of the infrared-ray-receiving element are commonly available, i.e. the pyroelectric type, whose output has a correlation to temperature change of the subject being measured, and a radiation thermopile type, which has a correlation with a temperature difference between the element itself and the subject. If an infrared-ray-receiving element of the pyroelectric type is used for measuring temperature of an object, such as the eardrum that has a steady temperature and constantly emits an invariant amount of the infrared rays, as a subject to be measured, it is necessary to forcibly change the infrared rays incident on it. A chopper is provided for this purpose in order to switch the infrared rays incident upon the infrared-ray-receiving element of the pyroelectric type between a light-admitting mode and a light-blocking mode. The chopper is constructed of a material that does not pass the infrared rays, such as a metal plate for example. As one of the methods, one end of the chopper is attached to a rotary shaft of a D.C. motor or an A.C. motor, and it is rotatory driven, so as to repeatedly interrupt the infrared rays through the infrared-ray-receiving element, between the light-admitting mode and the light-blocking mode. That is, the infrared rays incident upon the infrared-ray-receiving element 3 is interrupted by rotatory driving the chopper 5 of a semicircular shape attached to a rotary shaft of the D.C. or A.C. motor 6 in a direction of an arrow as shown in FIG. 28.

There is also another method for interrupting the infrared rays by repeating a forward and a reverse rotations within a predetermined angle with a pulse motor as a rotational driving source, as it is supplied with pulse waves at predetermined intervals. Referring to FIG. 29, one example of a temperature measuring apparatus shown in Japanese Patent Laid-Open Publication, No. H07-280652 is described hereinafter. A chopper 5 is driven for reciprocal motion by a crystal clock movement 7, which is a driving source operated in the same principle as the pulse motor, and interrupts the infrared rays through an infrared-ray-receiving element 3. The crystal clock movement 7 includes a permanent magnet 8, a core 9 and a coil 10, and the permanent magnet 8 connects to one end of the chopper 5. The coil 10 receives a pulse input through a first input terminal 11 and a second input terminal 12, and the permanent magnet 8 rotates in response to the pulse input, which in turn moves the chopper 5 reciprocally as shown by an arrow.

However, the foregoing example of the prior art for rotating the chopper by a driving source of the D.C. motor has a problem of low accuracy in the measured temperature due to dispersion of the light-admitting time and the light-blocking time. The D.C. motor normally varies its rotational speed due to fluctuation of the supply voltage etc. If the rotational speed varies, the light-admitting and the light-blocking intervals change, and this change of the intervals causes an output of the infrared-ray-receiving element 3 to vary, thereby preventing an accurate measurement. In order to stabilize the rotational speed, it requires a complicated control circuit that performs a feedback control by providing means for detecting number of revolutions such as a photo interrupter, and means for regulating the supply voltage.

In the case of adopting an A.C. motor for the driving source, it is easier to stabilize the rotational speed than a D.C. motor under the condition of relatively steady frequency as with the commercial power supply. However, it also raises a problem of necessitating an A.C. power supply such as the commercial power supply. Since a portable radiation thermometer operated by a battery source has only a D.C. power supply, it needs a complicated circuit for generating an A.C. power supply having a steady frequency, which is difficult to realize.

In the case of adopting a crystal clock movement or a pulse motor for the driving source, it is able to switch the light-admitting mode and the light-blocking mode at highly accurate intervals, since they are driven on the basis of digital signals from a microprocessor, etc. There is still a problem, however, that it is difficult to accurately switch between the light-admitting position and the light-blocking position, because the chopper stops while staggering. In other words, since these driving sources stop in an equilibration between an attractive force and a repulsive force of the magnets, and drive by changing polarities of the magnetic force, they have a characteristic of coming to rest by taking a balance between the attractive force and the repulsive force while the chopper is staggering at a moment of stopping.

FIGS. 30A and 30B show a characteristic of a motion of the pulse motor with an elapsed time in the horizontal axis. FIG. 30A depicts driving pulses of CW (clockwise direction) and CCW (counterclockwise direction), which are output alternatively at a predetermined interval of "t" with a duty factor of 50%. FIG. 30B depicts rotational angle of a rotary shaft of the pulse motor. As shown, the rotary shaft overshoots at a point of reaching the stop position, undershoots thereafter, and comes to rest at the stop position while gradually decreasing its amplitude.

Since the pulse motor and the crystal clock movement generally have the moving characteristic as shown in FIGS. 30A and 30B, they pose a problem of lacking measuring accuracy, if they are used as a driving source of the chopper for interrupting the infrared rays in a radiation thermometer. This is because they produce a condition of switching the infrared rays between a light-admitting mode and a light-blocking mode in very short intervals at a moment when the chopper moves from the light-admitting position to the light-blocking position, or from the light-blocking position to the light-admitting position, which causes an output of the infrared-ray-receiving element unstable. Although this problem can be alleviated by way of adopting a chopper having a size large enough for a maximum angle $\Delta\theta$ of the staggering, it raises another problem of causing the body of the radiation thermometer to be bulkier in size.

SUMMARY OF THE INVENTION

A radiation thermometer of the present invention comprises (1) a light receptor for receiving only the infrared rays radiated directly from the eardrum and/or vicinity of it, (2) a signal processor for calculating a temperature from an output of the light receptor, and (3) notification means for notifying an output of the signal processor.

Since the thermometer calculates with the signal processor a temperature from the output of the light receptor, which receives only the infrared rays radiated directly from the eardrum and/or vicinity of it, and notifies the output with the notification means, it is able to detect the eardrum temperature accurately without getting an influence of other radiant heats than those of the eardrum and/or vicinity of it.

Also, a radiation thermometer comprises (1) a probe to be inserted into the ear canal for allowing the infrared rays radiated from the eardrum and/or vicinity of it to pass through, (2) a light receptor for receiving the infrared rays passed through the probe, (3) a signal processor for calculating a temperature from an output of the light receptor, and (4) notification means for notifying an output of the signal processor. The light receptor comprises at least an optical condenser for condensing the infrared rays passed through the probe, and an infrared-ray-receiving element positioned in a manner to receive only the infrared rays radiated from the eardrum and/or vicinity of it upon meeting the infrared rays condensed by the optical condenser.

The light receptor then receives only the infrared rays radiated from the eardrum and/or vicinity of it and passes through the probe. The signal processor converts the output of the light receptor into a temperature, and the notification means notifies the temperature resulted by the calculation. Since the infrared rays condensed by the optical condenser enters into the infrared-ray-receiving element in the light receptor, and the infrared-ray-receiving element is positioned in a manner to receive only the infrared rays radiated directly from the eardrum and/or vicinity of it upon meeting the infrared rays condensed by the optical condenser, it is able to concentratively detect only the light radiated from the eardrum and/or vicinity of it and passes through the probe, thereby resulting in an accurate temperature measurement.

The radiation thermometer is also constructed in manner that the infrared-ray-receiving element is positioned away in the rearward from a focal point of the optical condenser, so as to limit a light-receiving region. This enables the infrared-ray-receiving element to concentratively receive only the infrared rays radiated from the eardrum and/or vicinity of it and passes through the probe, and to limit the light-receiving region by directing the infrared rays radiated from an inner surface of the probe toward the outside of the infrared-ray-receiving element.

Also, the radiation thermometer comprises a main body for storing the light receptor, and a probe having a hollow interior, which is connected to the main body detachably. The light receptor stored in the main body receives only the infrared rays radiated from the eardrum and/or vicinity of it and passes through the probe. Since the probe with the hollow interior does not contain a waveguide, and is detachably connected to the main body, the thermometer does not lose accuracy in measured temperature due to temperature change of the waveguide. The thermometer does not pose a sanitary problem because the probe is replaceable, and it is easy to store since there is no protruding part when the probe is removed.

Further, the probe is provided with an opening at the tip so as to improve accuracy in measured temperature, since there is avoidance of temperature deviations due to dispersion of infrared transmittancy as in the case of using a cover overlaying the probe tip.

Moreover, the main body is provided with a storage space for storing the probe when the thermometer is not in use. Since the probe is stored in the storage space while not in use, the main body can be in a shape that is easy to store, and there is less likeliness of losing the removed probe.

There is a plurality of probes differently formed in a manner that individual probe is visually distinguishable. Since the visually distinguishable plurality of probes is provided, each probe can be specifically assigned to an individual user, and the problem of spread of disease via the ear can be prevented by replacing them.

Furthermore, the thermometer has a structure in which the notification means comprises a vocal announcing device for notifying a temperature result from calculation by the signal processor. The thermometer can measure accurate body temperature irrespective of the length of time while it is inserted in the ear.

The light receptor is equipped with a light-proof body for shielding the infrared rays entering into the infrared-ray-receiving element from an outside of the optical condenser, and a reflection suppressing means at the infrared-ray-receiving element side of the light-proof body. This structure prevents the infrared rays traveling toward an area other than the infrared-ray-receiving element from entering into the infrared-ray-receiving element due to reflection. The structure thus restricts a light-receiving region, and concentrates the infrared rays emitted from any part other the eardrum and/or vicinity of it to the outside of the infrared-ray-receiving element, thereby attaining an accurate measurement of the body temperature without being influenced by temperature change of the probe.

A synthetic resin is used for material of the light-proof body. The light-proof body made of the synthetic resin can suppress reflection, since it is well known that synthetic resin generally has a high value of emissivity in the neighborhood of 0.9. Also condensation is not likely to occur on a surface of the light-proof body, since synthetic resin has a low thermal conductivity and a small thermal capacity. Accordingly, the thermometer can measure accurate body temperature without causing reflection and scattering of the infrared rays due to condensation.

Since the optical condenser is composed of a material having a low thermal conductivity and a small thermal capacity, a waveguide for shielding the infrared rays from the probe is not necessary, and the optical system including the optical condenser need not have a high thermal conductivity. Because the optical condenser is composed of a material having a low thermal conductivity and small thermal capacity, condensation is not likely to occur on a surface of the optical condenser, so that the thermometer is able to measure accurate body temperature.

A synthetic resin is used for material of the optical condenser. Since synthetic resin generally has a low thermal conductivity and a small thermal capacity, as it is well known, it can reduce condensation on the surface of the optical condenser.

Also, a thermometer has a structure that an infrared-ray-receiving element is positioned in a region that is farther away from an optical condenser than an intersection between a light path and the optical axis, but nearer to the optical condenser than an image point of a hypothetical end point formed by the optical condenser, when viewed in a cross sectional plane including the optical axis of the optical condenser, where the light path is a path that extends from the hypothetical end point to the image point of the hypothetical end point formed by the optical condenser by passing through a rim of the optical condenser on the same side as the hypothetical end point with respect to the optical axis, and that the hypothetical end point is a point at which a straight line drawn from the rim of the optical condenser toward the probe in a manner to be tangent to an inner wall of the probe on the same side as the rim of the optical condenser with respect to the optical axis crosses a plane at a tip of the probe.

With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Further, a thermometer has a structure that an infrared-ray-receiving element is positioned within a triangle configured by an intersection between a light path and an optical axis, and two image points of a hypothetical end points formed by an optical condenser, when viewed in a cross sectional plane including the optical axis of the optical condenser, where the light path is a path that extends from the hypothetical end point to the image point of the hypothetical end point formed by the optical condenser by passing through a rim of the optical condenser on the same side as the hypothetical end point with respect to the optical axis, and that the hypothetical end point is a point at which a straight line drawn from the rim of the optical condenser toward the probe in a manner to be tangent to an inner surface of the probe on the same side as the rim of the optical condenser with respect to the optical axis crosses a plane at a tip of the probe.

By adopting this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Furthermore, a thermometer has a structure that an infrared-ray-receiving element is positioned farther away from an optical condenser than a focal point of the optical condenser by a distance of L3, which is derived from the formula below, when viewed in a cross sectional plane including the optical axis of the optical condenser.

$$\frac{f \times f}{L\alpha - f} - \frac{f}{L\alpha - f} \times \frac{L\alpha \times (r\alpha \cdot f - rs(L\alpha - f))}{r3 \times (L\alpha - f) + r\alpha \cdot f} < L3 \leq \frac{f \times f}{L\alpha - f}$$

where:
  f is a focal distance of the optical condenser;
  rs is a radius of the infrared-ray-receiving element;
  rα is a distance between a hypothetical end point and the optical axis, where the hypothetical end point is a point at which a straight line drawn from the rim of the optical condenser toward the probe in a manner to be tangent to an inner surface of the probe on the same side as the rim of the optical condenser with respect to the optical axis crosses a plane at a top of the probe;
  Lα is a distance between the hypothetical end point and the optical condenser; and
  r3 is a radius of the optical condenser.

With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Moreover, a thermometer has a structure that an infrared-ray-receiving element is positioned in a region that is farther away from an optical condenser than an image point of a hypothetical end point formed by the optical condenser, when viewed in a cross sectional plane including the optical axis of the optical condenser, where the hypothetical end point is a point at which a straight line drawn from the rim of the optical condenser toward the probe in a manner to be tangent to an inner surface of the probe on the same side as the rim of the optical condenser with respect to the optical axis crosses a plane of the probe tip. With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Also, a thermometer has a structure that an infrared-ray-receiving element is positioned in a region lying between two light paths that extend from hypothetical end points to image points of the hypothetical end points formed by an optical condenser by passing through rims of the optical condenser on the opposite side of the hypothetical end point with respect to the optical axis, when viewed in a cross sectional plane including the optical axis of the optical condenser, where the hypothetical end point is a point at which a straight line drawn from the rim of the optical condenser toward the probe in a manner to be tangent to an inner surface of the probe on the same side as the rim of the optical condenser with respect to the optical axis crosses a plane at a tip of the probe.

By adopting this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passed through the probe.

And further, a thermometer has a structure that an infrared-ray-receiving element is positioned farther away from an optical condenser than a focal point of the optical condenser by a distance of L3, which is derived from the formula below, when viewed in a cross sectional plane including the optical axis of the optical condenser.

$$\frac{f \times f}{L\alpha - f} \leq L3 < \frac{f \times f}{L\alpha - f} + \frac{f}{L\alpha - f} \times \frac{L\alpha \times (r\alpha \cdot f - rs(L\alpha - f))}{r3 \times (L\alpha - f) - r\alpha \cdot f}$$

where:
  f is a focal distance of the optical condenser;
  rs is a radius of the infrared-ray-receiving element;
  rα is a distance between a hypothetical end point and the optical axis, where the hypothetical end point is a point at which a straight line drawn from the rim of the optical condenser toward the probe in a manner to be tangent to an inner surface of the probe on the same side as the rim of the optical condenser with respect to the optical axis crosses a plane at a tip of the probe,;
  Lα is a distance between the hypothetical end point and the optical condenser; and
  r3 is a radius of the optical condenser.

With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

The optical condenser comprises a refractive lens, so that the infrared rays condensed by the refractive lens enter upon the infrared-ray-receiving element.

The optical condenser also comprises a condensing mirror, so that the infrared rays condensed by the condensing mirror enter upon the infrared-ray-receiving element.

The condensing mirror deflects a first optical axis incident upon the condensing mirror into a second optical axis exiting from the condensing mirror and entering into the infrared-ray-receiving element. Therefore, if the probe and the main body are formed to have a bent angle in consideration of handiness of the radiation thermometer, as it is used by inserting into the ear canal, the optical system can be bent also in the same angle. As a result, the thermometer becomes convenient to use, and it can provide an accurate measurement of the body temperature since a direction of insertion becomes consistent because it is easy to insert into the ear canal.

A radiation thermometer also comprises (1) an infrared-ray-receiving element for detecting the infrared rays radiated by a subject being measured, (2) a chopper for interrupting the infrared rays incident upon the infrared-ray-receiving element, (3) a D.C. motor for driving the chopper, (4) a stopper provided at a stopping position of the chopper, (5) a motor controller for controlling the D.C. motor, and (6) a signal processor for converting an output of the infrared-ray-receiving element into a temperature. The motor controller controls a light-admitting mode and a light-blocking mode for the infrared rays travelling through the infrared-ray-receiving element by alternately reversing a rotational direction of the D.C. motor.

The chopper driven by the D.C. motor stops at each of a light-admitting position and a light-blocking position in a path of the infrared rays from the subject being measured to the infrared-ray-receiving element by striking against the stopper provided at the stopping position. A light-admitting time and a light-blocking time are steadily controlled by way of driving the chopper, since the motor controller switches between the light-admitting mode and the light-blocking mode by alternately reversing the rotational direction of the D.C. motor, and the signal processor converts into a temperature of the subject being measured based on an output of the infrared-ray-receiving element. Also, the chopper can switch steadily between the light-admitting position and the light-blocking position even if it is substantially reduced in size, since it does not stagger at its stopping position, thereby attaining highly accurate measurement of the body temperature with the reduced size.

Further, the intervals for alternately reversing the rotational direction of the D.C. motor are set to be longer than a responding time constant of the infrared-ray-receiving element, so that the infrared-ray-receiving element produces a high output and improves an S/N ratio, resulting in improved measuring accuracy of the body temperature.

The motor controller supplies electric power to the D.C. motor based on a predetermined power supply pattern. The D.C. motor is thus controlled according to the predetermined power supply pattern, so as to switch the infrared rays between the light-admitting mode and the light-blocking mode with the chopper.

The power supply pattern comprises a positive power supply pattern for supplying the power in a direction of the light-admitting mode, and a negative power supply pattern for supplying the power in a direction opposite to the light-admitting mode, and it constitutes a positive/negative power supply pattern for alternately repeating the positive and the negative power supply patterns. With the alternate supplies of the positive power supply pattern and the negative power supply pattern, the D.C. motor is able to reverse the rotational direction alternately.

The positive/negative power supply pattern consists of an initial power supply period for supplying the power at the start, and a reduced power supply period for supplying a reduced power thereafter. An initial supply of the power moves the chopper to a position of the stopper, and subsequent supply of the reduced power keeps the chopper in that position, thereby reducing the power consumption.

Also, by adopting an intermittent supply of the power during the reduced power supply period, the power consumption can be reduced, and the circuit structure can be simplified.

By ceasing supply of the power during the reduced power supply period, the power consumption can be farther reduced.

Furthermore, the power is supplied momentarily at a very end of the reduced power supply period after a period of the ceased power. Since this pattern reverses the D.C. motor after restriking the chopper against the stopper, it reduces the power consumption with a simple circuit structure, and precisely maintains the light-admitting time and the light-blocking time of the infrared rays to the infrared-ray-receiving element, thereby enabling an accurate measurement of the body temperature.

The initial power supply period is set to be longer than the sum of a time required for the chopper to reach the stopper and a time required for the chopper to make a complete stop after bouncing back from the stopper. An initial power supply unit supplies the D.C. motor with the initial power during the initial power supply period, which is longer than the sum of the time required for the chopper to reach the stopper and the time required to make a complete stop after bouncing back from the stopper, and the reduced power thereafter, so that the chopper stops reliably at the stopper position, and stably switches between the light-admitting position and the light-blocking position, thereby improving the measuring accuracy of body temperature while also reducing the power consumption.

Since the stopper is composed of a shock absorbing material, it stabilizes the chopping by alleviating the chopper from cutting into it or bouncing back, thereby resulting in an improvement of the measuring accuracy of body temperature as well as a reduction of sound caused by the chopper striking the stopper.

Also, the stopper is composed of a soft rubber material, it stabilizes the chopping by alleviating the chopper from cutting into it or bouncing back, so as to improve the measuring accuracy of body temperature as well as a reduction of sound caused by the chopper striking the stopper.

A view restricting means is provided between the infrared-ray-receiving element and the chopper for limiting a field of view for the infrared-ray-receiving element, and the chopper is constructed in a size greater than the field of view for the infrared-ray-receiving element in the chopping position. The chopper can be reduced in size by limiting the field of view for the infrared-ray-receiving element. Since the chopper is constructed in a size greater than the field of view for the infrared-ray-receiving element in the light-blocking position, a difference in the output of the infrared-ray-receiving element between the light-admitting position and the light-blocking position becomes greater, so as to improve an accuracy in measuring the body temperature.

The view restricting means is composed of a material having low reflectivity on at least one surface facing toward the infrared-ray-receiving element in order to suppress reflection of the infrared rays from the view restricting means. This eliminates the infrared rays reflected off the view restricting means to enter into the infrared-ray-receiving element, and positively restricts the field of view for the infrared-ray-receiving element, so as to enable highly accurate measurement of the body temperature with a reduced size.

The stopper is provided in a position, in which a moving angle of the chopper from a rest position in the light-blocking mode to a next position where the light begins to be admitted becomes equal to a moving angle of the chopper from a rest position in the light-admitting mode to another position where the light begins to be blocked. The motor controller outputs signals at regular intervals for alternately reversing the rotational direction of the D.C. motor.

Accordingly, the light-admitting time and the light-blocking time for the infrared rays due to a motion of the chopper become equal, thereby obtaining a high output from the infrared-ray-receiving element, and highly accurate measurement of the body temperature.

The signal processor includes a Fourier transform device for calculating a signal component in a frequency equal to the frequency, with which the rotational direction of the D.C. motor is reversed alternately, from an output signal of the infrared-ray-receiving element by way of the discrete Fourier transform processing. A temperature of the subject being measured is converted according to an output of the Fourier transform device.

Accordingly, noise content other than the signal can be removed, and an accurate measurement of the body temperature can be taken, since the harmonics noise component of high degrees, which is not completely suppressible by the discrete Fourier transform processing, is scarcely generated because the light-admitting time and the light-blocking time are equal.

The motor controller comprises (1) a position aligning driver for aligning a position of the chopper by driving the D.C. motor, (2) a temperature detecting driver for measuring body temperature while switching a path of the infrared rays to the infrared-ray-receiving element between a light-admitting mode and a light-blocking mode by alternately reversing a rotational direction of the D.C. motor, and (3) a switching device for switching the position aligning driver and the temperature detecting driver. In this structure, the chopper is designed to stay in the same position at all times prior to a start of the measurements.

The position aligning driver aligns a position of the chopper by driving the D.C. motor and striking the chopper against the stopper. And, the temperature detecting driver switches between the light-admitting mode and the light-blocking mode for the path of the infrared rays through the infrared-ray-receiving element by striking and stopping the chopper against the stopper by reversing the rotational direction of the D.C. motor alternately. The switching device switches between the position aligning driver and the temperature detecting driver. Accordingly, the chopper is always maintained in the same position prior to a start of the measurements with the foregoing positional alignment of the chopper. This can stabilize the light-admitting time and the light-blocking time by a motion of the chopper during measurement of the body temperature, thereby attaining an accurate temperature measurement.

The thermometer is also provided with a signaling device for dispatching a temperature detection starting signal, and the motor controller has a clock for counting a lapse of time in which a temperature detection starting signal is not received from the signaling device. The switching device operates the temperature detecting driver when it receives a temperature detection starting signal before the clock completes counting of a predetermined time. And, the switching device operates the position aligning driver first, and the temperature detecting driver thereafter, if it receives a temperature detection starting signal after the clock has counted the predetermined time.

Accordingly, the clock counts a lapse of time in which it does not receive a temperature detection starting signal from the signaling device, and the switching device operates the temperature detecting driver to measure the body temperature if it receives the temperature detection starting signal before the clock completes counting of the predetermined time. The switching device operates the position aligning driver first to align a position of the chopper, and switches to the temperature detecting driver to measure the body temperature, if it receives the temperature detection starting signal after the clock has completed counting of the predetermined time. In the case of taking measurements of body temperature repeatedly in a short period of time in which positional shift of the chopper from the last stopping position during the measurement is considered not likely, the measurement can be repeated continuously without executing the positional alignment of the chopper, so as to accomplish highly accurate measurements within a short period of time. Also, even if the chopper has shifted its position while the thermometer has been put aside without being used for a long period of time, accurate measurements can still be accomplished at all the time, since the measurements of body temperature is made only after executing a positional alignment of the chopper when resuming the measurement.

The thermometer is provided with a signaling device for dispatching a temperature detection starting signal. The switching device operates the position aligning driver when the power supply is turned on to the motor controller, and also the temperature detecting driver when it receives a temperature detection starting signal from the signaling device.

The switching device executes a positional alignment of the chopper by operating the position aligning driver when the power supply to the motor controller is turned on, and measures the body temperature by operating the temperature detecting driver when it receives the temperature detection starting signal from the signaling device. Hence, the thermometer can accomplish highly accurate measurements efficiently within a short period of time, when taking measurements repeatedly in short intervals.

The thermometer is provided with a power supply controller for turning on and off of the power supply to the motor controller. Also the power supply controller has a clock for counting a lapse of time during which a temperature detection starting signal is not received from the signaling device, and it turns off the power supply when the clock completes counting of a predetermined time.

The clock counts a lapse of time in which it does not receive a temperature detection starting signal from the signaling device, and the power supply controller turns off the power supply to the motor controller when the clock completes counting of the predetermined time. This necessitates the power supply to the motor controller to be turned on again, if taking a measurement thereafter. Accordingly, the measurements of body temperature can be made continuously without executing a positional alignment of the chopper, if repeated measurements are made in short intervals until the clock completes counting of the predetermined time, so that highly accurate measurements are accomplished in a short period of time. Also, the power supply to the motor controller is turned off when the clock completes counting of the predetermined time. The power supply to the motor controller needs to be turned on, when taking a measurement of body temperature again, and this causes the switching device to operate the position aligning driver for executing a positional alignment of the chopper. Therefore, even if the chopper has shifted its position while the thermometer has been put aside without being used for a long period of time, accurate measurements can still be accomplished at the time, since the measurements of body temperature is made with a subsequent temperature detection starting signal. The structure also reduces the power consumption and improves convenience of use, since the power supply to the motor controller turns off automatically after a lapse of the predetermined time even when the power supply is unintentionally left on.

BRIEF DESCRIPTION OF THE DRAWINGS

FIG. 4 is a cross sectional view depicting a structure of a light receptor and a probe in accordance with the same exemplary embodiment;

THE BEST MODES FOR CARRYING OUT THE INVENTION

FIRST EXEMPLARY EMBODIMENT

Figure 1:
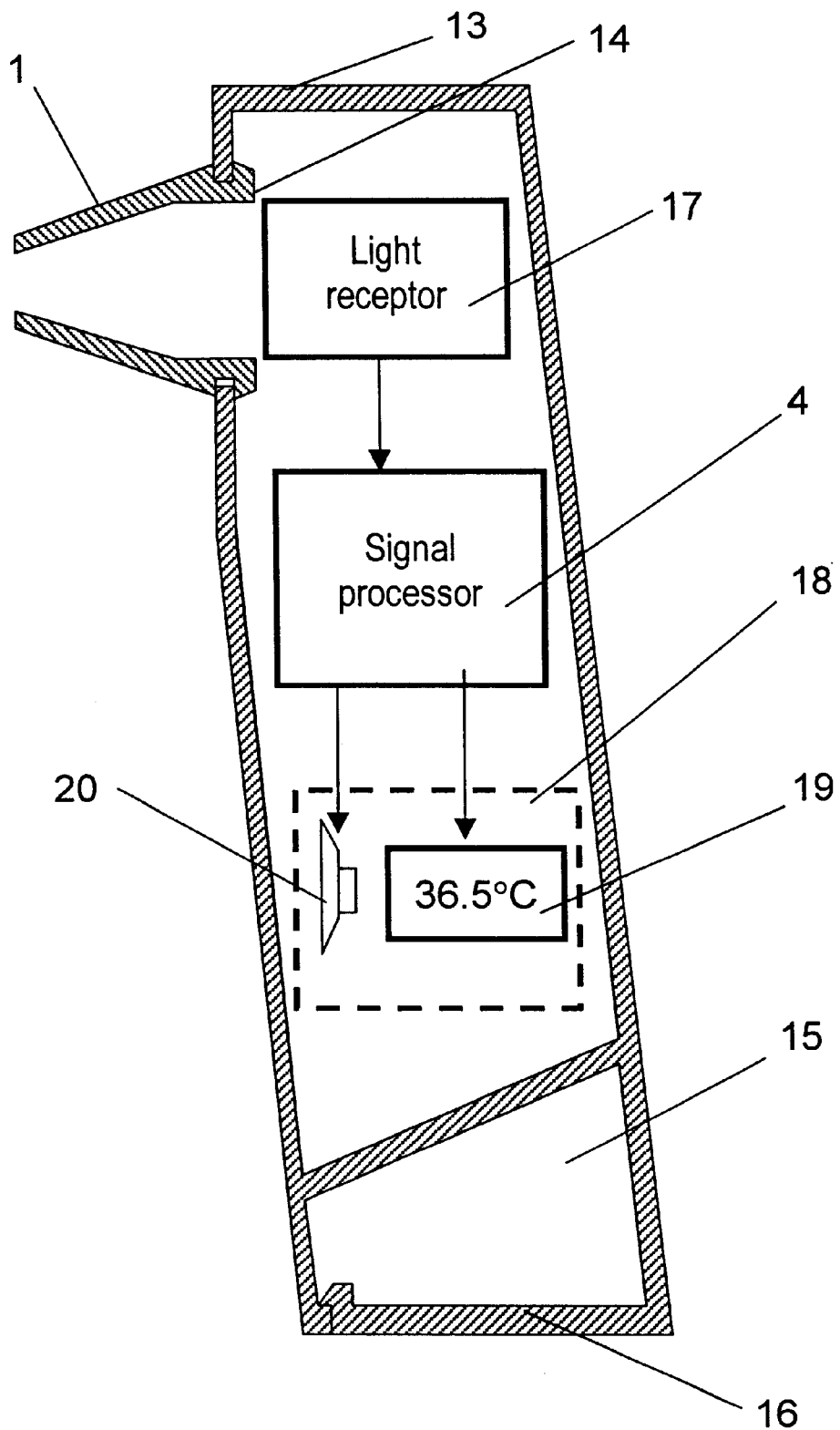
FIG. 1 depicts a structural drawing of a radiation thermometer in accordance with a first exemplary embodiment of the present invention.
Figure 2A:
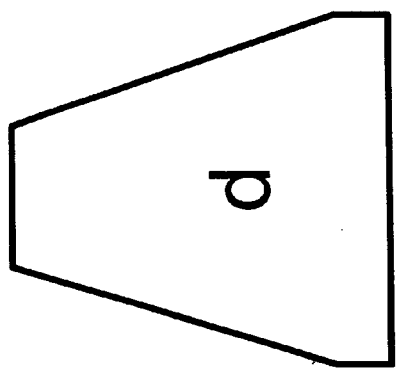
FIGS. 2A through 2D are side views showing a plurality of probes imprinted with different marks in accordance with the same exemplary embodiment.
Figure 2B:
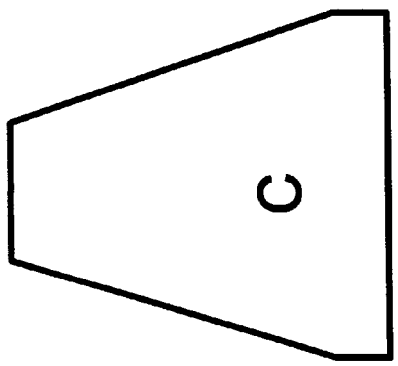
Figure 2C:
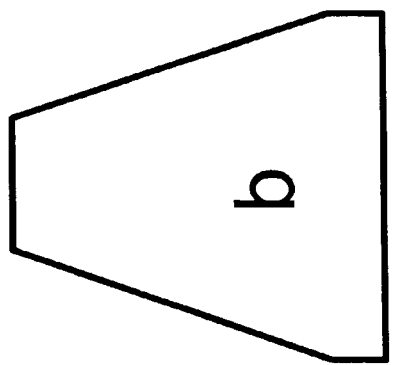
Figure 2D:
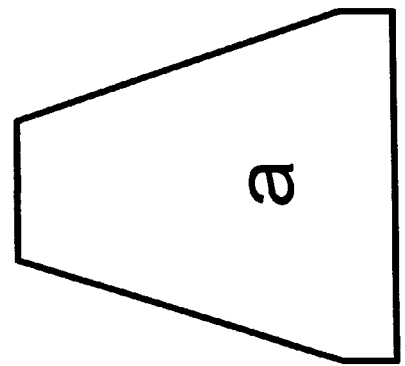
Figure 3D:
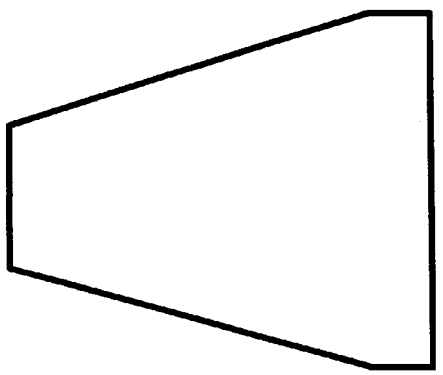
FIGS. 3A through 3D are side views showing a plurality of probes in different dimensions in accordance with the same exemplary embodiment.
Figure 3C:
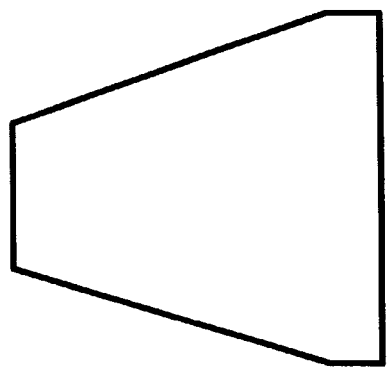
Figure 3B:
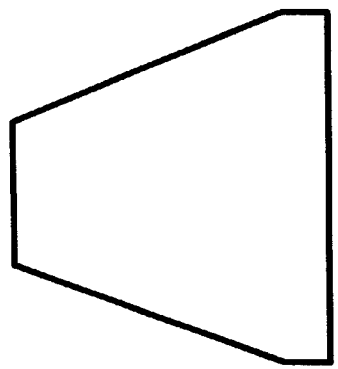
Figure 3A:
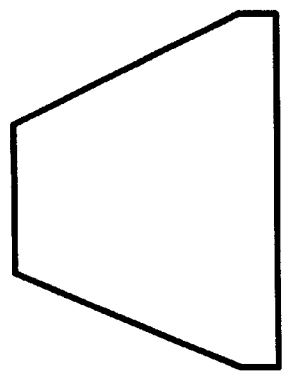

A first exemplary embodiment of the present invention will be described hereinafter by referring to FIG. 1 through FIG. 4. FIG. 1 is a structural drawing showing a radiation thermometer of the present invention. FIGS. 2A through 2D and FIGS. 3A through 3D are side views showing a plurality of probes, and FIG. 4 is a cross sectional view showing a structure of a light receptor 17 and a probe 1.

In the FIG. 1, the probe 1 is a part to be inserted into the ear canal when measuring the body temperature. The probe 1 has a shape that tapers off to a tip directing toward the eardrum, and it is provided with an opening at the tip and a flange 14 at the opposite end in order to make it detachable from a main body 13. When attaching the probe 1 to the main body 13, the flange 14 is deformed inside by a pressure, and fit to the main body 13. When removing the probe 1, the flange 14 is deformed inside in the similar manner by pressing it with fingers. The main body 13 is provided with a storage space 15, in which the probe 1 is detached and stored when temperature is not measured. The storage space 15 is provided with a cover 16 for opening and closing the storage space. The thermometer becomes a simple shape by the main body alone for easy storage when the probe 1 is removed while not in use. There is also less likeliness of losing the removed probe 1, as it is stored in the storage space 15.

The light receptor 17 receives only the infrared rays passed through the opening of the probe 1, and outputs an electric signal corresponding to an amount of the infrared rays. A signal processor 4 calculates a temperature according to the signal received from the light receptor 17. The temperature converted here is a temperature of the radiant source of the infrared rays, that is an equivalent temperature of the eardrum and/or vicinity of it.

The temperature converted by the signal processor 4 is notified to the user as the body temperature with notification means 18. The notification means 18 comprises a numerical display device 19 for displaying in numerals the body temperature converted by the signal processor 4, and a vocal announcing device 20. A liquid crystal display device and a speaker are examples of the numerical display device 19 and the vocal announcing device 20 respectively.

The light receptor 17 is not influenced by temperature changes of the probe 1, and a waveguide is not necessary, since it receives only the infrared rays passed through the opening of the probe 1, as the details will be described later. The probe 1 is detachable, and a plurality of them, imprinted individually with a different mark, is provided as shown by the examples in FIGS. 2A through 2D. The marks imprinted in FIGS. 2A through 2D are "a", "b", "c" and "d" respectively. When the radiation thermometer is used in a family, each probe can be specifically assigned to an individual member of, for example, four in the family, so that the probes are not misused in error because of the identifiable marks, and contagion via the ears can be avoided. Also, there are no temperature deviations due to dispersion of the infrared transmittancy of a membrane cover for the opening at the tip of the probe 1, because the opening can be left uncovered since a waveguide is not provided.

As means to provide the personalized probes with visually distinguishable differences in order to avoid misuse, the probes may be in a variety of colors, or printed with different illustrations, besides the marks as described above. Or, they may be differentiated by varying dimensions as shown in FIGS. 3A through 3D. In the example of FIGS. 3A through 3D, the probes are gradually lengthened in an order of FIGS. 3B, 3C and 3D with the FIG. 3A being the shortest. In addition to a merit of avoiding misuse of the probes with visually distinguishable differences, this example also gives an advantage of offering selection for the probe dimensions according to an ease of inserting it into ears in such a manner that the probe in FIG. 3A can be used for an infant with small ears and the probe in FIG. 3D for an adult with large ears.

The optional vocal announcing device 20 informs the measured temperature with a voice, so that the result can be readily known even if the measurement is made in the dark, or by a blind person. The result is also shown on the numerical display device 19, so that it is known even when the measurement is made in noisy environment or by a person with deafness. Since the temperature is measured in the ear, the vocal announcing device 20 needs a significantly small sound volume in order to announce the result to the user. The measured result can only be heard by the user, but not by any other persons, so that it does not annoy anybody around with unpleasant noises. Privacy of the user can be protected at the same time.

A structure of the light receptor 17 will now be described by referring to FIG. 4 showing a cross sectional view of the light receptor including an optical axis of the optical condenser. In FIG. 4, at least an inner surface of a light-proof body 22 is constructed of reflection suppressing means in a low reflection factor such as synthetic resin, etc. of which details will be described later. Points A and A' are intersections between straight lines and a plane at a tip of the probe 1, the straight lines are drawn from a rim of a refractive lens 21 in a manner to be tangent to an inner surface of the probe 1 on the same side as the rim. These points locate at the inner surface of the tip of the probe 1, in the case of a probe having a rectilineal shape from the opening to a portion where it is attached to the main body as shown in FIG. 4. A point B locates at the inner surface of the probe 1 in a region, radiation emitted from where is not desired to enter into the infrared-ray-receiving element 3. A point F is a focal point of the refractive lens 21. Points FA and FA' represent image points of the points A and A' respectively by the refractive lens 21. A point FB represents an image point of the point B by the refractive lens 21. A line K1A represents a light path of the light (marginal light) that travels from the point A toward the point FA through the rim of the refractive lens 21 on the same side as the point A with respect to the optical axis. A line K2A represents a light path of the light that travels from the point A in parallel with the optical axis, and reaches the point FA after passing through the focal point F. A line K3A represents a light path of the light that travels from the point A to the point FA by passing through a center of the refractive lens 21. A line K4A represents a light path of the light (marginal light) that travels from the point A toward the point FA through the rim of the refractive lens 21 on the opposite side of the point A with respect to the optical axis. In the similar manner, a line K1A' represents a light path of the light (marginal light) that travels from the point A' toward the point FA' through the rim of the refractive lens 21 on the same side as the point A' with respect to the optical axis. A line K2A' represents a light path of the light that travels from the point A' in parallel with the optical axis, and reaches the point FA' after passing through the focal point F. A line K3A' represents a light path of the light that travels from the point A' to the point FA' by passing through the center of the refractive lens 21. A line K4A' represents a light path of the light (marginal light) that travels from the point A' toward the point FA' through the rim of the refractive lens 21 on the opposite side of the point A' with respect to the optical axis. And, a line K3B represents a light path of light that travels from the point B to the point FB by passing through the center of the refractive lens 21. A point FX is an intersection between the light paths K1A and K1A'.

An optical system is designed hereinafter in that the infrared-ray-receiving element 3 receives only the infrared rays that pass through the opening of the probe 1.

The infrared-ray-receiving element 3 is attached to the light-proof body 22 in a manner that the infrared-ray-receiving element 3 does not receive the infrared rays that do not pass through the refractive lens 21. The following design is carried out upon obtaining a structure wherein only the infrared rays that pass through the refractive lens 21 can make an entry.

The lights radiated from the point A reach the image point FA of the point A by passing through the light paths K1A, K2A, K3A, K4A, etc. As a known fact of the geometrical optics, the image point FA of the point A is formed on the opposite side of the point A with respect to the optical axis. As shown in FIG. 4, the light that travels the light path K2A reaches the point FA while departing away from the optical axis after passing through the refractive lens 21 and crossing the optical axis at the focal point F. Likewise, the light that travels the light path K1A reaches the point FA while departing away from the optical axis after passing through the refractive lens 21 and crossing the optical axis. The light that travels the light path K3A reaches the point FA while departing away from the optical axis after crossing the optical axis at the refractive lens 21. The light that travels the light path K4A passes the refractive lens 21 after crossing the optical axis, and reaches the point FA without crossing the optical axis after having passed the refractive lens 21. As described, there is a region where the lights radiated from the point A do not pass through in an area farther from the refractive lens 21 than the intersection FX of the light path K1A and the optical axis, but nearer to the refractive lens 21 than the image point FA. This region is located within a triangle formed by the intersection FX and the image points FA and FA'. The light receptor 17 that does not receive the infrared rays radiated from the points A and A' is attained by positioning the infrared-ray-receiving element 3 inside of the triangle situated in the meridional plane of the optical condenser.

Since the point B in a region of the inner surface of the probe 1, from which reception of lights is not desired, is farther away from the optical axis than the point A, an image point FB of the point B via the refractive lens 21 stays farther from the optical axis than the image point FA, as it is well known. Hence, if the infrared-ray-receiving element 3 is positioned in the triangle formed by the intersection FX and the image points FA and FA' so as not to receive the infrared rays from the points A and A', the structure that does not receive the infrared rays also from the point B is attained by its very nature.

As has been described, a light receptor that receives only the infrared rays radiated from the region around the optical axis where reception is desired, i.e. the eardrum and/or vicinity of it and passes through the opening of the probe 1, can be realized by positioning the infrared-ray-receiving element 3 inside of the triangle formed with the intersection FX and the image points FA and FA'.

SECOND EXEMPLARY EMBODIMENT

Figure 5:
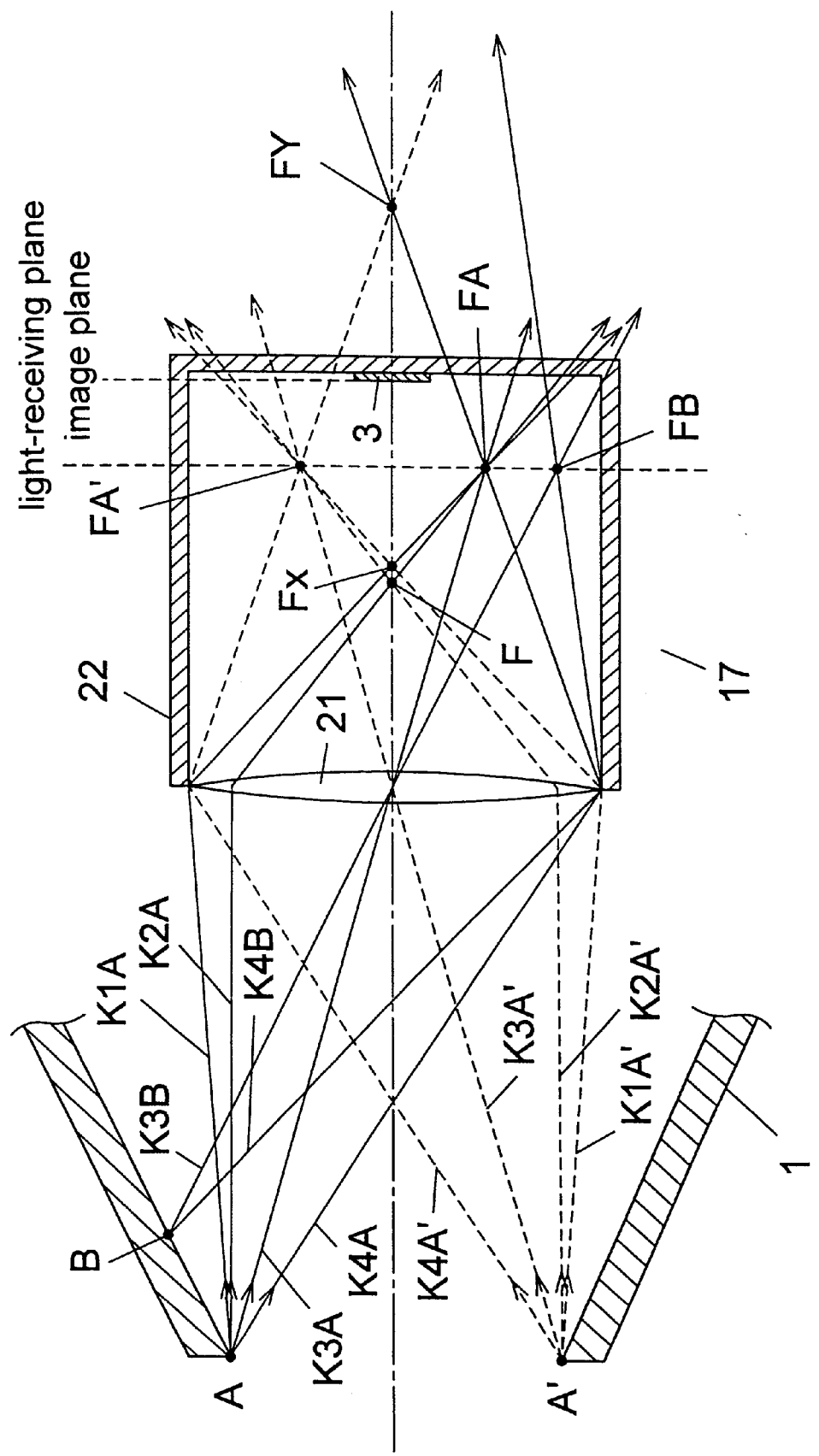
FIG. 5 is a cross sectional view depicting a structure of a light receptor and a probe in accordance with a second exemplary embodiment of the present invention.

A second exemplary embodiment of the present invention will be described next by referring to FIG. 5, which is a cross sectional view depicting a light receptor 17 and a probe 1 of a radiation thermometer of the second exemplary embodiment. Points A and A' are intersections between straight lines drawn from a rim of a refractive lens 21 in a manner to be tangent to an inner surface of the probe 1 and a plane at a tip of the probe 1. These points locate at the inner surface of the tip of the probe 1, in the case of a probe having a rectilinear shape from the opening to a portion where it is attached to the main body as shown in FIG. 5. A point B is located at an inner surface of the probe 1. Radiation emitted from point B is not desired to enter into the infrared-ray-receiving element 3. A point F represents a focal point of the refractive lens 21. Points FA and FA' represent image points of the points A and A' respectively by the refractive lens 21. A point FB represents an image point of the point B by the refractive lens 21. A line K1A represents a light path of the light (marginal light) that travels from the point A toward the point FA through the rim of the refractive lens 21 on the same side as the point A with respect to the optical axis. A line K2A represents a light path of the light that travels from the point A in parallel with the optical axis, and reaches the point FA after passing through the focal point F. A line K3A represents a light path of the light that travels from the point A to the point FA by passing through a center of the refractive lens 21. A line K4A represents a light path of the light (marginal light) that travels from the point A toward the point FA through the rim of the refractive lens 21 on the opposite side of the point A with respect to the optical axis. A line K1A' represents a light path of the light (marginal light) that travels from the point A' toward the point FA' through the rim of the refractive lens 21 on the same side as the point A' with respect to the optical axis. A line K2A' represents a light path of the light that travels from the point A' in parallel with the optical axis, and reaches the point FA' after passing through the focal point F. A line K3A' represents a light path of the light that travels from the point A' to the point FA' by passing through the center of the refractive lens 21. A line K4A' represents a light path of the light (marginal light) that travels from the point A' toward the point FA' through the rim of the refractive lens 21 on the opposite side of the point A' with respect to the optical axis. A line K3B represents a light path of the light that travels from the point B to the point FB by passing through the center of the refractive lens 21. A line K4B represents a light path of the light (marginal light) that travels from the point B toward the point FB through the rim of the refractive lens 21 on the opposite side of the point B with respect to the optical axis. A point FX is an intersection between the light paths K1A and K1A'. And, a point FY is an intersection between the light paths K4A and K4A'.

An optical system is designed hereinafter in that the infrared-ray-receiving element 3 receives only the infrared rays that pass through the opening of the probe 1.

The infrared-ray-receiving element 3 is attached to the light-proof body 22 in a manner that the infrared-ray-receiving element 3 does not receive the infrared rays that do not pass through the refractive lens 21. The following design is carried out upon obtaining a structure wherein only infrared rays that pass through the refractive lens 21 can make an entry.

The lights radiated from the point A reach the image point FA of the point A by passing through the light paths K1A, K2A, K3A, K4A, etc. As a known fact of the geometrical optics, the image point FA of the point A is formed on the opposite side of the point A with respect to the optical axis. As shown in FIG. 5, the light that travels the light path K2A departs away from the optical axis after passing through the refractive lens 21, crossing the optical axis at the focal point F, and getting through the point FA. Likewise, the light that travels the light path K1A departs away from the optical axis after passing through the refractive lens 21, crossing the optical axis, and getting through the point FA. The light that travels the light path K3A departs away from the optical axis after crossing the optical axis at the refractive lens 21 and getting through the point FA. The light that travels the light path K4A passes the refractive lens 21 after crossing the optical axis, reaches the point FA without crossing the optical axis after having passed through the refractive lens 21, and it then either approaches to or departs from the optical axis. As described, there is a region where the lights radiated from the point A do not pass through in an area farther away from the refractive lens 21 than the image point FA of the point A. This region is located between the light path K4A and the light path K4A' in an area that is farther from the refractive lens 21 than the image points FA and FA'. The optical system that does not receive the infrared rays radiated from the points A and A' can thus be attained by positioning the infrared sensor in this region.

Since the point B in a region of the inner surface of the probe 1, radiation emitted from where is not desired to enter into the infrared-ray-receiving element 3, is farther away from the optical axis than the point A, the image point FB of the point B via the refractive lens 21 locates farther from the optical axis than the image point FA, as it is well known. Hence, if the infrared-ray-receiving element 3 is positioned in the region lying between the light path K4A and the light path K4A' at a portion farther from the refractive lens 21 than the image points FA and FA' so as not to receive the infrared rays from the points A and A', the structure that does not receive the infrared rays from the point B is attained by its very nature.

As has been described, a light receptor that receives only the infrared rays radiated from the region around the optical path where reception is desired, i.e. the eardrum and/or vicinity of it and passes through the opening of the probe 1, can be realized by positioning the infrared-ray-receiving element 3 in the region between the light path K4A and the light path K4A' at a portion farther from the refractive lens 21 than the image points FA and FA'.

THIRD EXEMPLARY EMBODIMENT

Figure 6:
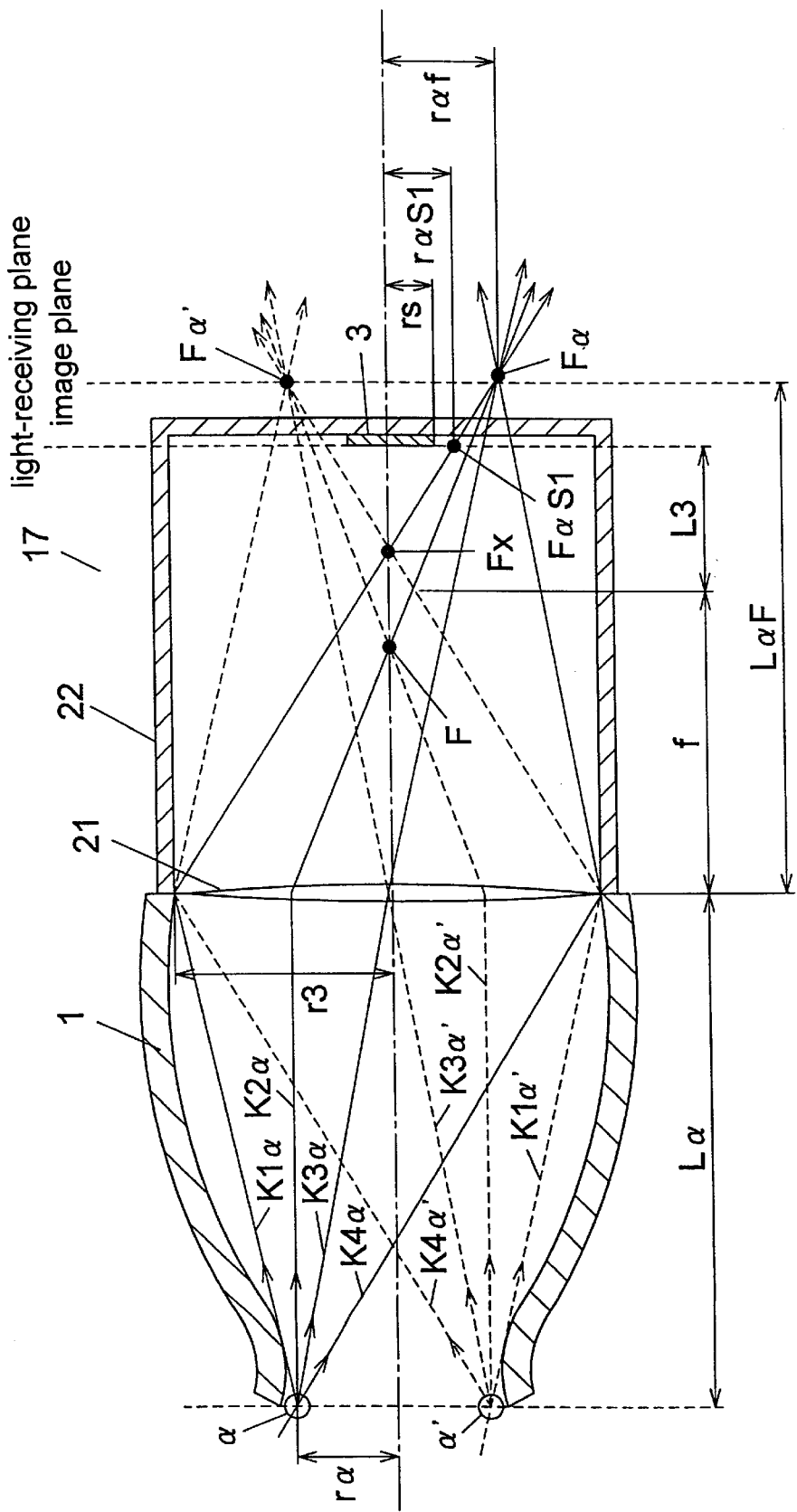
FIG. 6 is a cross sectional view depicting a structure of a light receptor and a probe in accordance with a third exemplary embodiment of the present invention.

A third exemplary embodiment of the present invention will be described now by referring to FIG. 6, which is a cross sectional view depicting a light receptor 17 and a probe 1 of a radiation thermometer of the third exemplary embodiment. The probe 1 of this embodiment has a portion with a rounded surface in order to facilitate insertion of it into the ear canal, unlike those of the foregoing embodiments. In FIG. 6, points $\alpha$ and $\alpha'$ are hypothetical end points where straight lines drawn from a rim of a refractive lens 21 in a manner to be tangent to an inner surface of the probe 1 on the same side as the rim intersect a plane at a tip of the probe 1. A point F represents a focal point of the refractive lens 21. Points F$\alpha$ and F$\alpha'$ represent image points of the points $\alpha$ and $\alpha'$ respectively via the refractive lens 21. A line K1$\alpha$ represents a light path of the light (marginal light) that travels from the point a toward the point F$\alpha$ through the rim of the refractive lens 21 on the same side as the point $\alpha$ with respect to the optical axis. A line K2$\alpha$ represents a light path of the light that travels from the point $\alpha$ in parallel with the optical axis, and reaches the point F$\alpha$ after passing through the focal point F. A line K3$\alpha$ represents a light path of the light that travels from the point $\alpha$ to the point F$\alpha$ by passing through a center of the refractive lens 21. A line K4$\alpha$ represents a light path of the light (marginal light) that travels from the point $\alpha$, and reaches the point F$\alpha$ by passing through the rim of the refractive lens 21 on the opposite side of the point $\alpha$ with respect to the optical axis. A line K$\alpha'$ represents a light path of the light (marginal light) that travels from the point $\alpha'$ toward the point F$\alpha'$ through the rim of the refractive lens 21 on the same side as the point $\alpha'$ with respect to the optical axis. A line K2$\alpha'$ represents a light path of the light that travels from the point $\alpha'$ in parallel with the optical axis, and reaches the point F$\alpha'$ after passing through the focal point F. A line K3$\alpha'$ represents a light path of the light that travels from the point $\alpha'$, and reaches the point F$\alpha'$ by passing through the center of the refractive lens 21. A line K4$\alpha'$ represents a light path of the light (marginal light) that travels from the point $\alpha$, and reaches the point F$\alpha'$ by passing through the rim of the refractive lens 21 on the opposite side of the point $\alpha'$ with respect to the optical axis. A point FX is an intersection between the light path K1$\alpha$ and the optical axis.

An optical system is designed hereinafter in that the infrared-ray-receiving element 3 receives only the infrared rays that pass through the opening of the probe 1.

The infrared-ray-receiving element 3 is attached to the light-proof body 22 in a manner that the infrared-ray-receiving element 3 receives only the infrared rays that pass through the refractive lens 21. The design is carried out as follows upon obtaining a structure wherein only the infrared rays that pass through the refractive lens 21 can make an entry.

It is essential to avoid receiving the infrared rays radiated from the probe 1, in order to receive only the infrared rays that are radiated from the eardrum and/or vicinity of it and pass through the opening of the probe 1. For this purpose, a point is hypothesized at a boundary locating between a region where reception of lights is desired and the other region where reception of lights is not desired. The probe 1 is placed in a manner that it locates farther away from the optical axis than a light path of the light (marginal light) that travels from this hypothesized boundary point to the rim of the refractive lens 21 on the same side as the hypothesized point with respect to the optical axis. The aforecited hypothesized points located on the boundary are designated as points $\alpha$ and $\alpha'$ where straight lines extending from the rim of the refractive lens 21 to the probe 1 in tangent to an inner surface of the probe on the same side as the rim with respect to the optical axis intersect with the plane at a tip of the probe 1. The infrared-ray-receiving element 3 is then mounted within a triangle formed by the image points F$\alpha$, F$\alpha'$ and the point FX. The probe 1 is thus located farther from the optical axis than the light paths K1$\alpha$ and K1$\alpha'$ between the points $\alpha$ and the refractive lens 21, so as to attain the optical system that does not receive lights from the probe 1.

Further details about the above are described hereinafter. The lights radiated from the point a reach the image point F$\alpha$ of the point $\alpha$ by passing through the light paths K1$\alpha$, K2$\alpha$, K3$\alpha$, K4$\alpha$, etc. As a known fact of the geometrical optics, the image point F$\alpha$ of the point $\alpha$ is formed on the opposite side of the point $\alpha$ with respect to the optical axis. As shown in FIG. 6, the light that travels the light path K2$\alpha$ reaches the point F$\alpha$ while departing away from the optical axis after passing through the refractive lens 21 and crossing the optical axis at the focal point F. Likewise, the light that travels the light path K1$\alpha$ reaches the point F$\alpha$ while departing away from the optical axis after passing through the refractive lens 21 and crossing the optical axis. The light that travels the light path K3$\alpha$ reaches the point F$\alpha$ while departing away from the optical axis after crossing the optical axis at the refractive lens 21. The light that travels the light path K4$\alpha$ passes the refractive lens 21 after crossing the optical axis, and reaches the point F$\alpha$ without crossing the optical axis after passing through the refractive lens 21. As described, there is a region where the lights radiated from the point $\alpha$ do not pass through in an area farther from the refractive lens 21 than the intersection FX of the light path K1$\alpha$ and the optical axis, but nearer to the refractive lens 21 than the image point F$\alpha$. The same is true with the point $\alpha'$ that there is a region where the lights radiated from the point $\alpha'$ do not pass through in an area farther from the refractive lens 21 than the intersection of the light path K1$\alpha'$ and the optical axis, but nearer to the refractive lens 21 than the image point F$\alpha'$. The light receptor that does not receive the lights radiated from the points $\alpha$ and $\alpha'$ can be attained by positioning the infrared-ray-receiving element 3 within the triangle formed by the points F$\alpha$, F$\alpha'$ and FX.

The light from an area farther from the optical axis than the light path K1$\alpha$ between the point a and the refractive lens 21 is substituted by the light from a point farther in distance from the optical axis than the point α on the same plane with the α. A known fact of the geometrical optics is that an image point of that point via the refractive lens 21 locates farther away from the optical axis than the point Fα. For this reason, the lights from any point farther than the point α from the optical axis is not received, and therefore the light from the probe 1 is not received, if it is so designed as not to receive the light from the point α. Likewise, the light from an area farther from the optical axis than the light path K1α' between the point α' and the refractive lens 21 is substituted by the light from a point farther in distance from the optical axis than the point α' on the same plane with the α'. By the known fact of the geometrical optics, an image point of that point via the refractive lens 21 locates farther away from the optical axis than the point Fα'. For this same reason, the lights from any point farther than the point α' from the optical axis is not received, and therefore the light from the probe 1 is not received, if it is so designed as not to receive the light from the point α'.

Hence, if the infrared-ray-receiving element 3 is positioned in the triangle configured by the points Fα, Fα' and FX, so as not to receive the infrared rays radiated from the points α and α', a structure that does not receive the infrared rays also from the probe 1 is realized by its very nature.

A position of the infrared-ray-receiving element 3 where it does not receive the lights from the point α is obtained as follows.

The infrared-ray-receiving element 3 locates closer to the refractive lens 21 than the point Fα. Therefore, the following formula is derived:

$$L\alpha F \geq f + L3 \quad \text{formula 1}$$

Thus, $$L3 \leq L\alpha F - f \quad \text{formula 2}$$

where:

LαF is a distance from the center of the refractive lens 21 to the image point Fα of the point α;

f is a distance from the center of the refractive lens 21 to the focal point F; and L3 is a distance from the focal point F to the infrared-ray-receiving element 3.

Since a light-receiving plane is situated between the intersection FX, where the light path K1α crosses the optical axis, and the point Fα, as shown in FIG. 6, a light path that gets closest to the infrared-ray-receiving element 3 on the light-receiving plane is the light path K1α among those paths between the points α and Fα. Therefore, the following formula needs to be satisfied in order for the infrared-ray-receiving element 3 not to receive the lights from the point α:

$$r\alpha S1 > rs \quad \text{formula 3}$$

where:

rαS1 is a distance from an intersection FαS1 between the light path K1α and the light-receiving plane of the infrared-ray-receiving element 3 to the optical axis; and rs is a radius of the infrared-ray-receiving element 3.

If a radius of the refractive lens 21 is given as r3, and a distance from the optical axis to the image point Fα is given as rαF, then the r3, rαF, LαF, rαS1, L3 and f satisfy a geometrical relation of the formula 4 below, as known by the geometrical optics:

$$\frac{r3 + r\alpha F}{L\alpha F} = \frac{r\alpha F - r\alpha S1}{L\alpha F - (f + L3)} \quad \text{formula 4}$$

$$r\alpha S1 = r\alpha F - (r3 + r\alpha F) \times \left(1 - \frac{f + L3}{L\alpha F}\right) \quad \text{formula 5}$$

Then, the formula 5 is satisfied.

The formula 6 is obtained by substituting the formula 5 for the formula $$L\alpha F - f - \frac{L\alpha F \times (r\alpha F - rS)}{r3 + r\alpha F} < L3 \quad \text{formula 6}$$

From the formulae 2 and 6, the formula 7 is derived as a condition for the infrared-ray-receiving element 3 not to receive the lights radiated from the point α:

$$L\alpha F - f - \frac{L\alpha F \times (r\alpha F - rS)}{r3 + r\alpha F} < L3 \leq L\alpha F - f \quad \text{formula 7}$$

Furthermore, if a distance from the point α to the optical axis is given as rα, and a distance from the tip of the probe 1 to the center of the refractive lens 21 is given as Lα, then the rα, Lα, rαF, and LαF satisfy a formula 8 as a geometrical relationship, as known in the geometrical optics:

$$\frac{r\alpha}{L\alpha} = \frac{r\alpha L}{L\alpha F} \quad \text{formula 8}$$

Thus, the formula 9 is also satisfied.

$$r\alpha F = r\alpha \times \frac{L\alpha F}{L\alpha} \quad \text{formula 9}$$

By substituting the formula 9 for the formula 7, the formula 10 is derived as a condition for the infrared-ray-receiving element 3 not to receive the lights radiated from the point α:

$$L\alpha F - f - \frac{L\alpha F(r\alpha \cdot L\alpha F - rS \cdot L\alpha)}{r3 \cdot L\alpha + r\alpha \cdot L\alpha F} < L3 \leq L\alpha F - f \quad \text{formula 10}$$

Also, the formula 11 is given by the Gauss's formula:

$$\frac{1}{f} = \frac{1}{L\alpha F} + \frac{1}{L\alpha} \quad \text{formula 11}$$

Then, the formula 12 is given:

$$L\alpha F = \frac{f \cdot L\alpha}{L\alpha - f} \quad \text{formula 12}$$

By substituting the formula 12 for the formula 10, the formula 13 is derived as a condition for the infrared-ray-receiving element 3 not to receive the lights radiated from the point α:

$$\frac{f \times f}{L\alpha - f} - \frac{f}{L\alpha - f} \times \frac{L\alpha \times (r\alpha \cdot f - rs(L\alpha - f))}{r3 \times (L\alpha - f) + r\alpha \cdot f} <$$ formula 13

$$L3 \leq \frac{f \times f}{L\alpha - f}$$

From the foregoing, it is desirable to design an optical system that satisfies the formulae 7, 10 or 13 in order for the infrared-ray-receiving element 3 not to receive the lights radiated from the point α at the tip of the probe 1. By positioning the infrared-ray-receiving element 3 away from the focal point of the refractive lens 21 by the distance of L3 given by the formulae 7, 10 or 13, therefore, the infrared-ray-receiving element 3 is able to receive only the infrared rays radiated from the eardrum and/or vicinity of it and pass through the opening of the probe 1, while not receiving the infrared rays radiated from the probe 1.

FOURTH EXEMPLARY EMBODIMENT

Figure 7:
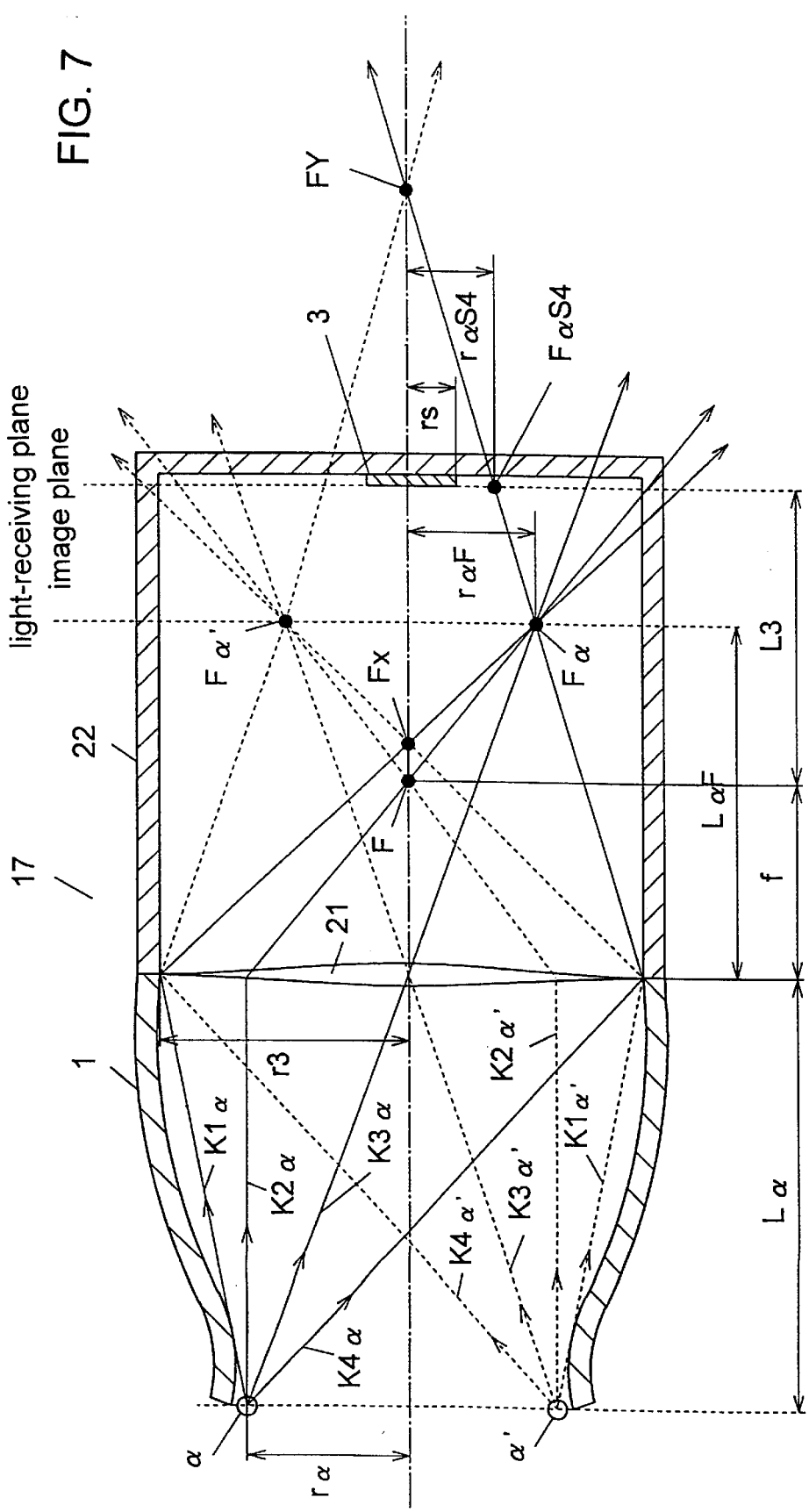
FIG. 7 is a cross sectional view depicting a structure of a light receptor and a probe in accordance with a fourth exemplary embodiment of the present invention.

A fourth exemplary embodiment of the present invention will be described now by referring to FIG. 7, which is a cross sectional view depicting a light receptor 17 and a probe 1 of a radiation thermometer of the fourth exemplary embodiment. In FIG. 7, the probe 1 has a portion with rounded surface in the same manner as the third exemplary embodiment. Points α and α' are hypothetical end points where straight lines drawn from a rim of a refractive lens 21 in a manner to be tangent to an inner surface of the probe 1 on the same side as the rim intersect a plane at a tip of the probe 1 with respect to the optical axis. A point F represents a focal point of the refractive lens 21. Points Fα and Fα' represent image points of the points α and α' respectively via the refractive lens 21. A line K1α' represents a light path of the light (marginal light) that travels from the point α toward the point Fα through the rim of the refractive lens 21 on the same side as the point α with respect to the optical axis. A line K2α represents a light path of the light that travels from the point α in parallel with the optical axis, and reaches the point Fα after passing through the focal point F. A line K3α represents a light path of the light that travels from the point α to the point Fα by passing through a center of the refractive lens 21. A line K4α represents a light path of the light (marginal light) that travels from the point α, and reaches the point Fα by passing through the rim of the refractive lens 21 on the opposite side of the point α with respect to the optical axis. A line K1α' represents a light path of the light (marginal light) that travels from the point α' toward the point Fα' through the rim of the refractive lens 21 on the same side as the point α' with respect to the optical axis. A line K2α' represents a light path of the light that travels from the point α' in parallel with the optical axis, and reaches the point Fα' after passing through the focal point F. A line K3α represents a light path of the light that travels from the point α', and reaches the point Fα' by passing through the center of the refractive lens 21. A line K4α represents a light path of the light (marginal light) that travels from the point α, and reaches the point Fα' by passing through the rim of the refractive lens 21 on the opposite side of the point α' with respect to the optical axis. A point FX is an intersection between the light paths K1α and the optical axis.

An optical system is designed hereinafter so that the infrared-ray-receiving element 3 receives only the infrared rays that pass through the opening of the probe 1.

The infrared-ray-receiving element 3 is attached to the light-proof body 22 in a manner that the infrared-ray-receiving element 3 receives only the infrared rays that pass through the refractive lens 21. The designing is made in the following manner upon obtaining a structure wherein only the infrared rays that pass through the refractive lens 21 can make an entry.

It is essential to avoid receiving the infrared rays radiated from the probe 1, in order to receive only the infrared rays that are radiated from the eardrum and/or vicinity of it and pass through the opening of the probe 1. For this purpose, a point is hypothesized at a boundary locating between a region where reception of lights is desired and the other region where reception of lights is not desired. The probe 1 is placed in a manner that it is located farther away from the optical axis than a light path of the light (marginal light) that travels from this hypothesized boundary point to the rim of the refractive lens 21 on the same side as the hypothesized point with respect to the optical axis. The aforecited hypothesized points located on the boundary are designated as points α and α' where straight lines extending from the rim of the refractive lens 21 to the probe 1 in tangent to an inner surface of the probe 1 on the same side as the rim with respect to the optical axis intersect the plane at a tip of the probe 1. The infrared-ray-receiving element 3 is then mounted within a region lying between the light path K4α and the light path K4α' at an area farther from the refractive lens 21 than the image points Fα and Fα'. The probe 1 is thus located farther from the optical axis than the light paths K1α and K1α' between the points a and the refractive lens 21, so as to attain the optical system that does not receive the lights from the probe 1.

Further details about the above will be described hereinafter.

The lights radiated from the point a reach the image point Fα of the point α by passing through the light paths K1α, K2α, K3α, K4α, etc. As a known fact of the geometrical optics, the image point Fα of the point α is formed on the opposite side of the point α with respect to the optical axis. As shown in FIG. 7, the light that travels the light path K2α reaches the point Fα while departing away from the optical axis after passing through the refractive lens 21 and crossing the optical axis at the focal point F. Likewise, the light that travels the light path K1α reaches the point Fα while departing away from the optical axis after passing through the refractive lens 21 and crossing the optical axis. The light that travels the light path K3α reaches the point Fα while departing away from the optical axis after crossing the optical axis at the refractive lens 21. The light that travels the light path K4α passes the refractive lens 21 after crossing the optical axis, reaches the point Fα without crossing the optical axis after passing through the refractive lens 21, and it then either approaches to or departs from the optical axis. As described, there is a region where the lights radiated from the point α do not pass through in an area farther from the refractive lens 21 than the image point Fα of the point α. The same is true with the point α' that there is a region where the lights radiated from the point α' do not pass through in an area farther from the refractive lens 21 than the image point Fα' of the point α'. The light receptor that does not receive the infrared rays radiated from the points α and α' can be attained by positioning the infrared-ray-receiving element 3 within the region lying between the light path K4α and the light path K4α' in the area farther from the refractive lens 21 than the image points Fα and Fα'.

The light from an area farther from the optical axis than the light path K1α between the point α and the refractive lens 21 is substituted by the light from a point farther in distance from the optical axis than the point α on the same plane with the point α. A known fact of the geometrical optics is that an image point of that point via the refractive lens 21 locates farther away from the optical axis than the image point Fα. For this reason, the lights from any point farther away from the optical axis than the point α is not received, and therefore the light from the probe 1 is not received, if it is so designed as not to receive the light from the point α. Likewise, the light from an area farther from the optical axis than the light path k1α' between the point α' and the refractive lens 21 is substituted by the light from a point farther in distance from the optical axis than the point α' on the same plane with the α'. By the known fact of the geometrical optics, an image point of that point via the refractive lens 21 locates farther away from the optical axis than the point Fα'. For this same reason, the lights from any point farther than the point α' from the optical axis is not received, and therefore the light from the probe 1 is not received, if it is so designed as not to receive the light from the point α'.

Hence, if the infrared-ray-receiving element 3 is positioned in the region lying between the light path K4α and the light path K4α' in the area farther from the refractive lens 21 than the image points Fα and Fα', so as not to receive the infrared rays radiated from the points α and α', a structure that does not receive the infrared rays also from the probe 1 is realized by its very nature.

A position of the infrared-ray-receiving element 3 where it does not receive light from the point α is obtained as follows.

The infrared-ray-receiving element 3 is located farther from the refractive lens 21 than the point Fα. Therefore, the following formula is derived:

$$L\alpha F \leq f + L3 \qquad \text{formula 14}$$

Thus, $$L3 \geq L\alpha F - f \qquad \text{formula 15}$$

where:
  LαF is a distance from the center of the refractive lens 21 to the image point Fα of the point α;
  f is a distance from the center of the refractive lens 21 to the focal point F; and
  L3 is a distance from the focal point F to the infrared-ray-receiving element 3.

Since a light-receiving plane is situated farther from the refractive lens 21 than the image point Fα, as shown in FIG. 7, a light path that gets closest to the infrared-ray-receiving element 3 on the light-receiving plane is the light path K4α among those paths between the points α and Fα. Therefore, the following formula needs to be satisfied in order for the infrared-ray-receiving element 3 not to receive the lights from the point α:

$$r\alpha S4 > rs \qquad \text{formula 16}$$

where:
  rαS4 is a distance from an intersection FαS4 between the light path K4α and the light-receiving plane of the infrared-ray-receiving element 3 to the optical axis; and
  rs is a radius of the infrared-ray-receiving element 3.

If a radius of the refractive lens 21 is given as r3, and a distance from the optical axis to the image point Fα is given as rαF, then the r3, rαF, LαF, rαS4, L3 and f satisfy a geometrical relation of the formula 17 below, as known by the geometrical optics:

$$\frac{r3 - r\alpha F}{L\alpha F} = \frac{r\alpha F - r\alpha S4}{f + L3 - L\alpha F} \qquad \text{formula 17}$$

Then, the formula 18 is satisfied.

$$r\alpha S4 = r\alpha F - (r3 - r\alpha F) \times \left(\frac{f + L3}{L\alpha F} - 1\right) \qquad \text{formula 18}$$

The formula 19 is obtained by substituting the formula 18 for the formula 16:

$$L3 < L\alpha F - f + \frac{L\alpha F \times (r\alpha F - rS)}{r3 - r\alpha F} \qquad \text{formula 19}$$

From the formulae 15 and 19, the formula 20 is derived as a condition for the infrared-ray-receiving element 3 not to receive the lights radiated from the point α:

$$L\alpha F - f \leq L3 < L\alpha F - f + \frac{L\alpha F \times (r\alpha F - rS)}{r3 - r\alpha F} \qquad \text{formula 20}$$

Furthermore, if a distance from the point α to the optical axis is given as rα, and a distance from the tip of the probe 1 to the center of the refractive lens 21 is given as Lα, then the rα, Lα, rαF, and LαF satisfy the geometrical relation of the previous formula 8, as known by the geometrical optics. Thus, the previous formula 9 is also satisfied.

By substituting the formula 9 for the formula 20, the formula 21 is derived as a condition for the infrared-ray-receiving element 3 not to receive the lights radiated from the point α:

$$L\alpha F - f \leq L3 < L\alpha F - f + \frac{L\alpha F(r\alpha \cdot L\alpha F - rS \cdot L\alpha)}{r3 \cdot L\alpha - r\alpha \cdot L\alpha F} \qquad \text{formula 21}$$

Also, the formula 11 is derived by the Gauss's formula, and hence the formula 12, as previously given.

By substituting the formula 12 for the formula 21, the formula 22 is derived as a condition for the infrared-ray-receiving element 3 not to receive the lights radiated from the point α:

$$\frac{f \times f}{L\alpha - f} \leq L3 < \qquad \text{formula 22}$$

$$\frac{f \times f}{L\alpha - f} + \frac{f}{L\alpha - f} \times \frac{L\alpha \times (r\alpha \cdot f - rs(L\alpha - f))}{r3 \times (L\alpha - f) - r\alpha \cdot f}$$

From the foregoing, it is desirable to design an optical system that satisfies the conditions given by the formulae 20, 21 or 22 in order for the infrared-ray-receiving element 3 not to receive the lights radiated from the point α. By positioning the infrared-ray-receiving element 3 away from the focal point of the refractive lens 21 by the distance of L3 given by the formulae 20, 21 or 22, the infrared-ray-receiving element 3 is able to receive only the infrared rays radiated from the eardrum and/or vicinity of it and pass through the opening of the probe 1, while not receiving the infrared rays radiated from the probe 1. Therefore, a waveguide is not necessary for blocking the infrared rays from the probe 1. It also avoids using a thermally high conductive material for the refractive lens 21, since the waveguide susceptible to heat from the probe 1 is not provided.

In the foregoing first through fourth exemplary embodiments, the refractive lens 21 is made of a synthetic resin such as polyethylene that allows the infrared rays in the wavelength of about 10 μm to penetrate. As some of the thermal properties, the polyethylene has a thermal conductivity "λ" of 0.34 J/msK and a thermal capacity of $2.12 \times 10^6$ J/kgK. It is obvious that both the thermal conductivity and the thermal capacity of the synthetic resin are small as compared to metals, as physical values of copper, for example, are 398 J/ms° K and 3.43×106 J/kg° K respectively.

When a radiation thermometer, which has been stored in a cold room, is brought into a room of warmer temperature, the light receptor 17 including the refractive lens 21 of low temperature chills the air surrounding them, so that it is momentarily below dew point.

A surface temperature of the refractive lens 21 tends to rise quickly, however, since the thermal capacity is small. Also the heat on a surface of the refractive lens 21 does not disperse into a direction of the thickness because of the low thermal conductivity. Therefore, even if surface temperature of the refractive lens 21 is below the dew point, it does not last long, and it is not likely to produce dew condensation. Accordingly, the result is a structure that is capable of detecting an accurate temperature without being influenced by condensation, even if temperature surrounding the radiation thermometer changes.

Although what has been described is an example that utilizes a refractive lens for the optical condenser in the light receptor, the infrared-ray-receiving element 3 can also receive only the infrared rays radiated from the eardrum and/or vicinity of it and pass through the opening of the probe 1 by utilizing a transparent type diffraction lens and disposing the infrared-ray-receiving element 3 in the same manner. It also offers the advantage of producing the lens easily.

FIFTH EXEMPLARY EMBODIMENT

Figure 8:
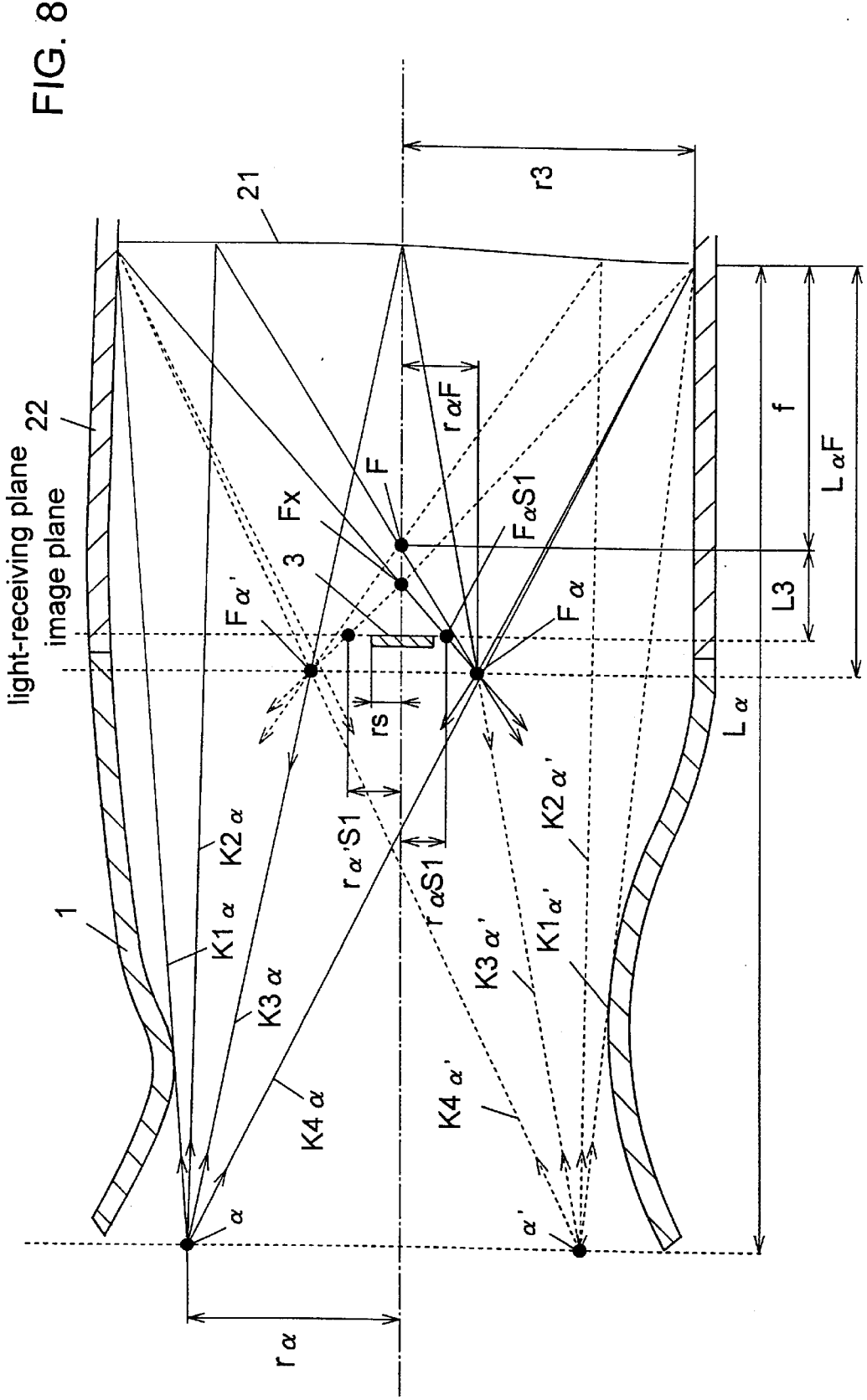
FIG. 8 is a cross sectional view depicting a structure of a light receptor and a probe in accordance with a fifth exemplary embodiment of the present invention.

A fifth exemplary embodiment of the present invention will be described now by referring to FIG. 8, which is a cross sectional view depicting a light receptor and a probe of a radiation thermometer of the fifth exemplary embodiment. Unlike the previous exemplary embodiments, a condensing mirror is utilized for the optical condenser 21. In FIG. 8, points α and α' are hypothetical end points where straight lines drawn from a rim of a condensing mirror 21 in a manner to be tangent to an inner surface of the probe 1 on the same side as the rim intersect a plane at a tip of the probe 1 with respect to the optical axis. A point F represents a focal point of the condensing mirror 21. Points Fα and Fα' represent image points of the points α and α' respectively via the condensing mirror 21. A line K1α represents a light path of the light (marginal light) that travels from the point α toward the point Fα after reflected from the rim of the condensing mirror 21 on the same side as the point α with respect to the optical axis. A line K2α represents a light path of the light that travels from the point α in parallel with the optical axis, and reaches the point Fα after passing through the focal point F. A line K3α represents a light path of the light that reaches the point Fα from the point α after reflected from a center of the condensing mirror 21. A line K4α represents a light path of the light (marginal light) that reaches the point Fα from the point α after reflected from the rim of the condensing mirror 21 on the opposite side of the point α with respect to the optical axis. A line K1α' represents a light path of the light (marginal light) that travels from the point α' toward the point Fα' after reflected from the rim of the condensing mirror 21 on the same side as the point α' with respect to the optical axis. A line K2α' represents a light path of the light that travels from the point α' in parallel with the optical axis, and reaches the point Fα' after passing through the focal point F. A line K3α' represents a light path of the light that reaches the point Fα' from the point α' after reflected from the center of the condensing mirror 21. A line K4α' represents a light path of the light (marginal light) that reaches the point Fα' from the point α' after reflected from the rim of the condensing mirror 21 on the opposite side of the point α' with respect to the optical axis. A point FX is an intersection between the light path K1α and the optical axis.

An optical system is designed hereinafter in that the infrared-ray-receiving element 3 receives only the infrared rays that pass through the opening of the probe 1.

The infrared-ray-receiving element 3 is attached to the light-proof body 22 in a manner that the infrared-ray-receiving element 3 receives only the infrared rays reflected from the condensing mirror 21. The design is made in the following manner upon obtaining a structure wherein only the infrared rays reflected from the condensing mirror 21 can make an entry.

It is desirable to avoid receiving the infrared rays radiated from the probe 1, in order to receive only the infrared rays radiated from the eardrum and/or vicinity of it and pass through the opening of the probe 1. For this purpose, a point is hypothesized at a boundary locating between a region where reception of lights is desired and the other region where reception of lights is not desired. The probe 1 is placed in a manner that it is located farther away from the optical axis than a light path of the light (marginal light) that travels from this hypothesized boundary point, which is reflected from the rim of the condensing mirror 21 on the same side as the hypothesized point with respect to the optical axis. The aforecited hypothesized points located on the boundary are designated as points α and α' where straight lines extending from the rim of the condensing mirror 21 to the probe 1 in tangent to an inner surface of the probe on the same side as the rim with respect to the optical axis intersect the plane at a tip of the probe 1. The infrared-ray-receiving element 3 is then mounted within a triangle formed by the image points Fα, Fα' and the point FX. The probe 1 is thus located farther from the optical axis than the light paths K1α and K1α' between the points α and the condensing mirror 21, so as to attain the optical system that does not receive lights from the probe 1.

Further details about the above will be described hereinafter. The lights radiated from the point α reach the image point Fα of the point α by passing through the light paths K1α, K2α, K3α, K4α, etc. As a known fact of the geometrical optics, the image point Fα of the point α is formed on the opposite side of the point α with respect to the optical axis. As shown in FIG. 8, the light that travels the light path K2α reaches the point Fα while departing away from the optical axis after being reflected from the condensing mirror 21 and crossing the optical axis at the focal point F. Likewise, the light that travels the light path K1α reaches the point Fα while departing away from the optical axis after being reflected from the condensing mirror 21 and crossing the optical axis. The light that travels the light path K3α reaches the point Fα while departing away from the optical axis after crossing the optical axis at the condensing mirror 21. The light that travels the light path K4α is reflected from the condensing mirror 21 after crossing the optical axis, and reaches the point Fα without crossing the optical axis after being reflected from the condensing mirror 21. As described, there is a region where the lights radiated from the point α do not pass through in an area farther from the condensing mirror 21 than the intersection FX of the light path K1α and the optical axis, but nearer to the condensing mirror 21 than the image point Fα. The same is true with the point α' that there is a region where the lights radiated from the point α' do not pass through in an area farther from the condensing mirror 21 than the intersection of the light path K1α' and the optical axis, but nearer to the condensing mirror 21 than the image point Fα'. The light receptor that does not receive the lights radiated from the points α and α' can be attained by positioning the infrared-ray-receiving element 3 within the triangle formed by the points Fα, Fα' and FX situated in the meridional plane of the optical condenser.

The light from an area farther from the optical axis than the light path K1α between the point α and the condensing mirror 21 is substituted by the light from a point farther in distance from the optical axis than the point α on the same plane with the point α. A known fact of the geometrical optics is that an image point of that point via the condensing mirror 21 stays farther away from the optical axis than the point Fα. For this reason, the lights from any point farther than the point α from the optical axis is not received, and therefore the light from the probe 1 is not received, if it is so designed as not to receive the light from the point α. Likewise, the light from an area farther from the optical axis than the light path K1α' between the point α' and the condensing mirror 21 is substituted by the light from a point farther in distance from the optical axis than the point α' on the same plane with the α'. By the known fact of the geometrical optics, an image point of that point via the condensing mirror 21 stays farther away from the optical axis than the point Fα'. For this same reason, the lights from any point farther than the point α' from the optical axis is not received, and therefore the light from the probe 1 is not received, if it is so designed as not to receive the light from the point α'.

Hence, if the infrared-ray-receiving element 3 is positioned within the triangle formed by the points Fα, Fα' and FX, so as not to receive the infrared rays radiated from the points α and α', the result is a structure that does not receive the infrared rays also from the probe 1 by its very nature.

A position of the infrared-ray-receiving element 3 where it does not receive the lights from the point α is obtained as follows.

The infrared-ray-receiving element 3 is located closer to the condensing mirror 21 than the point Fα. Therefore, the formula 1, and hence the formula 2, are derived, where: LαF is a distance from the center of the condensing mirror 21 to the image point Fα of the point α; f is a distance from the center of the condensing mirror 21 to the focal point F; and L3 is a distance from the focal point F to the infrared-ray-receiving element 3.

Since a light-receiving plane is situated between the intersection FX, where the light path K1α crosses the optical axis, and the point Fα, as shown in FIG. 8, a light path that gets closest to the infrared-ray-receiving element 3 on the light-receiving plane is the light path K1α among those paths between the points α and Fα. Therefore, the formula 3 needs to be satisfied in order for the infrared-ray-receiving element 3 not to receive the lights from the point α, where: rαS1 is a distance from an intersection FαS1 between the light path K1α and the light-receiving plane of the infrared-ray-receiving element 3 to the optical axis; and rs is a radius of the infrared-ray-receiving element 3. Also, if a radius of the condensing mirror 21 is given as r3, and a distance from the optical axis to the image point Fα is given as rαF, then the r3, rαF, rαS1, L3 and f satisfy a geometrical relation of the formula 4, as known by the geometrical optics, and therefore the formula 5. Then, the formula 6 is obtained by substituting the formula 5 for the formula 3. From the formulae 2 and 6, the formula 7 is derived as a condition for the infrared-ray-receiving element 3 not to receive lights radiated from the point α.

Furthermore, if a distance from the point α to the optical axis is given as rα, and a distance from the tip of the probe 1 to the center of the condensing mirror 21 is given as Lα, then the rα, Lα, rαF, and LαF satisfy a geometrical relation of the formula 8, as known by the geometrical optics, and therefore the formula 9. By substituting the formula 9 for the formula 7, the formula 10 is derived as a condition for the infrared-ray-receiving element 3 not to receive the lights radiated from the point α. Also, the formula 11 is derived by the Gauss's formula, and so is the formula 12. By substituting the formula 12 for the formula 10, the formula 13 is derived as a condition for the infrared-ray-receiving element 3 not to receive the lights radiated from the point α.

From the foregoing, it is desirable to design the optical system that satisfies the formulae 7, 10 or 13 in order for the infrared-ray-receiving element 3 not to receive the lights radiated from the point α at the tip of the probe 1. By positioning the infrared-ray-receiving element 3 away from the focal point of the condensing mirror 21 by the distance of L3 given by the formulae 7, 10 or 13, the infrared-ray-receiving element 3 is able to receive only the infrared rays radiated from the eardrum and/or vicinity of it and pass through the opening of the probe 1, while not receiving the infrared rays radiated from the probe 1.

SIXTH EXEMPLARY EMBODIMENT

Figure 9:
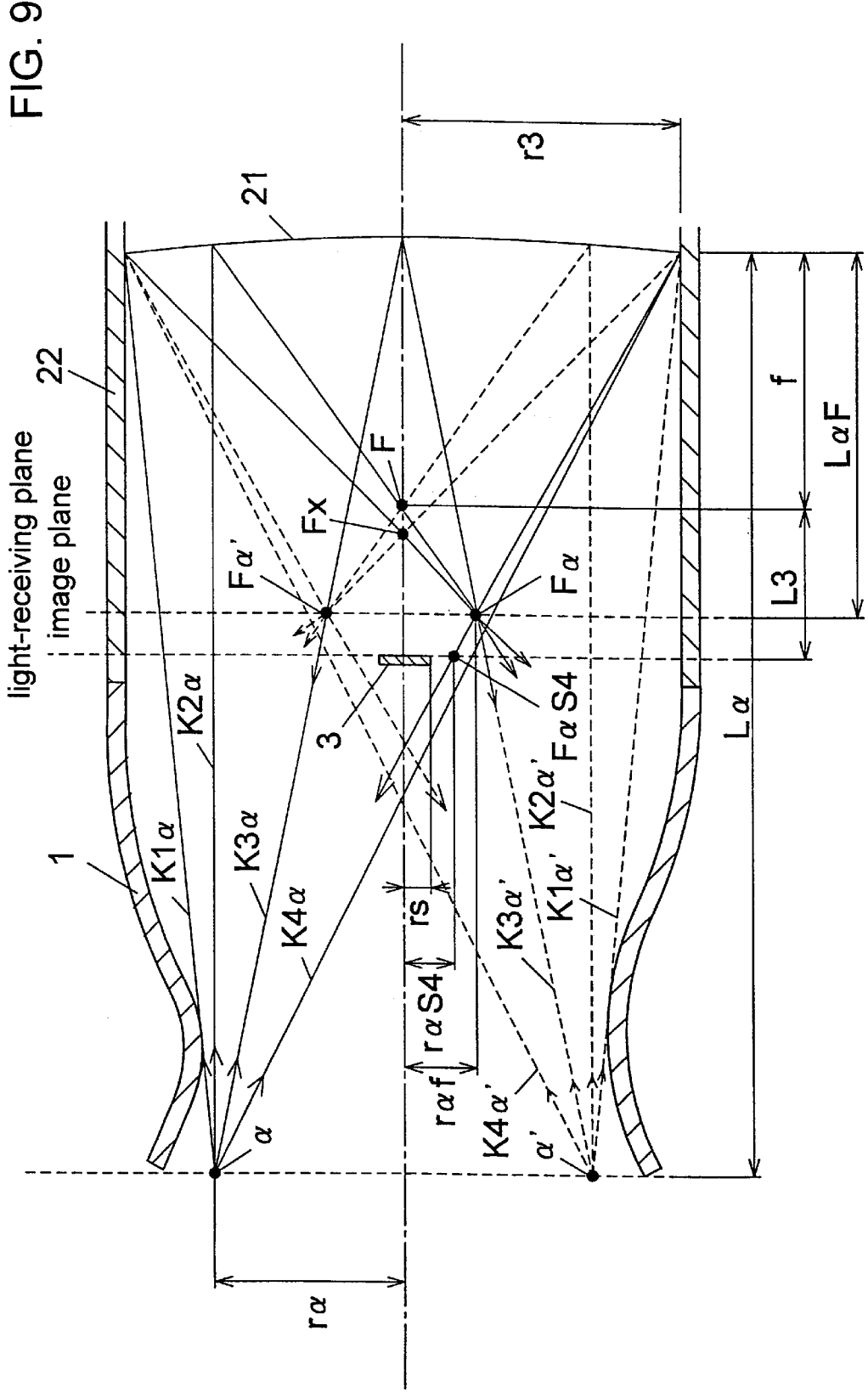
FIG. 9 is a cross sectional view depicting a structure of a light receptor and a probe in accordance with a sixth exemplary embodiment of the present invention.

A sixth exemplary embodiment of the present invention will be described now by referring to FIG. 9, which is a cross sectional view depicting a light receptor and a probe of a radiation thermometer of the sixth exemplary embodiment. In FIG. 9, points α and α' are hypothetical end points where straight lines drawn from a rim of a condensing mirror 21 in a manner to be tangent to an inner surface of the probe 1 on the same side as the rim with respect to the optical axis intersect a plane at a tip of the probe 1. A point F represents a focal point of the condensing mirror 21. Points Fα and Fα' represent image points of the points α and α' respectively via the condensing mirror 21. A line K1α represents a light path of the light (marginal light) that travels from the point α toward the point Fα after reflected from the rim of the condensing mirror 21 on the same side as the point α with respect to the optical axis. A line K2α represents a light path of the light that travels from the point α in parallel with the optical axis, and reaches the point Fα after passing through the focal point F. A line K3α represents a light path of the light that reaches the point Fα from the point α after reflected from a center of the condensing mirror 21. A line K4α represents a light path of the light (marginal light) that reaches the point Fα from the point α after reflected from the rim of the condensing mirror 21 on the opposite side of the point α with respect to the optical axis. A line K1α' represents a light path of the light (marginal light) that travels from the point α' toward the point Fα' after reflected from the rim of the condensing mirror 21 on the same side as the point α' with respect to the optical axis. A line K2α' represents a light path of the light that travels from the point α' in parallel with the optical axis, and reaches the point Fα' after passing through the focal point F. A line K3α' represents a light path of the light that reaches the point Fα' from the point α' after reflected from the center of the condensing mirror 21. A line K4α' represents a light path of the light (marginal light) that reaches the point Fα' from the point α' after reflected from the rim of the condensing mirror 21 on the opposite side of the point α' with respect to the optical axis. A point FX is an intersection between the light path K1α and the optical axis.

An optical system is designed hereinafter in that the infrared-ray-receiving element 3 receives only the infrared rays that pass through the opening of the probe 1.

The infrared-ray-receiving element 3 is attached to the light-proof body 22 in a manner that the infrared-ray-receiving element 3 receives only the infrared rays reflected from the condensing mirror 21. The design is made in the following manner upon obtaining a structure wherein only the infrared rays that are reflected from the condensing mirror 21 make an entry.

It is desirable to avoid receiving the infrared rays radiated from the probe 1, in order to receive only the infrared rays radiated from the eardrum and/or vicinity of it and pass through the opening of the probe 1. For this purpose, a point is hypothesized at a boundary locating between a region where reception of lights is desired and the other region where reception of lights is not desired. The probe 1 is placed in a manner that it is located farther away from the optical axis than a light path of the light (marginal light) that travels from this hypothesized boundary point, and is reflected from the rim of the condensing mirror 21 on the same side as the hypothesized point with respect to the optical axis. The aforecited hypothesized points located on the boundary are designated as points α and α' where straight lines extending from the rim of the condensing mirror 21 to the probe 1 in tangent to an inner surface of the probe on the same side as the rim with respect to the optical axis intersect the plane at a tip of the probe 1. The infrared-ray-receiving element 3 is then mounted within a region lying between the light paths K4α and K4α' in an area farther from the condensing mirror 21 than the image points Fα and Fα'. The probe 1 is thus located farther from the optical axis than the light paths K1α and K1α' between the points α and the condensing mirror 21, so as to attain the optical system that does not receive lights from the probe 1.

Further details about the above will be described hereinafter.

The lights radiated from the point α reach the image point Fα of the point α by passing through the light paths K1α, K2α, K3α, K4α, etc. As a known fact of the geometrical optics, the image point Fα of the point α is formed on the opposite side of the point α with respect to the optical axis. As shown in FIG. 9, the light that travels the light path K2α reaches the point Fα while departing away from the optical axis after being reflected from the condensing mirror 21 and crossing the optical axis at the focal point F. Likewise, the light that travels the light path K1α reaches the point Fα while departing away from the optical axis after being reflected from the condensing mirror 21 and crossing the optical axis. The light that travels the light path K3α reaches the point Fα after crossing the optical axis at the condensing mirror 21, and departs away from the optical axis. The light that travels the light path K4α is reflected from the condensing mirror 21 after crossing the optical axis, and reaches the point Fα without crossing the optical axis after being reflected from the condensing mirror 21, and it then either approaches to or departs from the optical axis. As described, there is a region where the lights radiated from the point α do not pass through in an area farther from the condensing mirror 21 than the image point Fα of the point α. The same is true with the point α' that there is a region where the lights radiated from the point α' do not pass through in an area farther from the condensing mirror 21 than the image point Fα' of the point α'. The light receptor that does not receive the lights radiated from the points α and α' can be derived by positioning the infrared-ray-receiving element 3 within the region lying between the light paths K4α and K4α' in an area farther from the condensing mirror 21 than the image points Fα and Fα'.

The light from an area farther from the optical axis than the light path K1α between the point α and the condensing mirror 21 can be substituted by the light from a point farther in distance from the optical axis than the point α on the same plane with the point α. A known fact of the geometrical optics is that an image point of that point via the condensing mirror 21 stays farther away from the optical axis than the point Fα. For this reason, the lights from any point farther than the point α from the optical axis is not received, and therefore the light from the probe 1 is not received, if it is so designed as not to receive the light from the point α. Likewise, the light from an area farther from the optical axis than the light path K1α' between the point α' and the condensing mirror 21 can be substituted by the light from a point farther in distance from the optical axis than the point α' on the same plane with the α'. By the known fact of the geometrical optics, an image point of that point via the condensing mirror 21 stays farther away from the optical axis than the point Fα'. For this same reason, the lights from any point farther than the point α' from the optical axis is not received, and therefore the light from the probe 1 is not received, if it is so designed as not to receive the light from the point α'.

Hence, if the infrared-ray-receiving element 3 is positioned within the region lying between the light paths K4α and K4α' in an area farther from the condensing mirror 21 than the image points Fα and Fα', so as not to receive the infrared rays radiated from the points α and α', the result is a structure that does not receive the infrared rays also from the probe 1 by its very nature.

A position of the infrared-ray-receiving element 3 where it does not receive the lights from the point α is obtained as follows.

The infrared-ray-receiving element 3 is located farther from the condensing mirror 21 than the point Fα. Therefore, the formula 14, and hence the formula 15, are derived, where: LαF is a distance from the center of the condensing mirror 21 to the image point Fα of the point α; f is a distance from the center of the condensing mirror 21 to the focal point F; and L3 is a distance from the focal point F to the infrared-ray-receiving element 3.

Since a light-receiving plane is situated farther away from the condensing mirror 21 than the point Fα, as shown in FIG. 9, a light path that gets closest to the infrared-ray-receiving element 3 on the light-receiving plane is the light path K4α among those paths between the points α and Fα. Therefore, the formula 16 needs to be satisfied in order for the infrared-ray-receiving element 3 not to receive the lights from the point α. In the formula 16, rαS4 is a distance from an intersection FαS4 between the light path K4α and the light-receiving plane of the infrared-ray-receiving element 3 to the optical axis; and rs is a radius of the infrared-ray-receiving element 3. Also, if a radius of the condensing mirror 21 is given as r3, and a distance from the optical axis to the image point Fα is given as rαF, then the r3, rαF, LαF, rαS4, L3 and f satisfy a geometrical relation of the formula 17, as known by the geometrical optics, and therefore the formula 18 is obtained. Then, the formula 19 is obtained by substituting the formula 18 for the formula 16. From the formulae 15 and 19, the formula 20 is derived as a condition for the infrared-ray-receiving element 3 not to receive lights radiated from the point α.

Furthermore, if a distance from the point α to the optical axis is given as rα, and a distance from the tip of the probe 1 to the center of the condensing mirror 21 is given as Lα, then the rα, Lα, rαF, and LαF satisfy a geometrical relation of the formula 8, as known by the geometrical optics, therefore the formula 9 is satisfied. By substituting the formula 9 for the formula 20, the formula 21 is derived as a condition for the infrared-ray-receiving element 3 not to receive the lights radiated from the point α. Also, the formula 11 is derived by the Gauss's formula, and so is the formula 12. By substituting the formula 12 for the formula 21, the formula 22 is derived as a condition for the infrared-ray-receiving element 3 not to receive the lights radiated from the point α.

From the foregoing, it is desirable to design an optical system that satisfies the formulae 20, 21 or 22 in order for the infrared-ray-receiving element 3 not to receive the lights radiated from the point α. By positioning the infrared-ray-receiving element 3 away from the focal point of the condensing mirror 21 by the distance of L3 given by the formulae 20, 21 or 22, the infrared-ray-receiving element 3 is able to receive only the infrared rays radiated from the eardrum and/or vicinity of it and passing through the opening of the probe 1, while not receiving the infrared rays radiated from the probe 1.

SEVENTH EXEMPLARY EMBODIMENT

Figure 10:
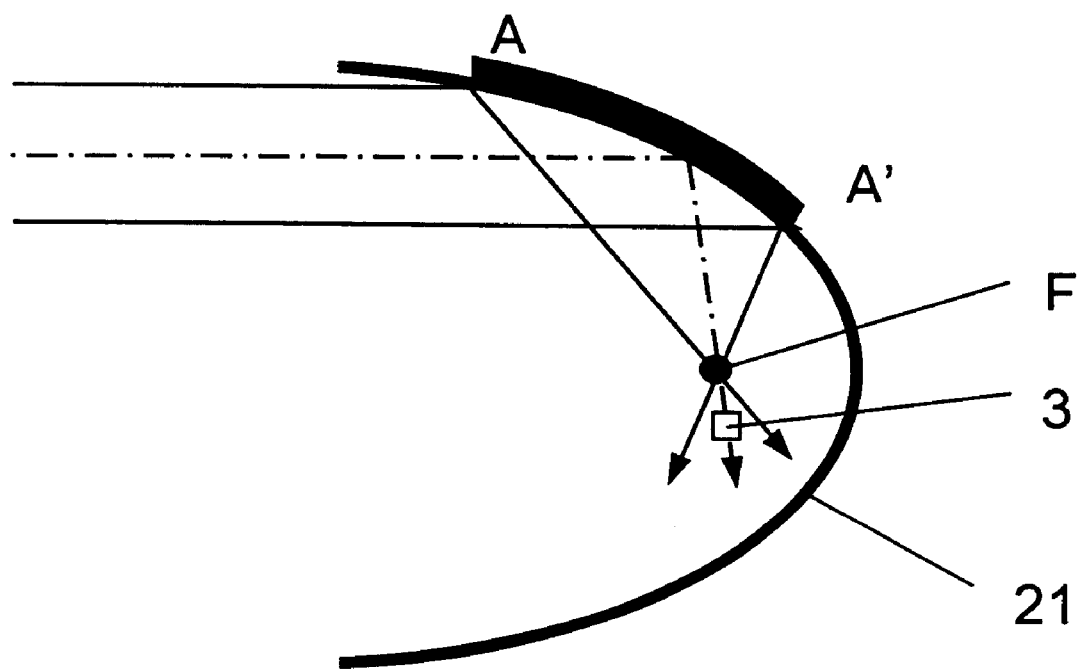
FIG. 10 depicts a structural drawing of an optical condenser in accordance with a seventh exemplary embodiment of the present invention.

A seventh exemplary embodiment of the present invention will be described now by referring to FIG. 10. FIG. 10 depicts an example wherein a first optical axis incident upon a condensing mirror is deflected into a second optical axis exiting from the condensing mirror by reflection, in the case that utilizes the condensing mirror as an optical condenser. A concave mirror as represented by a numeral 21 is used for the optical condenser, of which focal point lies at a point F. If only a part of the concave mirror, which is shown by a bold line A–A', is taken for use as the condensing mirror, an optical axis traveling through a center of this space can be deflected as depicted by a dot-dash line. In this example, an infrared-ray-receiving element 3 may be positioned in a region rearward of the focal point F of the condensing mirror 21, as has been described in detail in the previous exemplary embodiments.

It is preferable to form a bent angle of approximately 115 degrees between a probe 1 and a main body 13, as shown in FIG. 1, when ease of handling is considered. This is because the angle of approx. 115 degrees allows a natural position of a hand for taking a temperature measurement by holding the main body 13 with the hand, when inserting the probe 1 into an ear canal. Accordingly, the structure shown in FIG. 10, in which the optical axis is deflected at approximately 115 degrees, facilitates the main body 13 to house the light receptor. Also, the natural position of the hand can help keeping a direction stable for inserting the probe into the ear canal when taking a measurement, and improves the measuring accuracy of body temperature.

In the foregoing fifth through the seventh exemplary embodiments, material of the condensing mirror 21 needs not be infrared transparent, unlike the refractive lens of the first through the fourth embodiments. For example, polypropylene or polycarbonate is used for material of the condensing mirror 21, and its surface is covered with metal by vapor deposition or plating. Among some of the physical properties, the polypropylene has a thermal conductivity "λ" of 0.12 J/msK and a thermal capacity of $1.76 \times 10^6$ J/kgK. Likewise, polycarbonate has a thermal conductivity "λ" of 0.19 J/msK and a thermal capacity of $1.51 \times 10^6$ J/kgK. These values for both materials are as quite small as those of the polyethylene described in the exemplary embodiments of the refractive lens.

The foregoing structure enables the infrared-ray-receiving element 3 to receive only the infrared rays from the eardrum and/or vicinity of it, without receiving the infrared rays radiated by the probe 1. Thus, the optical condenser 21 is not likely to receive any influence of the heat transferred from the subject being measured, and the optical system does not require a high thermal conductivity. Since the optical condenser has small thermal capacity and low thermal conductivity, the structure can detect accurate temperatures without being influenced by condensation, as in the case of the refractive lens, even if the temperature changes.

In the foregoing, material for the condensing mirror is not limited to polypropylene, polycarbonate and polyethylene.

What has been described in the above is an example utilizing a condensing mirror for the optical condenser of the light receptor, it has an effect of increasing an amount of the light it receives due to no transmission loss as compared to those utilizing the refractive lens. Also, the infrared-ray-receiving element 3 can receive only the infrared rays radiated from the eardrum and/or vicinity of it and passing through the opening of the probe 1 by utilizing a reflection type diffraction lens and disposing the infrared-ray-receiving element 3 in the same manner. It also offers an advantage of producing the mirror easily.

In each of the previous exemplary embodiments, the infrared rays from an inner surface of the probe 1 transmitted through or reflected at the optical condenser 21 and not entering into the infrared-ray-receiving element 3 enter into a light-proof body 22, instead. Since an inner surface of the light-proof body 22 is provided with reflection-suppressing means, the infrared rays incident on it are not reflected to enter into the infrared-ray-receiving element 3. Therefore, the infrared rays radiated from the probe 1, which can be a cause of measuring errors, are reliably prevented from entering into the infrared-ray-receiving element 3, so as to achieve accurate measurements.

Synthetic resins such as PC, PPS, PBT, PP, etc. are utilized for material of the light-proof body 22. It is generally known that these materials have high values of emissivity in the neighborhood of 0.9. While the infrared rays incident on an object are distributed into a reflected portion, an absorbed portion and a transmitted portion, a sum of the reflected portion and the absorbed portion becomes 1, in the case of zero transmission. Since an emissivity and absorptivity are equal according to the Kirchhoff's laws, it may be said that synthetic resins of a high emissivity has a low reflectivity, as the result. Therefore, by constructing a light-proof body 22 with any of those synthetic resins, the light-proof body 22 itself can serve as the reflection suppressing means, so as to avoid unwanted infrared rays travelling toward an area other than the infrared-ray-receiving element 3 from entering into the infrared-ray-receiving element 3 by being reflected from the light-proof body 22. Thus, it restricts a light-receiving region, and perfects the function of blocking an entry of unwanted infrared rays from the probe 1.

Furthermore, the light-proof body 22 needs to be designed with a thickness large enough for the infrared rays not to path through while using synthetic resin of a small transmissivity for the infrared rays, as a matter of course. The light-proof body 22 made of synthetic resin can also reduce a likeliness of generating condensation on the light-proof body 22 for the same principle as the optical condenser. If the light-proof body 22 is made of metal, the condensation generated on the light-proof body 22 may transfer and stay on the optical condenser 21, resulting in a possibility of reducing the light condensing capability. There is also a possibility that the condensation generated on the light-proof body 22 cause the infrared rays radiated from the probe 1 to enter into the infrared-ray-receiving element 3 due to diffusion. These problems do not take place with the light-proof body 22 of synthetic resin, since it does not generate condensation.

Moreover, in the above described arrangement of the optical condenser 21 and the light-receiving element 3, it is possible to alter a shape of the probe within an extent that the infrared rays radiated from the probe 1 do not enter into the infrared-ray-receiving element 3. A plurality of the probes in variety of diameters can be provided, besides the differences in the longitudinal direction as depicted in FIGS. 3A through 3D. It is advantageous to prepare probes adapted for infants by reducing the diameter, especially if the longitudinal direction is shortened while maintaining the same arrangement of the optical condenser and the light-receiving element.

In each of the foregoing exemplary embodiments, the structures are usable just as they are, if the infrared-ray-receiving element 3 is a radiation thermopile type, whose output correlates to temperature difference between itself and the subject being measured. The structures require only a chopper for forcibly changing the incident infrared rays, if the infrared-ray-receiving element 3 is a pyroelectric type, whose output correlates to temperature change of the subject being measured. A structure of the chopper, which is required for the infrared-ray-receiving element 3 of the pyroelectric type, will be described hereinafter according to the following exemplary embodiment.

EIGHTH EXEMPLARY EMBODIMENT

Figure 11:
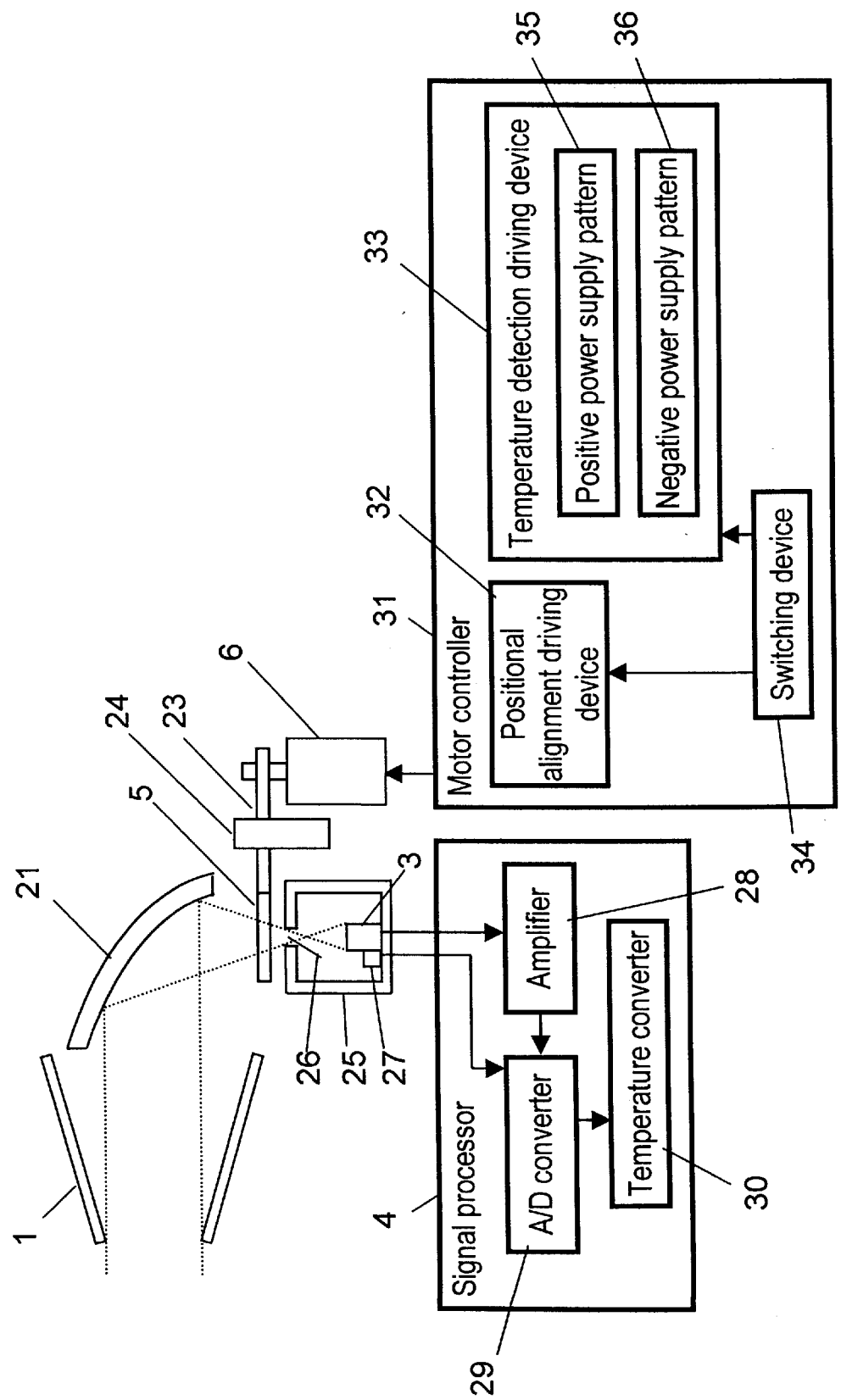
FIG. 11 depicts a structure and block diagram of a radiation thermometer in accordance with an eighth exemplary embodiment of the present invention.
Figure 12:
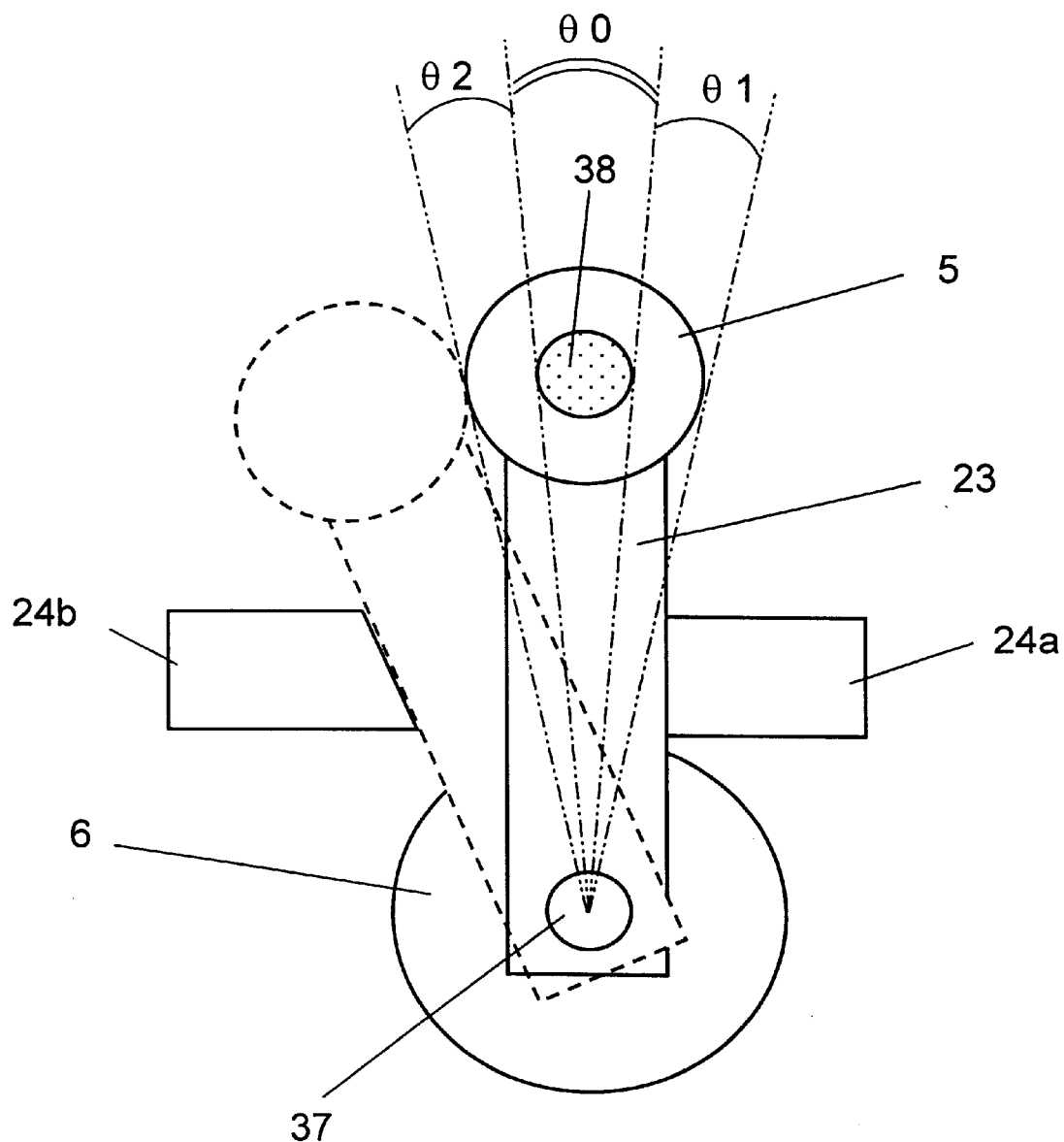
FIG. 12 is an enlarged fragmentary view of a chopper and its vicinity in accordance with the same exemplary embodiment.
Figure 13:
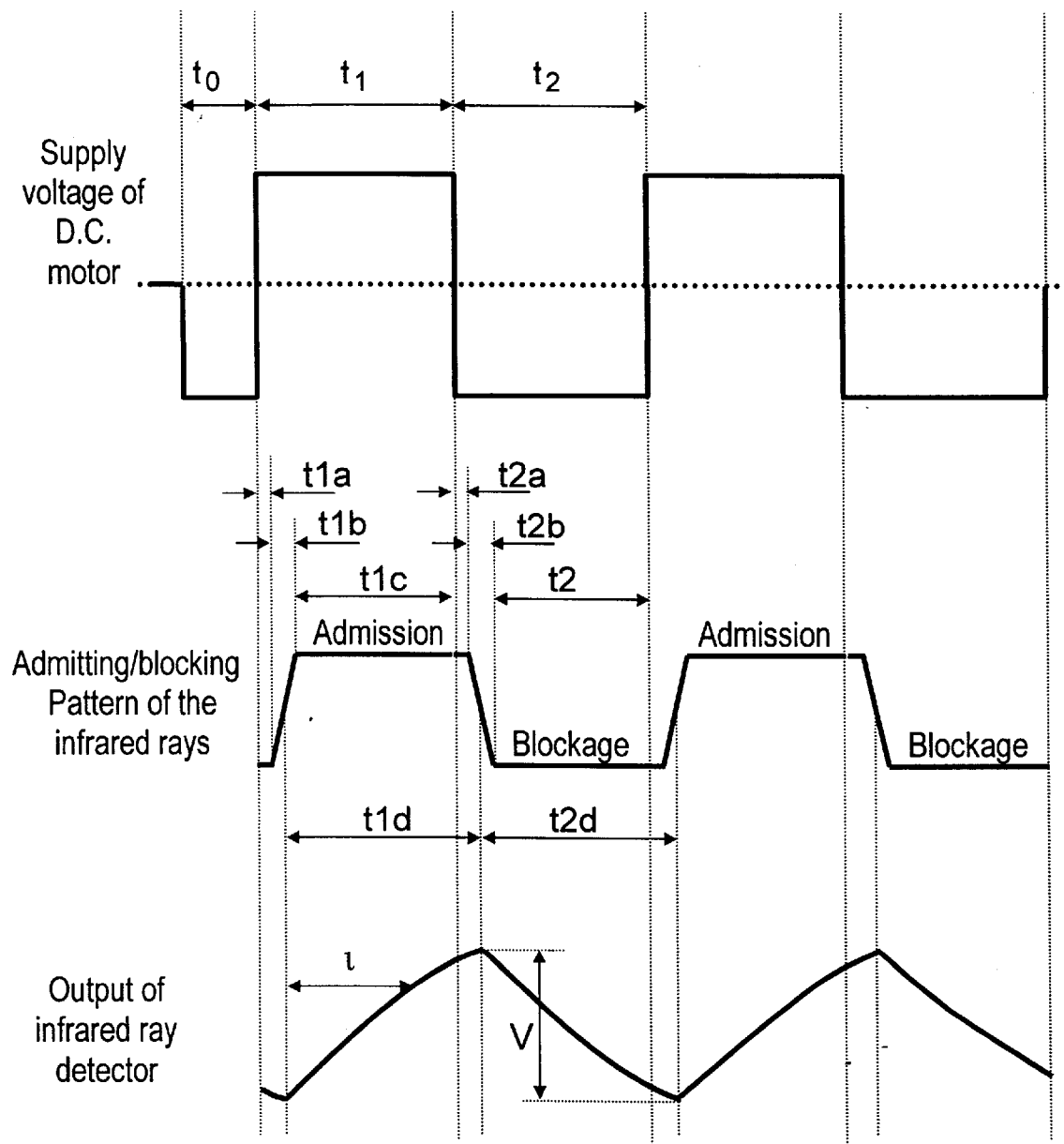
FIG. 13 is a timing cart showing a power supply pattern of a D.C. motor in accordance with the same exemplary embodiment.
Figure 14:
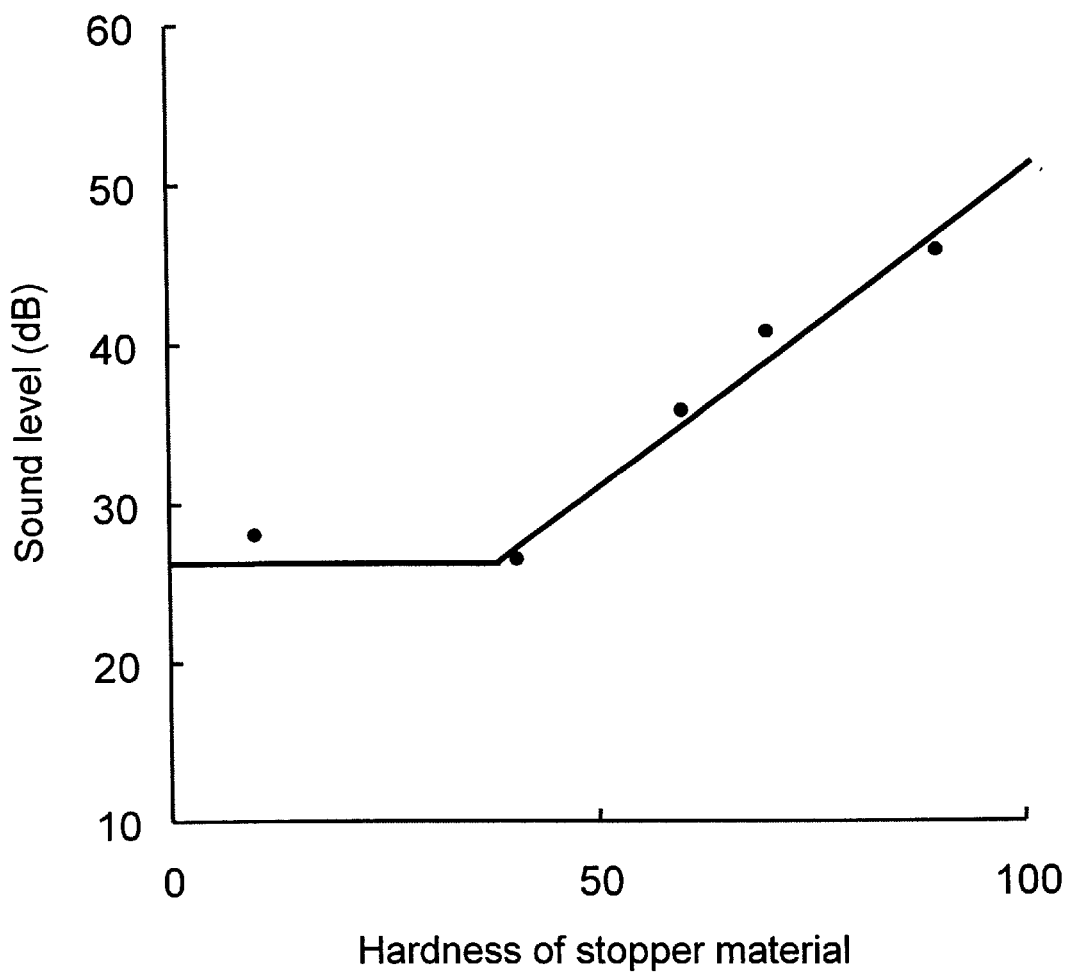
FIG. 14 is a graph showing a characteristic of sound generated when a chopper is driven in accordance with the same exemplary embodiment.

An eighth exemplary embodiment of the present invention will be described now by referring to FIG. 11 through FIG. 14. FIG. 11 shows a structure and block diagram of a radiation thermometer of the eighth exemplary embodiment of the present invention. FIG. 12 shows an enlarged fragmentary view of a chopper and its vicinity. FIG. 13 is a timing cart showing a power supply pattern for a D.C. motor. FIG. 14 is a graph showing a characteristic of sound generated when the chopper is driven.

The chopper 5 attached to the D.C. motor 6 via a joint 23 has a mirror surface facing toward an infrared-ray-receiving element 3. The chopper 5 repeats switching of the infrared rays travelling through the infrared-ray-receiving element 3 between a light-admitting mode and a light-blocking mode via the joint 23, which is driven by the D.C. motor 6 for a reciprocal rotary motion while striking a stopper 24. The infrared-ray-receiving element 3 is a pyroelectric type, an output of which changes in relation to a differential value of an amount of the infrared rays detected by it. A view-restricting means 25 provided between the chopper 5 and the infrared-ray-receiving element 3 has a small hole 26 for the infrared rays to pass through, and it constitutes a light-proof body provided with a black body at least on its interior surface.

In the foregoing structure, the infrared rays that pass through the small hole 26 and enter into the infrared-ray-receiving element 3 are only those that pass through an opening at a tip of the probe 1 and reflected at the optical condenser 21, as shown by dotted lines in FIG. 11, when the chopper 5 is in the light-admitting position. Any infrared rays radiated by parts other than the optical condenser 21, for instance, and pass through the small hole 26 are absorbed by the black body on the interior surface of the view-restricting means 25, so as not to enter into the infrared-ray-receiving element 3. Therefore, the view-restricting means 25 restricts a field of view for the infrared rays incident upon the infrared-ray-receiving element 3. In addition, the structure constituting the black body on the interior surface of the view-restricting means 25 can reduce size of the chopper 5, since it can reliably restrict a field of view of the infrared-ray-receiving element 3.

On the other hand, when the chopper 5 is in the light-blocking position, the infrared rays radiated by the infrared-ray-receiving element 3 itself enter into the infrared-ray-receiving element 3 after being reflected from the mirror surface of the chopper 5 and passing through the small hole 26 in the view-restricting means 25. The infrared rays radiated upon the interior surface of the view-restricting means 25 always enter into the infrared-ray-receiving element 3 regardless to change in position of the chopper between the light-admitting position and the light-blocking position, an output of the infrared-ray-receiving element 3 due to the infrared rays radiated upon the interior surface of the view-restricting means 25 is offset. Hence, the infrared-ray-receiving element 3 delivers an output in a magnitude that correlates to a difference in temperatures between the eardrum and/or vicinity of it and the infrared-ray-receiving element 3 by the interrupting motion of the chopper 5.

A temperature sensor 27 is also provided near the infrared-ray-receiving element 3 for detecting temperature of the infrared-ray-receiving element 3. A commonly known thermocouple is used for the temperature sensor 27. Outputs of the infrared-ray-receiving element 3 and the temperature sensor 27 are converted into temperature by a signal processor 4, wherein the output of the infrared-ray-receiving element 3 is amplified by an amplifier 28, and an output voltage of the amplifier 28 and an output voltage of the temperature sensor 27 are digitized by an A/D converter 29. A temperature calculator 30 converts into a temperature of the eardrum and/or vicinity of it based on an output of the A/D converter 29. The output of the infrared-ray-receiving element 3 is in a form of alternating wave due to the interrupting motion of the chopper 5, and an amplitude of it is proportional to a difference between the temperature of the eardrum and/or vicinity of it and the temperature of the infrared-ray-receiving element 3 raised to the fourth power. The temperature calculator 30 executes the temperature conversion for temperature of the eardrum and/or vicinity of it based on the above correlation.

A motor controller 31 controls motion of the D. C. motor 6. The motor controller 31 comprises (1) a position aligning driver 32 for aligning a position of the chopper 5 by driving the D.C. motor 6, (2) a temperature detecting driver 33 for alternately reversing a rotational direction of the D.C. motor 6 when detecting a temperature, and (3) a switching device 34 for switching the position aligning driver 32 and the temperature detecting driver 33. The temperature detecting driver 33 further includes a positive power supply pattern 35 for switching from the light-blocking mode to the light-admitting mode, and a negative power supply pattern 36 for switching from the light-admitting mode to the light-blocking mode.

Referring to FIG. 12, a structure of the chopper portion will now be described in detail. In FIG. 12, the chopper 5 is depicted in its rest position for the light-blocking mode by a solid line, and in its rest position for the light-admitting mode by a dashed line. The chopper 5 in a circular shape for blocking the infrared rays is fixed to a shaft 37 of the D. C. motor 6 with the joint 23. A numeral 38 represents a field of view restricted by the view-restricting means 25 for the infrared-ray-receiving element 3 in the light-blocking mode, and the chopper 5 is constructed to be greater than the field of view 38. The chopper 5 in the circular shape can reduce its size since there are no corners. The difference in an amount of the infrared rays incident on the infrared-ray-receiving element 3 between the light-admitting mode and the light-blocking mode can be increased by further enlarging the chopper 5 against the field of view 38. In a word, it increases amplitude of the alternating wave output of the infrared-ray-receiving element 3, so as to improve the S/N ratio, resulting in the improved detecting accuracy of temperatures.

The stopper 24 comprises a light-blocking side barrier 24a for the joint 23 to contact when the chopper 5 stops at its light-blocking position, and a light-admitting side barrier 24b when the stopper 5 stops at its light-admitting position. The light-blocking side barrier 24a and the light-admitting side barrier 24b are positioned in a manner that an angle $\theta_1$ for the chopper 5 to move from a rest position in the light-blocking mode to a position where the light begins to be admitted becomes equal to an angle $\theta_2$ for the chopper 5 to move from a rest position in the light-admitting mode to a position where the light begins to be blocked. When the D. C. motor 6 repeats the forward rotation and the reverse rotation in the above structure, the chopper 5 stops by striking the light-blocking side barrier 24a and the light-admitting side barrier 24b of the stopper 24.

A concrete operation of the motor controller 31 will be described next by referring to FIG. 13. In FIG. 13, which depicts a wave form of the supply voltage for the D. C. motor 6, the switching device 34 first operates the position aligning driver 32 for aligning a position of the chopper 5, at the start of a temperature measurement. In other words, the position aligning driver 32 rotates the chopper 5 into a direction of the light-blocking position depicted in FIG. 12 by supplying power to the D. C. motor 6 for a period of time $t_0$ at the start of temperature measurement, as shown in FIG. 13. The time $t_0$ is determined to be longer than a time necessary for the chopper 5 to move from the resting position (dashed line) in the light-admitting mode to the stop position (solid line) in the light-blocking mode for the infrared rays. In this way, the chopper 5 can always be stopped at the light-blocking position by striking it to the light-blocking side barrier 24a for a proper alignment, even if the chopper 5 is resting at any position between the light-blocking side barrier 24a and the light-admitting side barrier 24b before the start of a temperature measurement.

After the positional alignment of the chopper 5 is carried out, the switching device 34 switches to the temperature detecting driver 33. The temperature detecting driver 33 drives the chopper 5 by supplying power to the D. C. motor 6, as shown in FIG. 13 in order to detect temperature.

A period of $t_1$ is a time for supplying a positive power supply in order to drive the chopper 5 toward the light-admitting position and maintain it in the same position, and the power is supplied according to the positive power supply pattern 35. A period of $t_2$ is a time for supplying a negative power supply in order to drive the chopper 5 toward the light-blocking position and maintain it in the same position, and the power is supplied according to the negative power supply pattern 36.

The positive power supply period $t_1$ and the negative power supply period $t_2$ are equal in time, so that the temperature detecting driver 33 reverses the rotational direction of the D. C. motor 6 alternately at regular intervals. Thus the light-admitting mode and the light-blocking mode for the infrared rays are repeated by driving the chopper 5 as shown in FIG. 13. A $t_{1a}$ is a period of time for the chopper 5 to move the angle $\theta_0$ from the rest position in the light-blocking mode to the position where the light begins to be admitted. A $t_{1b}$ is a time for the chopper 5 to move the angle $\theta_0$ from the position where the light begins to be admitted to the complete light-admitting position, as shown in FIG. 12. A period $t_{1c}$ is a time for the chopper 5 to stay still after it moves and strikes the light-admitting side barrier 24b of the stopper 24. Similarly, a period $t_{2a}$ is a time for the chopper 5 to move the angle $\theta_2$ from the rest position in the light-admitting mode to the position where the light begins to be blocked, and a period $t_{2b}$ is a time to move the angle $\theta_0$ from the position where the light begins to be blocked to the complete light-blocking position. A period $t_{2c}$ is a time for the chopper 5 to stay still after it moves and strikes the light-blocking side barrier 24a of the stopper 24.

The periods $t_{1a}$ and $t_{2a}$ are equal because the stopper 24 is provided in a manner to make the angles $\theta_1$ and $\theta_2$ equal. Furthermore, since the periods $t_{1b}$ and $t_{2b}$, which are the time to move the angle $\theta_0$, are equal, and also the periods $t_1$ and $t_2$ are controlled to be equal, the light-admitting time $t_{1d}$ and the light-blocking time $t_{2d}$ for the infrared rays become equal.

By interrupting admission of the light at a precise duty of 50%, a large sensitivity for the output (amplitude V) of the infrared-ray-receiving element 3 is attained. There is a characteristic that the output sensitivity is limited by the shorter of the light-admitting time and the light-blocking time, if they are not equal in a period wherein the period is short such that the output of the infrared-ray-receiving element 3 changes transitionally. Therefore, the output sensitivity can be obtained most efficiently, and highly accurate temperature detection is attainable by equalizing the light-admitting time and the light-blocking time.

Also, since the stopper 24 is composed of a shock absorbing material for absorbing an impact of the joint 23 striking against it, it prevents the joint 23 from deforming and the like, and improves reliability and durability. Especially, in the case of composing the stopper 24 with a soft rubber material, it alleviates sound generated at an impact, which is effective for the radiation thermometer that measures temperature by inserting it in the ear. A characteristic of the sound produced in relation to hardness of the rubber material used for the stopper 24 is shown in FIG. 14. It is a result of experiment, in which sound levels are measured at a position 10 mm away from a tip of the probe 1 of the foregoing structure. Hardness of the rubber material is measured with a hardness tester specified by JIS K6301 standard. Although a better effect of sound reduction is observed as the stopper material gets softer, as shown in the figure, the sound level does not decrease beyond a certain level even though the impact noise is reduced, since sound produced by rotation of the D. C. motor 6 itself surpasses it. FIG. 14 suggests a desired rubber material as to be one having a hardness of about HS40. If a soft rubber material is used, a surface treatment such as application of powdery material may be desirable in order to avoid a possibility of malfunction of the chopper 5 due to stickiness.

As described, the light-admitting mode and the light-blocking mode of the infrared rays are repeated as shown in FIG. 13 according to the power supply pattern that repeats the positive power supply pattern 35 and the negative power supply pattern 36 alternately. The slanting straight lines in the figure indicate the transitional state in which the infrared rays are switched from the light-admitting mode to the light-blocking mode or from the light-blocking mode to the light-admitting mode. The horizontal straight lines indicate complete positions for the light-admitting mode or the light-blocking mode. An output of the infrared-ray-receiving element 3 during these periods configures an alternating wave as shown in FIG. 13. The difference (amplitude V) between a peak value in the light-admitting mode and a peak value in the light-blocking mode is in a value proportional to a difference between the temperature of the eardrum and/or vicinity of it and the temperature of the infrared-ray-receiving element 3 itself raised to the fourth power.

The time period $t_1$ for switching between the light-admitting mode and the light-blocking mode, or the time for alternately reversing the rotational direction of the D. C. motor 6, is set to be longer than a responding time constant "τ" of the infrared-ray-receiving element 3. In this way, the infrared-ray-receiving element 3 produces a high output, which helps lowering an amplification factor of the amplifier 28, so as to reduce an effect of the noise, thereby improving the accuracy of temperature measurements.

The temperature detecting driver 33 alternately repeats the continuous power supply of the positive power supply pattern 35 and the negative power supply pattern 36 for reversing the D. C. motor 6 alternately, so as to switch the chopper 5 between the light-admitting position and the light-blocking position. This stabilizes the light-admitting time and the light-blocking time, and alleviate staggering of the chopper in its stop position, thereby enabling a steady switching between the light-admitting mode and the light-blocking mode even with a significantly small chopper, and detecting accurate temperature with the reduced size.

NINTH EXEMPLARY EMBODIMENT

Figure 15:
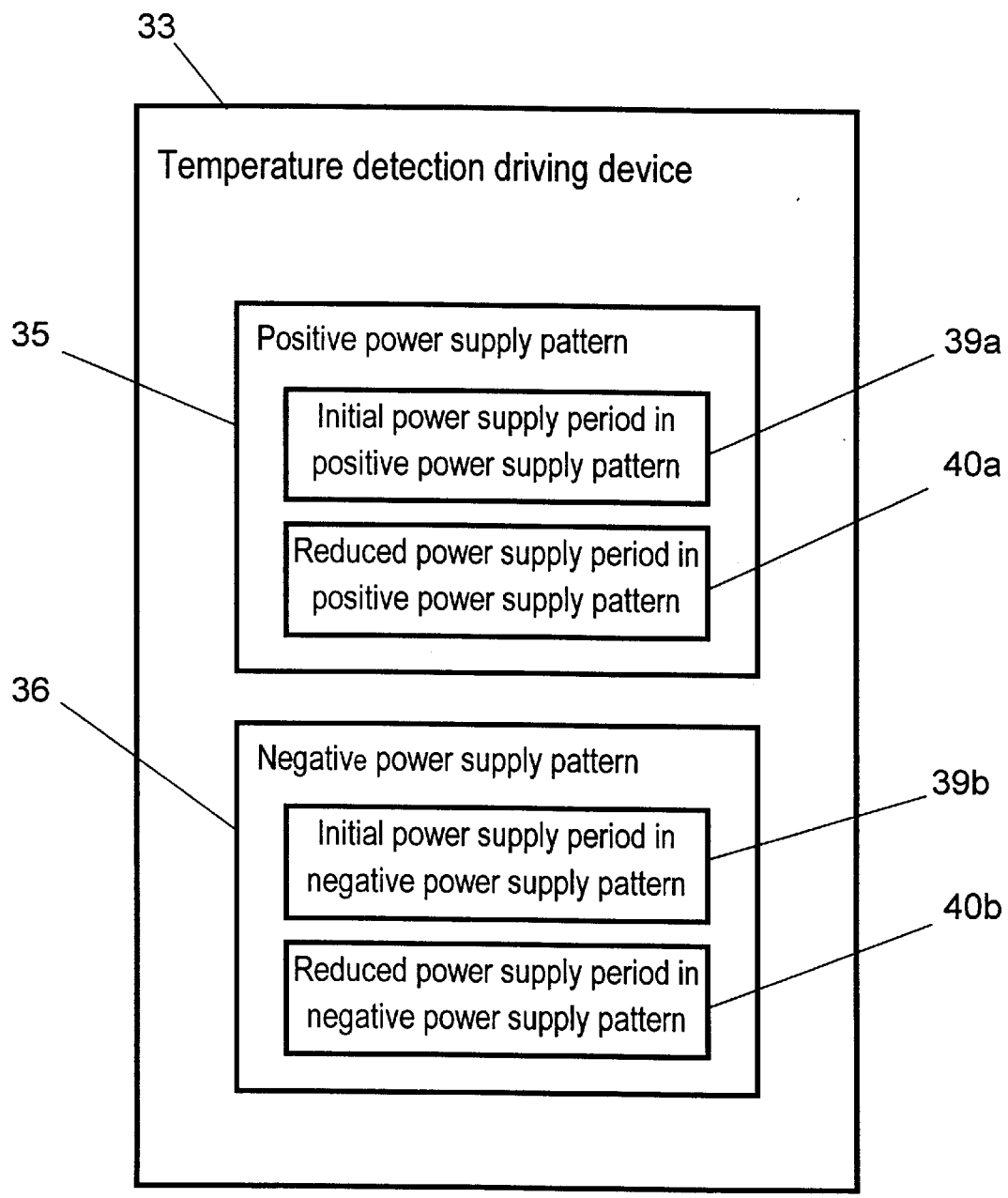
FIG. 15 is a block diagram constituting a temperature detecting driver in accordance with a ninth exemplary embodiment of the present invention.
Figure 16:
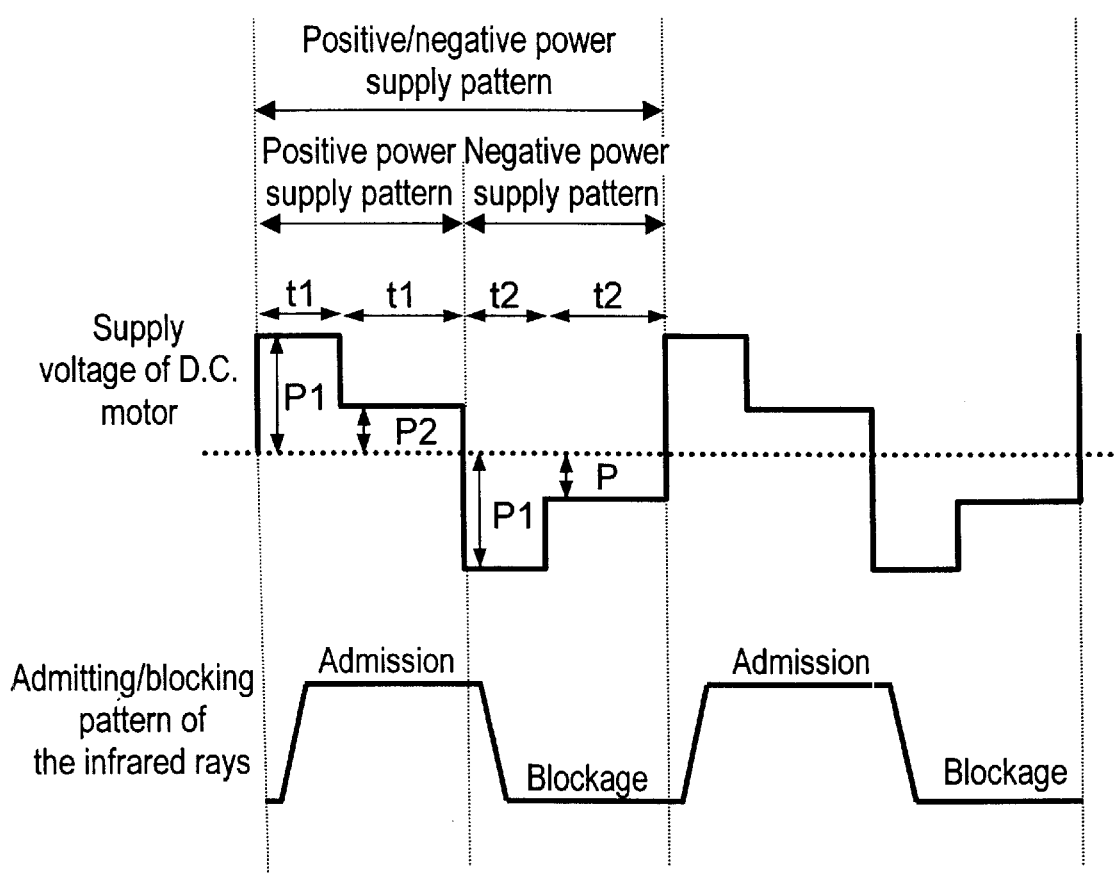
FIG. 16 is a timing chart showing a power supply pattern of a D.C. motor in accordance with the same exemplary embodiment.

An exemplary embodiment, in which a positive power supply pattern by a temperature detecting driver is different from the foregoing exemplary embodiment, will be described next by referring to FIG. 15 and FIG. 16. FIG. 15 depicts a block diagram of the temperature detecting driver of the present exemplary embodiment, and FIG. 16 is a timing chart showing a power supply pattern for a D. C. motor.

In FIG. 15, the temperature detecting driver 33 repeats alternately the positive power supply pattern 35 for supplying power in a light-admitting direction and the negative power supply pattern 36 for supplying power in a light-blocking direction. The positive power supply pattern 35 comprises an initial power supply period 39a for supplying power in the beginning, and a reduced power supply period 40a for supplying a reduced power thereafter. The negative power supply pattern 36 also comprises an initial power supply period 39b for supplying power in the beginning, and a reduced power supply period 40b for supplying a reduced power thereafter. Since all other structural components of the radiation thermometer are identical to those of the eighth exemplary embodiments, their descriptions will be skipped.

In the above structure, the temperature detecting driver 33 controls the D. C. motor 6 according to the power supply pattern depicted in FIG. 16.

First, the temperature detecting driver 33 supplies power in the light-admitting direction. That is, it supplies power $P_1$ to the D. C. motor 6 in the light-admitting direction during the initial power supply period $t_{11}$ in the positive power supply pattern. The D. C. motor 6 rotates in the light-admitting direction during this period, so that the chopper 5 begins to pass over the infrared-ray-receiving element 3, turns from a light-blocking position to a light-admitting position, and stops by striking the stopper 24. It then supplies power $P_2$ in a value smaller than the power $P_1$, to the D. C. motor 6 in the light-admitting direction during the subsequent reduced power supply period $t_{12}$ in order to keep the chopper 5 in the rest position by holding it against the stopper 24.

Next, the temperature detecting driver 33 supplies power in the light-blocking direction. That is, it supplies the power $P_1$ to the D. C. motor 6 in the light-blocking direction during the initial power supply period $t_{21}$ in the negative power supply pattern. The D. C. motor 6 rotates in the light-blocking direction during this period, so that the chopper 5 begins to move toward the infrared-ray-receiving element 3, turns from the light-admitting position to the light-blocking position, and stops by striking the stopper 24. It then supplies the power $P_2$ in a value smaller than the power $P_1$, to the D. C. motor 6 in the light-blocking direction during the subsequent reduced power supply period $t_{22}$ in order to keep the chopper 5 in the rest position by holding it against the stopper 24.

The time $t_{11}$ or $t_{21}$ for the initial power supply period is longer than the time required for the chopper 5 to strike the stopper 24, as derived from an experiment. In the case of utilizing the stopper 24 made of soft rubber, to be specific, the chopper 5 staggers slightly, because a part of the joint 23 cuts into the stopper 24 at a moment it strikes the stopper, bounces back by a reaction, and strikes again. This staggering ceases by itself while attenuating gradually. Although a magnitude of the staggering is considerably smaller as compared to the prior art techniques that utilize a crystal clock movement or a pulse motor, it is preferable to arrange the initial power supply period of $t_{11}$ and $t_{21}$ to be longer than the time required for the staggering to cease of itself. Also, the power $p_2$ can be a power just enough to keep the chopper 5 in its resting position at the stopper 24.

In this way, the light-admitting mode and the light-blocking mode for the infrared rays are repeated as shown in FIG. 16 based on the power supply pattern that repeats the positive power supply pattern 35 and the negative power supply pattern 36 alternately. As described, the present exemplary embodiment drives the chopper 5 by supplying power to the D. C. motor 6 so as to stop the chopper 5 by striking it against the stopper 24, and keeps a position of the chopper 5 by supplying the reduced power thereafter. Accordingly, it can reduce power consumption, stabilizes the light-admitting time and the light-blocking time, and alleviates staggering of the chopper at its rest position, thereby enabling a steady switching between the light-admitting mode and the light-blocking mode with a considerably small chopper, and accurate detection of temperatures with a small size.

Although the time $t_{11}$ and $t_{21}$ for the initial power supply period are arranged to be longer than the time required for the chopper 5 to strike the stopper 24, they can be shorter than the required time, so that the chopper 5 is moved to strike the stopper 24 by making full use of an inertia of the D. C. motor 6 after a supply of the initial power $P_1$. Though the chopper 5 is liable to cause staggering of certain extent at the impact with the stepper 24, since the D. C. motor 6 rotates by its own inertia, this problem can be avoided if the stopper 24 is designed for appropriate dimensions by taking the staggering into consideration. This can result in a further reduction of the power consumption.

TENTH EXEMPLARY EMBODIMENT

Figure 17:
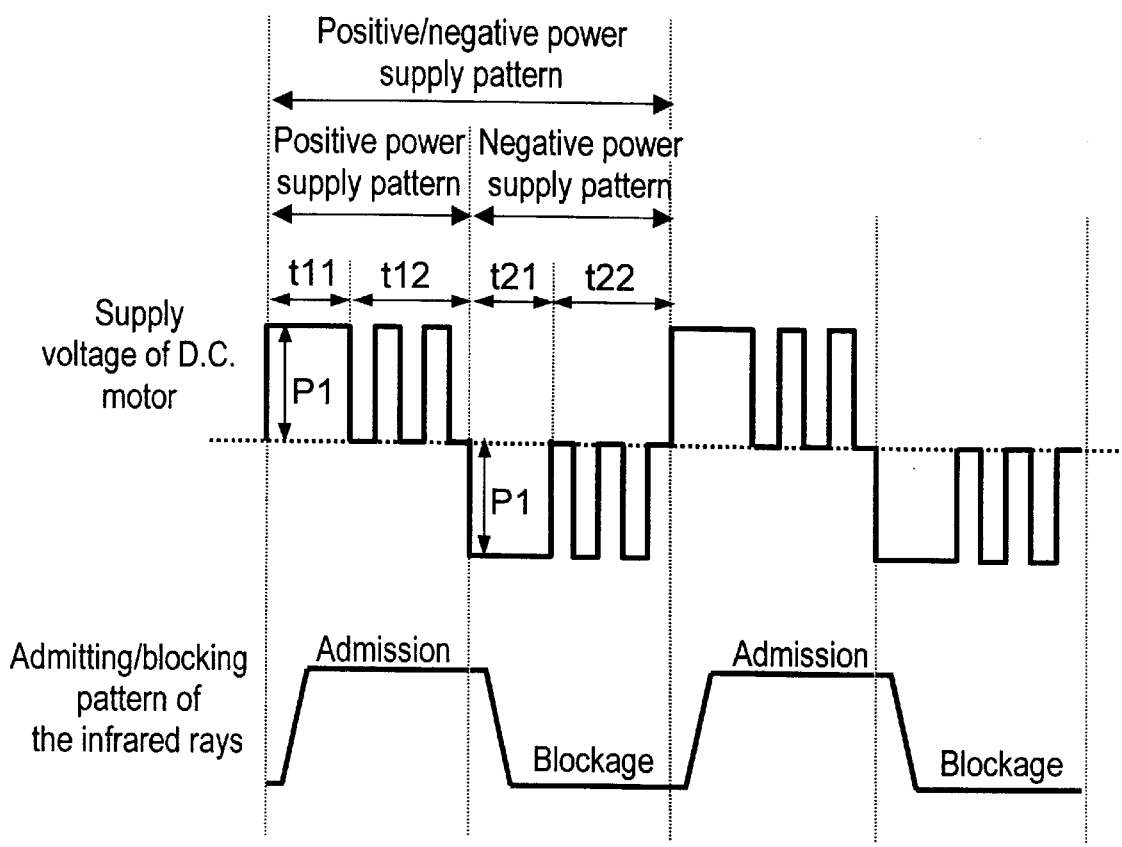
FIG. 17 is a timing chart showing a power supply pattern of a D.C. motor in accordance with a tenth exemplary embodiment of the present invention.

FIG. 17 is a timing chart showing a power supply pattern for a D. C. motor of a tenth exemplary embodiment of the present invention. In this exemplary embodiment, the temperature detecting driver 33 controls the D. C. motor according to the power supply pattern depicted in FIG. 17.

First, the temperature detecting driver 33 supplies the power in a light-admitting direction. That is, it supplies power $P_1$ to the D. C. motor 6 in the light-admitting direction during the initial power supply period $t_{11}$ in the positive power supply pattern. The D. C. motor 6 rotates in the light-admitting direction during this period, so that the chopper 5 begins to pass over the infrared-ray-receiving element 3, turns from a light-blocking position to a light-admitting position, and stops by string the stopper 24. It then supplies intermittently the same power $P_1$ as that for the initial power supply period $t_{11}$ to the D. C. motor 6 in the light-admitting direction during the subsequent reduced power supply period $t_{21}$ in order to keep the chopper 5 in the rest position by intermittently pressing it against the stopper 24.

Next, the temperature detecting driver 33 supplies power in the light-blocking direction. That is, it supplies the power $P_1$ to the D. C. motor 6 in the light-blocking direction during the initial power supply period $t_{21}$ in the negative power supply pattern. The D. C. motor 6 rotates in the light-blocking direction during this period, so that the chopper 5 begins to move toward the infrared-ray-receiving element 3, turns from the light-admitting position to the light-blocking position, and stops by striking the stopper 24. It then supplies intermittently the same power $P_1$ as that for the initial power supply period $t_{21}$ to the D. C. motor 6 in the light-blocking direction during the subsequent reduced power supply period $t_{22}$ in order to keep the chopper 5 in the rest position by pressing it intermittently against the stopper 24.

In this way, the light-admitting mode and the light-blocking mode for the infrared rays are repeated as shown in FIG. 17 by controlling the D. C. motor 6 according to the power supply pattern depicted in FIG. 17.

As described, the present exemplary embodiment drives the chopper 5 by first supplying power to the D. C. motor 6 so as to stop the chopper 5 by striking it against the stopper 24, and keeps the chopper 5 in that position by supplying the power intermittently thereafter. Accordingly, it can reduce power consumption with a circuit of simpler structure than the ninth exemplary embodiment, which supplies reduced power. Also, it stabilizes the light-admitting time and the light-blocking time by driving the chopper, and alleviates staggering of the chopper at its rest position, thereby enabling a steady switching between the light-admitting mode and the light-blocking mode with a considerably small chopper, and accurate detection of temperatures with a small size.

ELEVENTH EXEMPLARY EMBODIMENT

Figure 18:
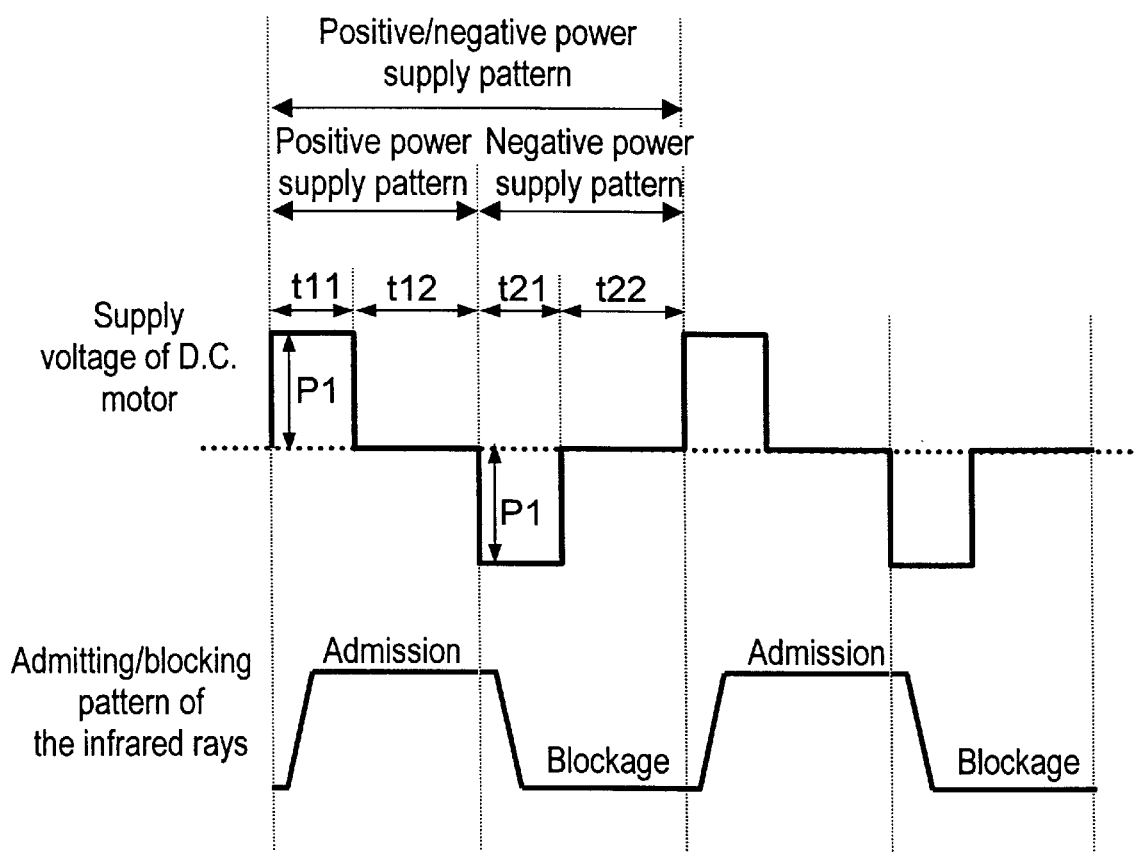
FIG. 18 is a timing chart showing a power supply pattern of a D.C. motor in accordance with an eleventh exemplary embodiment of the present invention.

FIG. 18 is a timing chart showing a power supply pattern for a D. C. motor of an eleventh exemplary embodiment of the present invention. The temperature detecting driver 33 controls the D. C. motor 6 according to the power supply pattern depicted in FIG. 18 in this exemplary embodiment.

First, the temperature detecting driver 33 supplies power in the light-admitting direction. That is, it supplies power $P_1$ to the D. C. motor 6 in the light-admitting direction during the initial power supply period $t_{11}$ in the positive power supply pattern. The D. C. motor 6 rotates in the light-admitting direction during this period, so that the chopper 5 begins to pass over the infrared-ray-receiving element 3, turns from a light-blocking position to a light-admitting position, and stops by striking the stopper 24. It then ceases to supply power to the D. C. motor 6 during the subsequent reduced power supply period $t_{12}$.

Next, the temperature detecting driver 33 supplies power in the light-blocking direction. That is, it supplies the power $P_1$ to the D. C. motor 6 in the light-blocking direction during the initial power supply period $t_{21}$ in the negative power supply pattern. The D. C. motor 6 rotates in the light-blocking direction during this period, so that the chopper 5 begins to move toward the infrared-ray-receiving element 3, turns from the light-admitting position to the light-blocking position, and stops by striking the stopper 24. It then ceases to supply the power to the D. C. motor 6 during the subsequent reduced power supply period $t_{22}$.

If the reduced power supply periods $t_{12}$ and $t_{22}$ are considerably short, the chopper 5 does not shift from the stopper 24 even if the power is ceased during these periods for the following reason. Although swinging of a human hand is a conceivable factor for the chopper 5 to shift from the stopper 24, it does not cause the chopper to move, since a swinging cycle of the human hand is substantially longer than the $t_{21}$ and $t_{22}$ time periods if these periods are as fairly short as 0.1 second or less, for instance.

In this way, the light-admitting mode and the light-blocking mode for the infrared rays are repeated as shown in FIG. 18 by controlling the D. C. motor 6 according to the power supply pattern depicted in FIG. 18.

Therefore, the present exemplary embodiment is able to further reduce the power consumption, since it does not supply the power after the chopper 5 stops by striking the stopper 24 with the initial power supply. Also, since it stabilizes the light-admitting time and the light-blocking time by driving the chopper, and alleviates staggering of the chopper at its rest position, the chopper can switch steadily between the light-admitting mode and the light-blocking mode even if it is considerably reduced in size, and executes accurate detection of temperatures with a small size.

TWELFTH EXEMPLARY EMBODIMENT

Figure 19:
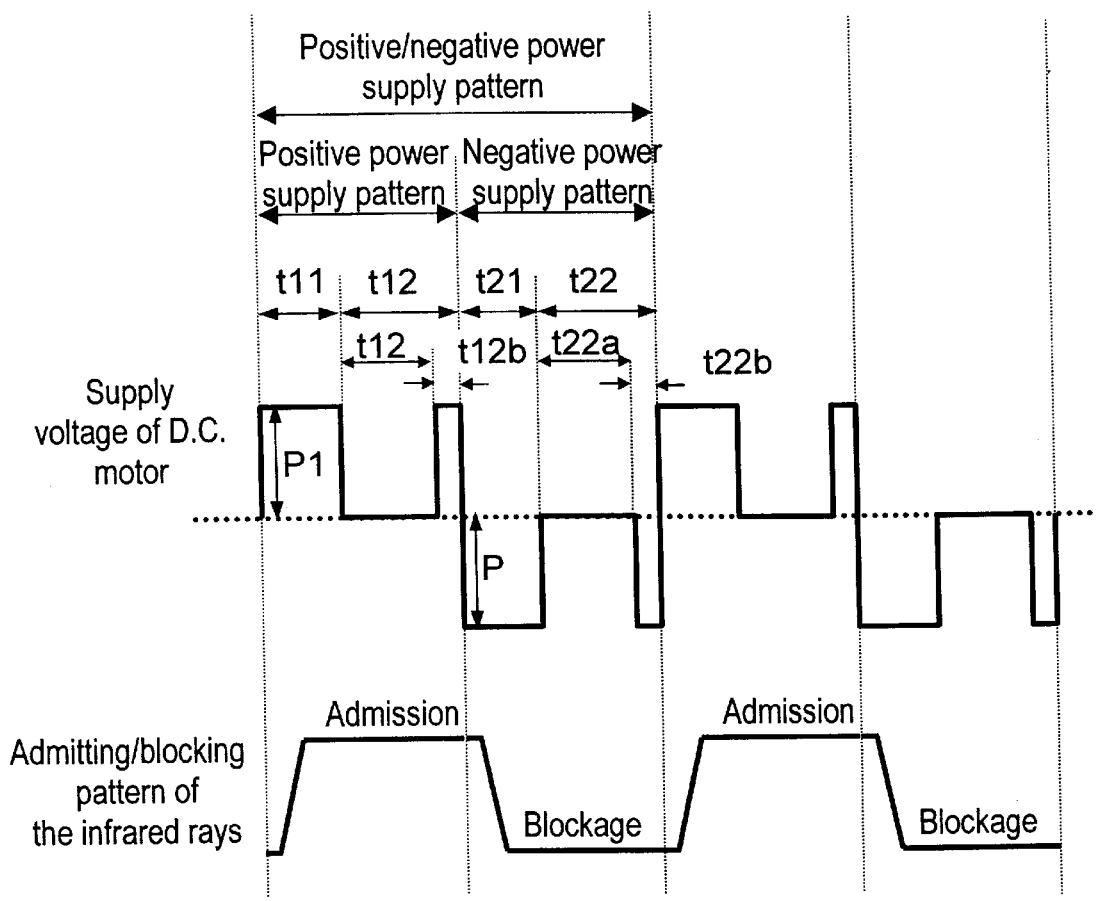
FIG. 19 is a timing chart showing a power supply pattern of a D.C. motor in accordance with a twelfth exemplary embodiment of the present invention.

FIG. 19 is a timing chart showing a power supply pattern for a D. C. motor of a twelfth exemplary embodiment of the present invention. The temperature detecting driver 33 controls the D. C. motor according to the power supply pattern depicted in FIG. 19, in this exemplary embodiment.

First, the temperature detecting driver 33 supplies power in the light-admitting direction. That is, it supplies power $P_1$ to the D. C. motor 6 in the light-admitting direction during the initial power supply period $t_{11}$ in the positive power supply pattern. The D. C. motor 6 rotates in the light-admitting direction during this period, so that the chopper 5 begins to pass over the infrared-ray-receiving element 3, turns from a light-blocking position to a light-admitting position, and stops by striking the stopper 24. It then ceases to supply power to the D. C. motor 6 during the first period $t_{12a}$ of the subsequent reduced power supply period $t_{12}$, and again supplies the power $P_1$ during the last period $t_{12b}$.

Next, the temperature detecting driver 33 supplies power in the light-blocking direction. That is, it supplies the power $P_1$ to the D. C. motor 6 in the light-blocking direction during the initial power supply period $t_{21}$ in the negative power supply pattern. The D. C. motor 6 rotates in the light-blocking direction during this period, so that the chopper 5 begins to move toward the infrared-ray-receiving element 3, turns from the light-admitting position to the light-blocking position, and stops by striking the stopper 24. It then ceases to supply the power to the D. C. motor 6 during the first period $t_{22a}$ of the subsequent reduced power supply period $t_{22}$, and again supplies the power $P_1$ during the last period $t_{22b}$.

In this way, the light-admitting mode and the light-blocking mode for the infrared rays are repeated as shown in FIG. 19 by controlling the D. C. motor 6 according to the power supply pattern depicted in FIG. 19.

If an infrared-ray-receiving element of slow response is used, it is conceivable that the time for switching between the light-admitting mode and the light-blocking mode becomes longer than a swinging cycle of the human hand. Even in this case, in which the chopper 5 shifts from the stopper 24 due to a swing of the hand during an absence of the power supply, the light-admitting mode and the light-blocking mode can still be switched steadily, since the direction of power supply is switched after striking the shifted chopper 5 against the stopper 24 by supplying the power at the end.

Accordingly, the present exemplary embodiment ceases the supply of power after the chopper 5 stops by striking the stopper 24 with the first power supply, and switches the direction of power supply after the power is supplied again at the end. Therefore, it can reduce the power consumption, stabilizes the light-admitting time and the light-blocking time by driving the chopper, and alleviates staggering of the chopper 5 at its rest position, thereby enabling the chopper to switch steadily between the light-admitting mode and the light-blocking mode even if it is considerably reduced in size, and to execute accurate detection of temperatures with a small size.

THIRTEENTH EXEMPLARY EMBODIMENT

Figure 20:
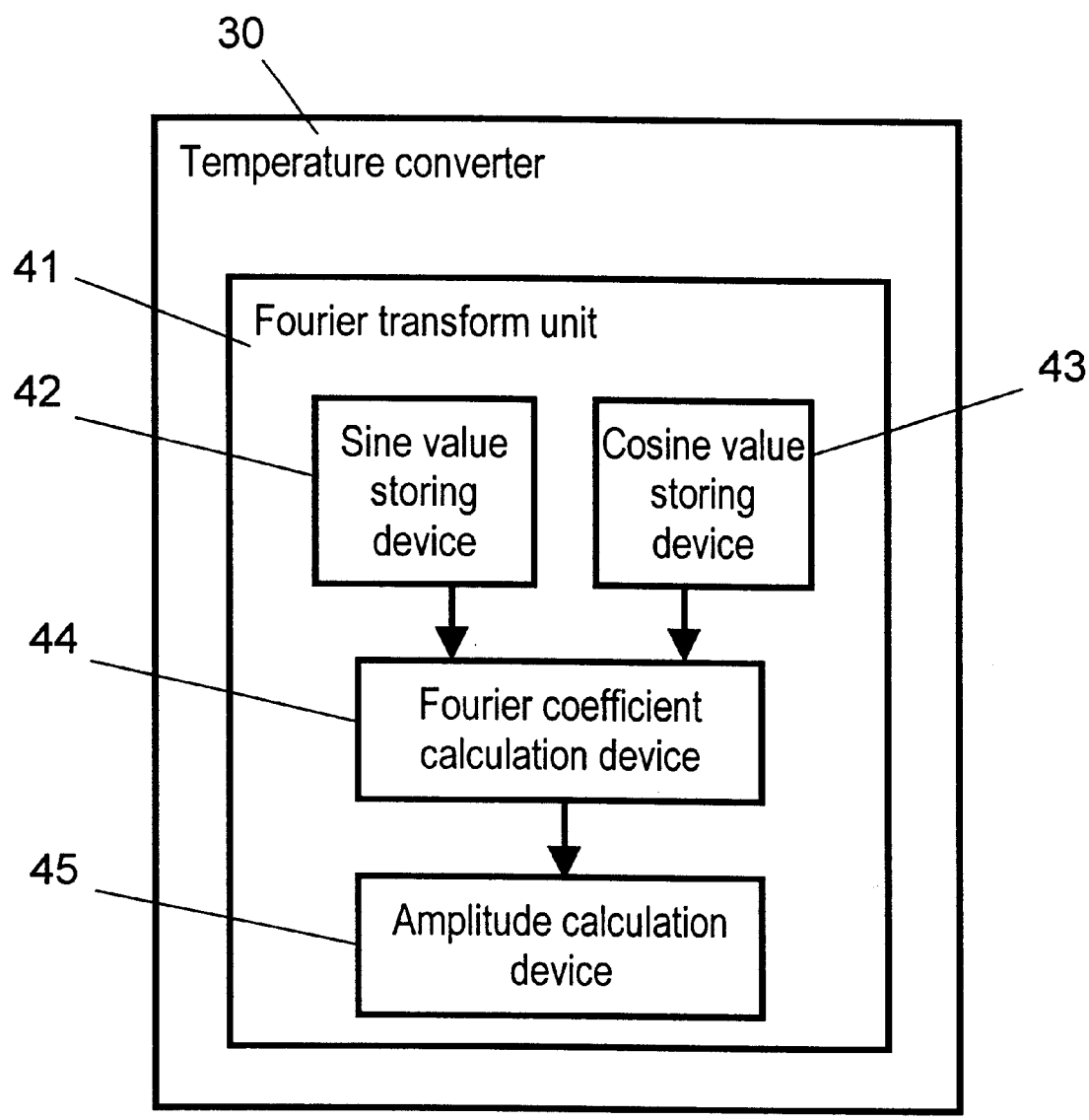
FIG. 20 is a block diagram constituting a temperature calculator in accordance with a thirteenth exemplary embodiment of the present invention.
Figure 21:
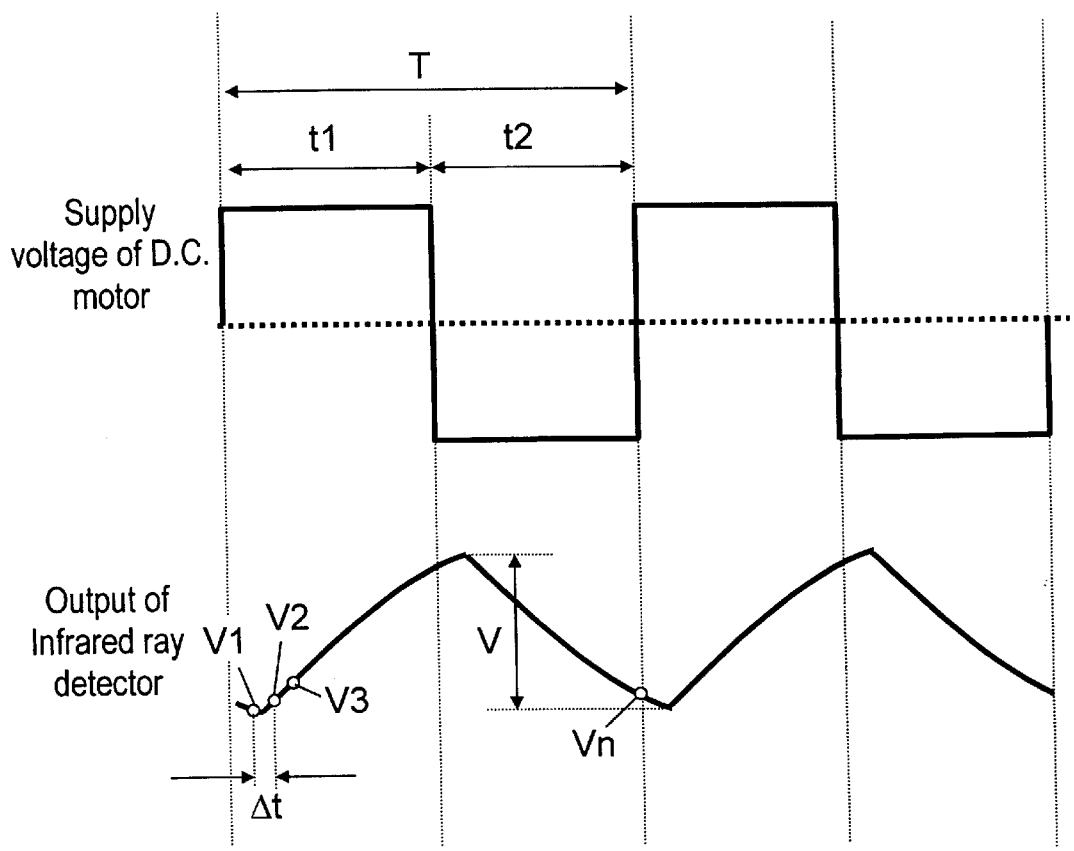
FIG. 21 is a timing chart showing a sampled output of an infrared-ray-receiving element in accordance with the same exemplary embodiment.

An exemplary embodiment of the present invention representing a different method of converting temperature will be described next by referring to FIG. 20 and FIG. 21. FIG. 20 shows a block diagram constituting a temperature calculator of a thirteenth exemplary embodiment. FIG. 21 is a timing chart showing a sampled output of an infrared-ray-receiving element.

In FIG. 20, a temperature calculator 30 is provided with a Fourier transform calculator 41 for calculating a signal component having a frequency equal to the frequency used for alternately reversing a rotational direction of a D. C. motor 6 from an output signal of an infrared-ray-receiving element 3 by a process of the discrete Fourier transform. The Fourier transform calculator 41 comprises (1) a sine value memory 42 for storing a plurality of constants established as sine function values, (2) a cosine value memory 43 for storing a plurality of constants established as cosine function values, (3) a Fourier coefficient calculator 44 for calculating a Fourier coefficient based on an output of the infrared-ray-receiving element 3 and outputs of the sine value memory 42 and the cosine value memory 43, and (4) an amplitude calculator 45 for calculating an amplitude correlation factor, which is proportional to an amplitude of a signal component in the output of the infrared-ray-receiving element 3, based on an output of the Fourier coefficient calculator 44.

In FIG. 21, reference marks $V_1$, $V_2$, $V_3$ - - - Vn represent digital values to be input to a temperature calculator 30 in an order of time series via the infrared-ray-receiving element 3, an amplifier 28 and an A/D converter 29 shown in FIG. 11. These digital values are obtained by taking samplings for "n" times at every sampling interval of $\Delta t$ during a fundamental cycle time T, which is an aggregate time of the positive power supply period $t_1$ for driving the chopper 5 toward the light-admitting position and stopping it at that position, and the negative power supply period $t_2$ for driving the chopper 5 toward the light-blocking position and stopping it at that position.

The positive power supply period of $t_1$ and the negative power supply period of $t_2$ are equal in time, so that the temperature detecting driver 33 reverses the rotational direction of the D. C. motor 6 alternately at regular intervals. As depicted in FIG. 12, the structure of the chopper 5 is so that the stopper 24 is provided in a position so that the angle $\theta_1$ for the chopper 5 to move from a rest position in the light-blocking mode to a position where the light begins to be admitted becomes equal to the angle $\theta_2$ for the chopper 5 to move from a rest position in the light-admitting mode to a position where the light begins to be blocked. That is, the light-admitting time and the light-blocking time for the infrared rays by a motion of the chopper 5 are equal.

Referring back to FIG. 20, a function of the temperature calculator 30 will be described now.

The sine value memory 42 stores a plurality of constants $KS_1$, $KS_2$, $KS_3$ - - - KSn established by the sine function of the formula 23.

$$KS_i = \sin\left(i \times \frac{2\pi}{n}\right), i = 1 \sim n \qquad \text{formula 23}$$

Also, the cosine value memory 43 stores a plurality of constants $KC_1$, $KC_2$, $KC_3$ - - - KCn established by the cosine function of the formula 24.

$$KC_i = \cos\left(i \times \frac{2\pi}{n}\right), i = 1 \sim n \qquad \text{formula 24}$$

where "n" is the same value as the number of the samplings described previously.

The Fourier coefficient calculator 44 calculates the sum Vsin of the individual products of the digital values $V_1$, $V_2$, $V_3$ - - - Vn in a time series and the values $KS_1$, $KS_2$, $KS_3$ - - - KSn stored in the sine value memory 42, as shown by the formula 25. The Fourier coefficient calculator 44 also calculates the sum Vcos of the individual products of the digital values $V_1$, $V_2$, $V_3$ - - - Vn in a time series and the values $KC_1$, $KC_2$, $KC_3$ - - - KCn stored in the cosine value memory 43, as shown by the formula 26.

$$Vsin = \sum_{i=1}^{n} KS_i \times V_i \qquad \text{formula 25}$$

$$Vcos = \sum_{i=1}^{n} KC_i \times V_i \qquad \text{formula 26}$$

The amplitude calculator 45 then calculates an amplitude correlation factor Vf according to the formula 27.

$$Vf = \sqrt{Vsin^2 + Vcos^2} \qquad \text{formula 27}$$

The Fourier transform calculator 41 calculates the amplitude correlation factor Vf, which is the signal component having a frequency equal to the frequency used for alternately reversing the rotational direction of the D. C. motor 6, from the output signal of the infrared-ray-receiving element 3 by a process of the discrete Fourier transform in the manner as described above.

The amplitude correlation factor Vf is proportional to the amplitude V of the signal component in the output of the infrared-ray-receiving element 3, and it is proportional to a difference between temperature of the eardrum and/or vicinity of it and temperature of the infrared-ray-receiving element 3 raised to the fourth power. The temperature calculator 30 converts temperature of the eardrum and/or vicinity of it based on this relationship.

Accordingly, a harmonic noise component in the integral multiples of the fundamental frequency can be removed by way of the Fourier transform calculator 41 calculating the signal component having a frequency equal to the frequency used for alternately reversing the rotational direction of the D. C. motor 6 by a process of the discrete Fourier transform.

However, output waves of the infrared-ray-receiving element 3 contain a great amount of higher harmonic component of high degrees, if the light-admitting time and the light-blocking time for the infrared rays by movements of the chopper 5 are not equal. Harmonics that can be removed by the discrete Fourier transform are those harmonics having frequencies up to two times of the sampling cycle $\Delta t$, i.e. harmonics in a half of the sampling frequency. Therefore, the sampling cycle $\Delta t$ needs to be shortened considerably in order to remove the harmonic component of high degrees. However, it requires an analog filter circuit of high performance, since there is a limitation in shortening the sampling cycle due to the memory and its processing speed.

If the light-admitting time and the light-blocking time for the infrared rays by movements of the chopper 5 are equal, output waves of the infrared-ray-receiving element 3 contain only a small amount of the harmonic component of high degrees. Hence, the harmonic noise component can be removed sufficiently with a practical sampling cycle, and highly accurate detection of temperatures can be achieved.

Although the temperature calculator 30 in the thirteenth embodiment carries out a process of the discrete Fourier transform based on the values $V_1$ - - - Vn obtained during one cycle T of the light-admitting time and the light-blocking time of the chopper 5, it can execute a process of the discrete Fourier transform by obtaining the sum of $V_1$, the sum of $V_2$, - - - the sum of Vn, based on a plurality of the values $V_1$ - - - Vn obtained during a plurality of the cycles, i.e. an integral multiple of the cycle T. In this way, a fluctuational noise component can be removed, and the temperature detection of even higher accuracy can be realized.

FOURTEENTH EXEMPLARY EMBODIMENT

Figure 22:
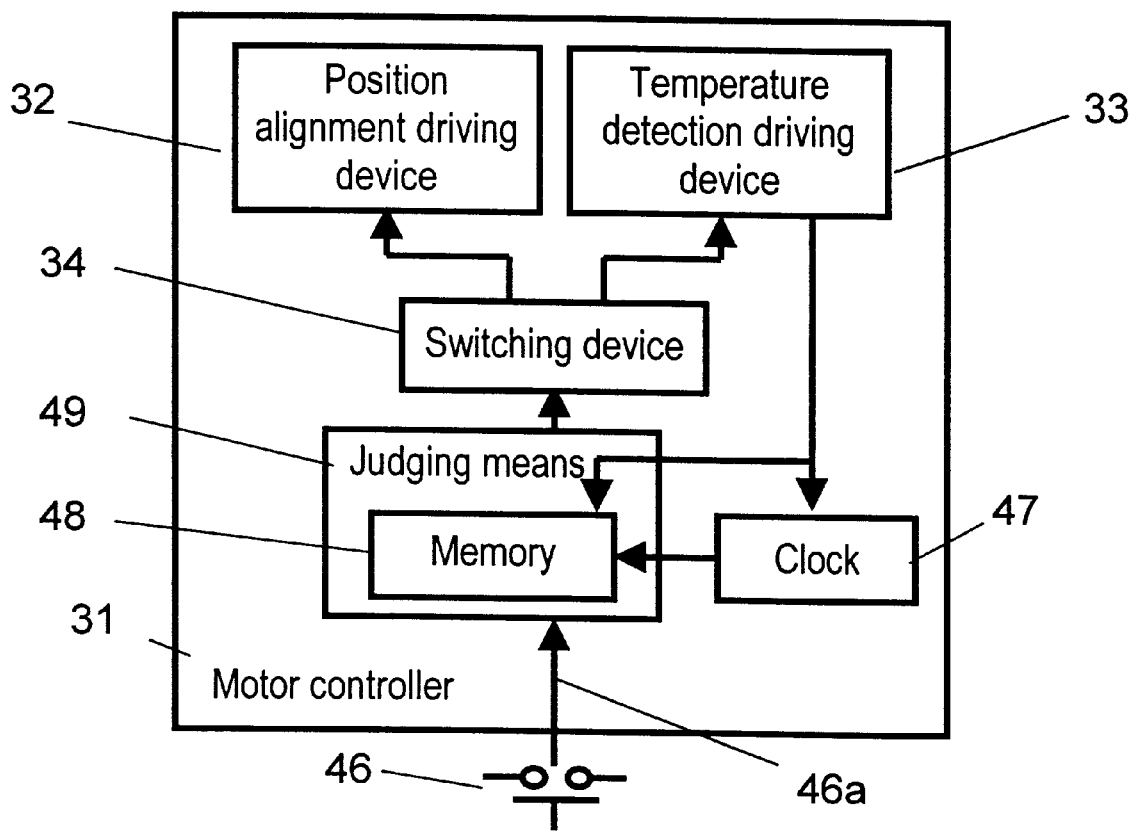
FIG. 22 is a block diagram constituting a motor controller in accordance with a fourteenth exemplary embodiment of the present invention.
Figure 23:
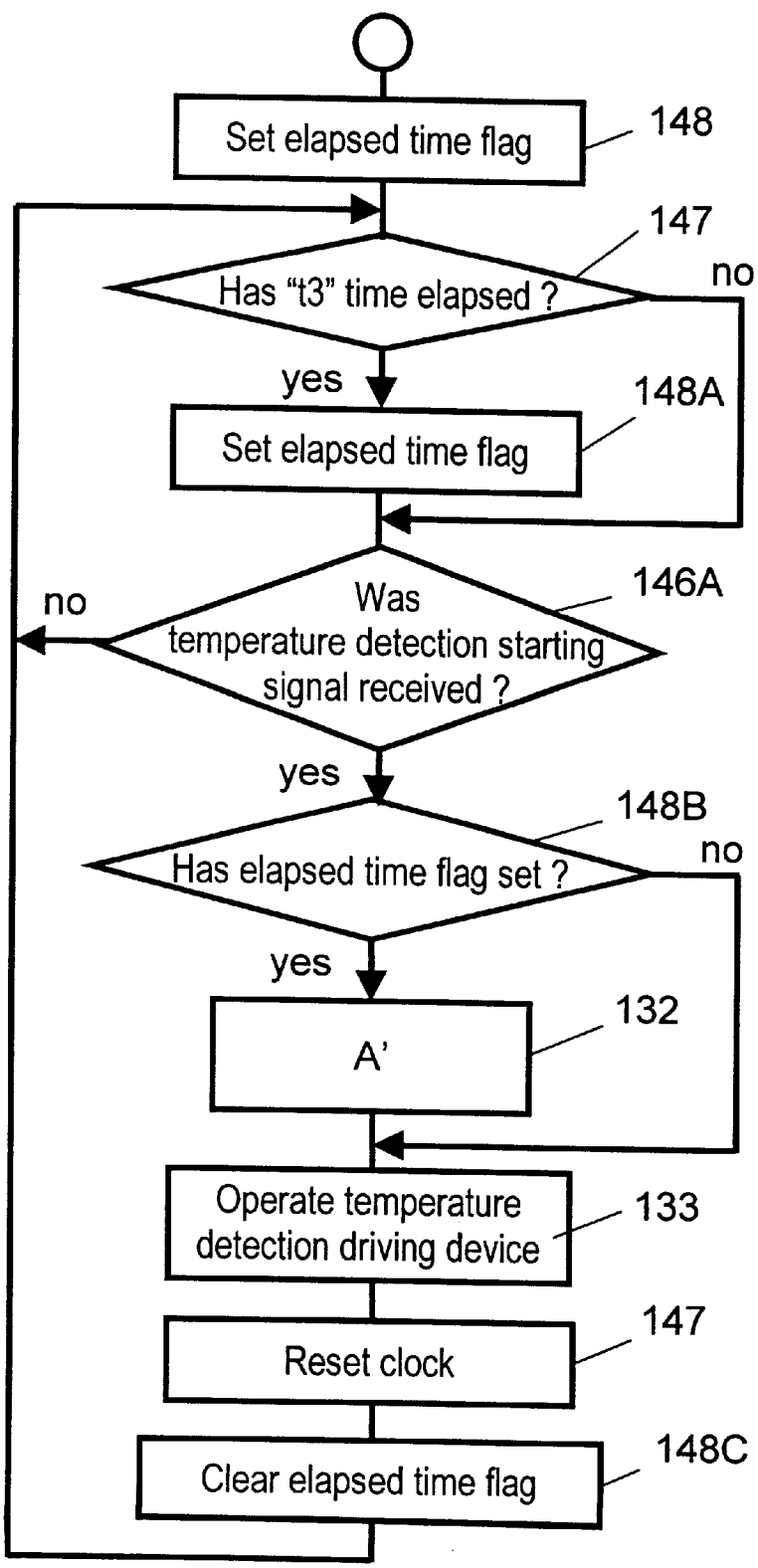
FIG. 23 is a flowchart depicting an operation of the motor controller in accordance with the same exemplary embodiment.

A fourteenth exemplary embodiment, as a different method of switching a position aligning driver and a temperature detecting driver means by a motor controller, will be described next by referring to FIG. 22 and FIG. 23. FIG. 22 is a block diagram constituting a motor controller of the fourteenth exemplary embodiment of the present invention, and FIG. 23 is a flowchart depicting an operation of the motor controller of this embodiment.

In FIG. 22, a thermometric switch 46 is a signaling device for producing a temperature detection starting signal. A clock 47 counts a lapse of time when it does not receive a temperature detection starting signal 46a from the thermometric switch 46, and a memory 48 stores an elapsed time flag when the clock 47 counts a predetermined time. A judging means 49 judges presence or absence of the elapsed time flag stored in the memory 48, and sends a command for the subsequent operation of the switching device 34.

An operation of the motor controller 31 will now be described concretely by referring to FIG. 23. First, when power supply to the motor controller 31 is turned on, an elapsed time flag is stored in the memory 48 as an initialized condition in the step 148, and the following operation is repeated. In other words, if an elapsed time counted by the clock 47 does not reach a predetermined time $t_3$ in the step 147, the controller leaves the memory 48 intact, and stands by for reception of a temperature detection starting signal 46a. If the clock 47 completes counting of the predetermined time $t_3$, it stores an elapsed time flag in the memory 48 in the step 148A, and stands by for reception of a temperature detection starting signal 46a in the step 146A. When the thermometric switch 46 is depressed, and the motor controller 31 receives a temperature detection staring signal 46a in due course, the judging means 49 checks with the memory 48 for a storage of the elapsed time flag in the step 148B. If the elapsed time flag is not stored, the switching device 34 immediately operates a temperature detecting driver 33 in the step 133. Or, if the elapsed time flag is stored, the switching device 34 operates a position aligning driver 32 in the step 132, and then switches to the temperature detecting driver 33 to operate it in the step 133. In the step 147 following the above, the controller resets and starts the clock 47, erases the elapsed time flag stored in the memory 48 in the step 148C, and returns to the first step for repeating the same.

With the foregoing structure, the controller carries out a temperature detection after executing a positional alignment of the chopper 5, since the elapsed time flag is stored in the memory 48, in the case of carrying out the temperature detection for the first time after the power supply to the motor controller 31 is turned on. Hence, the temperature detection can be carried out accurately, even if position of the chopper is shifted while the thermometer had been left with the power off. If the temperature detection is carried out consecutively, or repeatedly within a short period of time not exceeding the predetermined time $t_3$, the detection can be continued without aligning a position of the chopper 5 during the second and the succeeding temperature detection after the power supply is turned on, thereby realizing a highly accurate temperature detection. Or, even if a position of the chopper 5 is shifted while the thermometer had been left unused for a long period of time exceeding the predetermined time $t_3$, temperature detection can be made accurately at all the time, since the temperature detection is carried out after executing a positioning alignment of the chopper 5 when starting the temperature detection again.

FIFTEENTH EXEMPLARY EMBODIMENT

Figure 24:
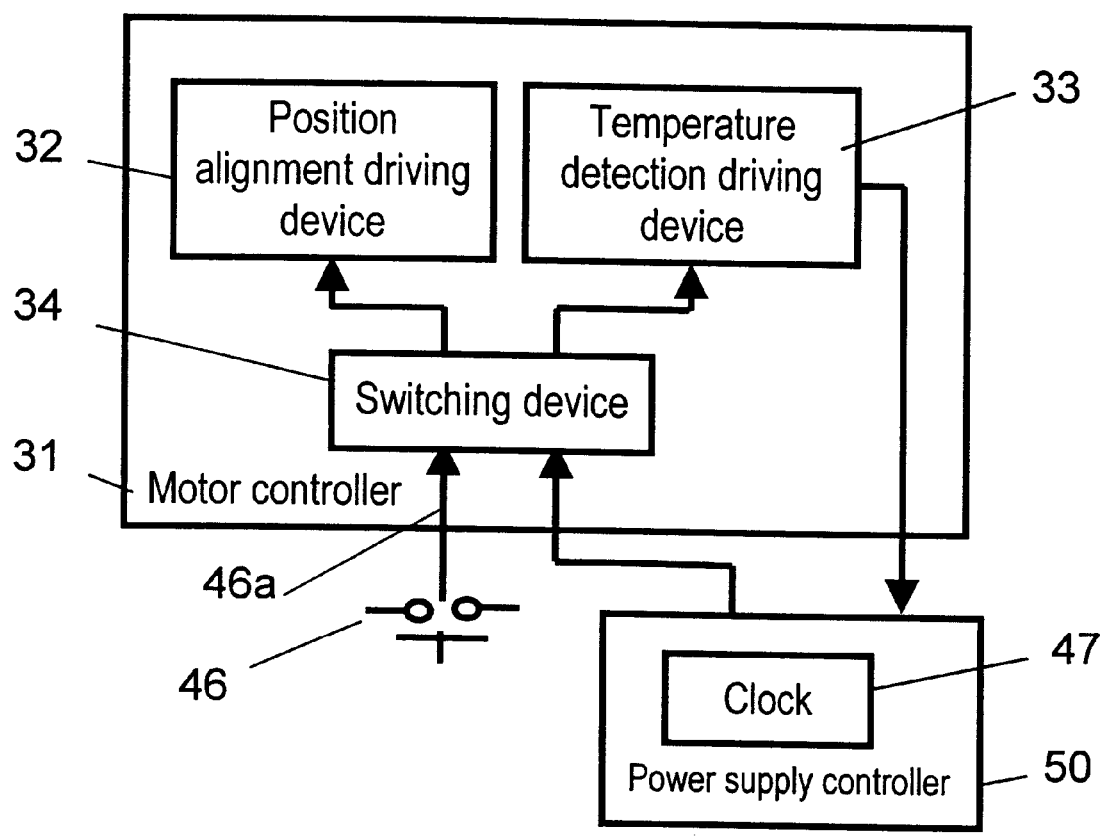
FIG. 24 is a block diagram constituting a motor controller in accordance with a fifteenth exemplary embodiment of the present invention.
Figure 25:
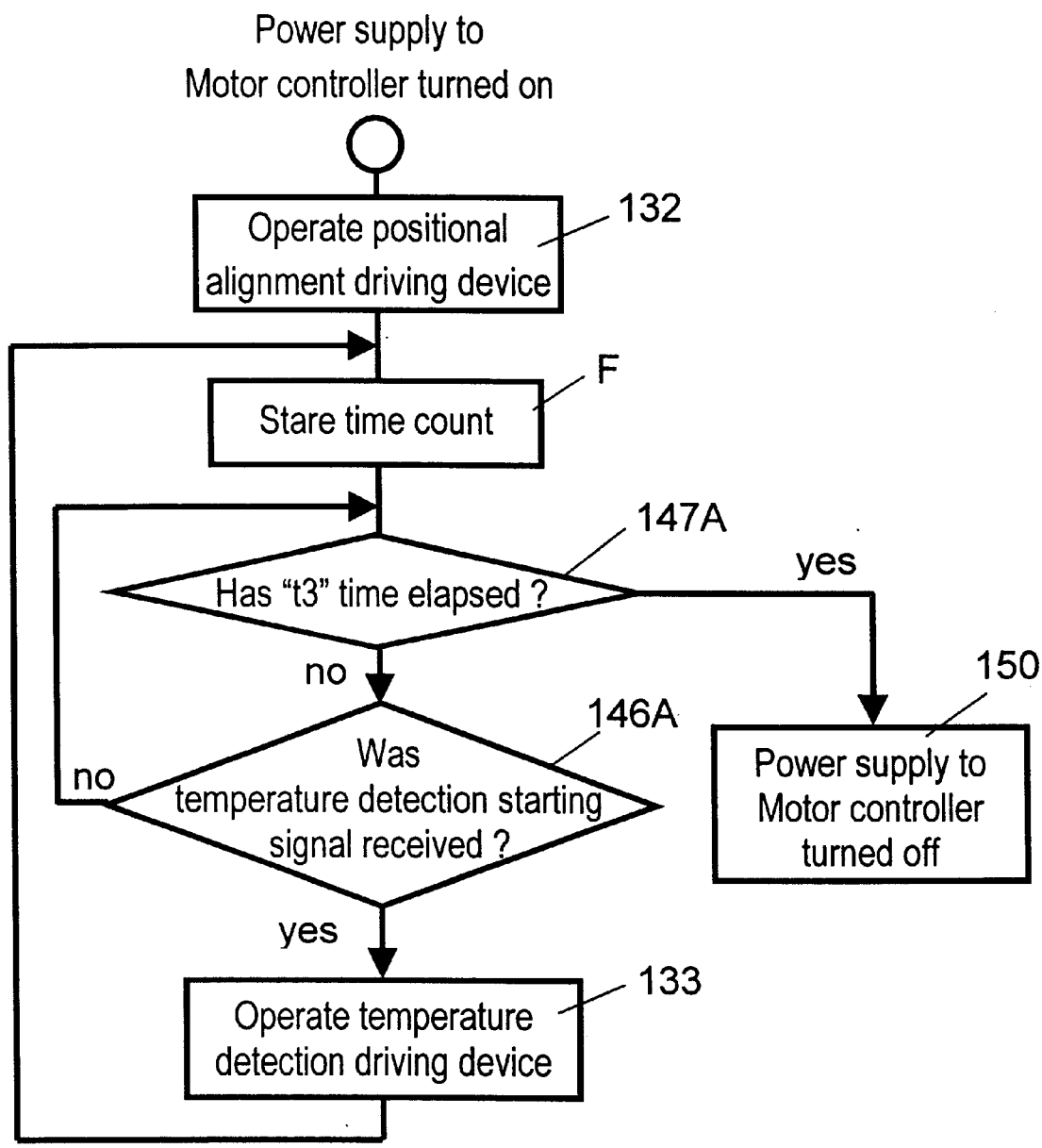
FIG. 25 is a flowchart depicting an operation of the motor controller in accordance with the same exemplary embodiment.
Figure 26:
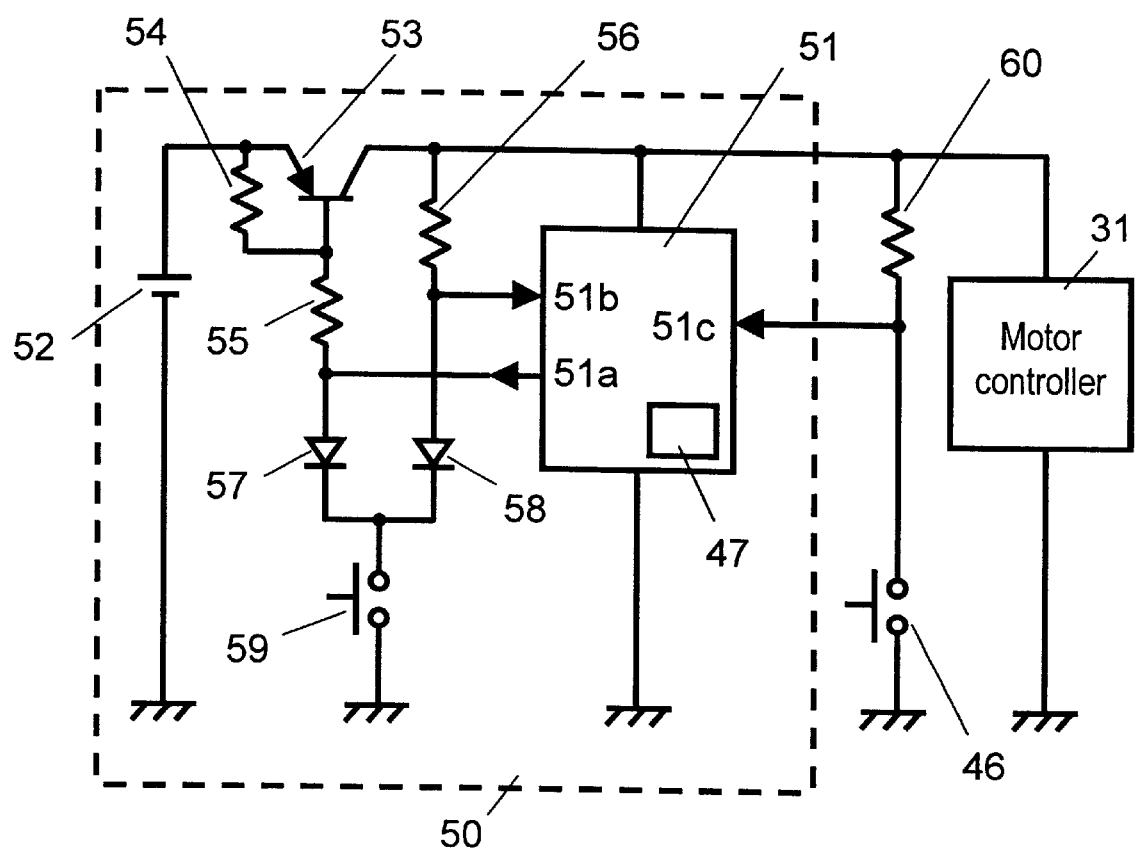
FIG. 26 is a circuit diagram depicting an operation of a power supply controller in accordance with the same exemplary embodiment.
Figure 27:
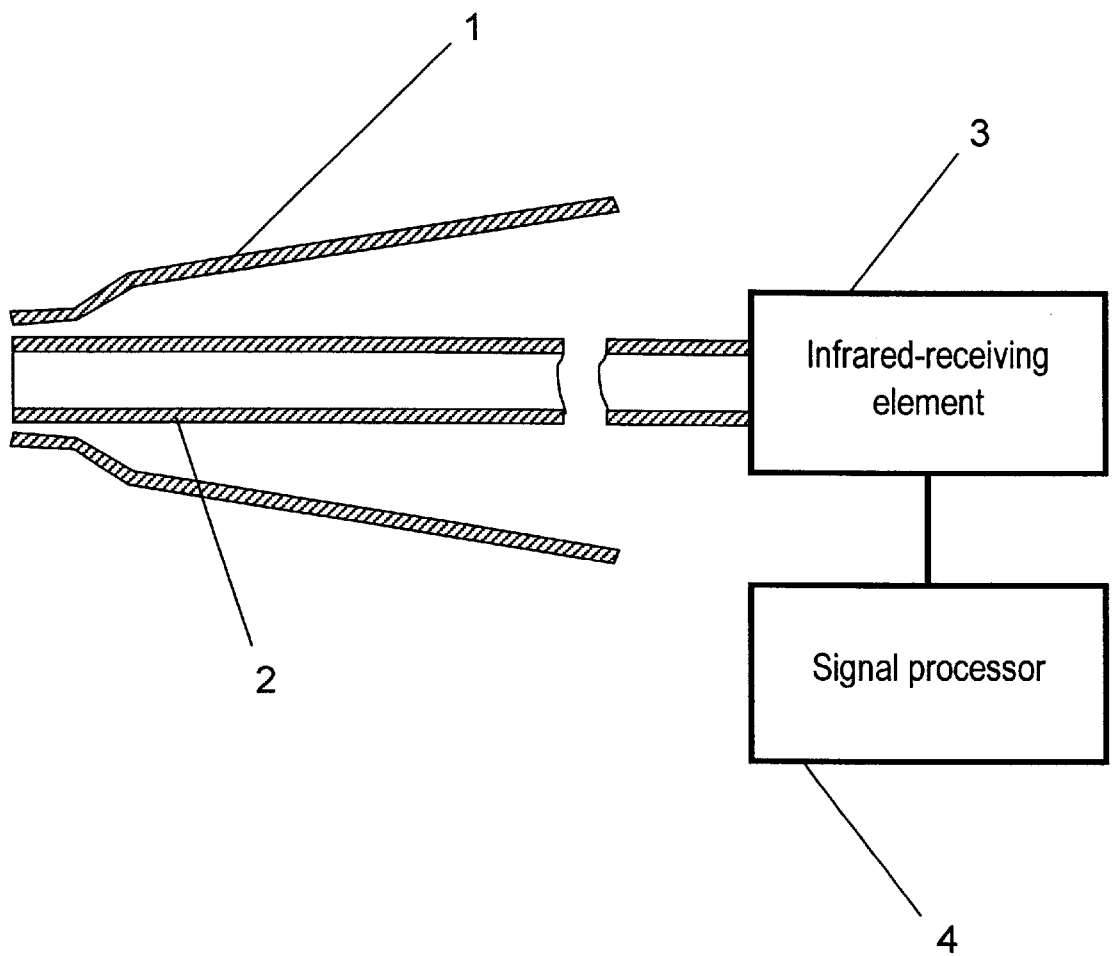
FIG. 27 is a block diagram constituting a radiation thermometer in accordance with the prior art.
Figure 28:
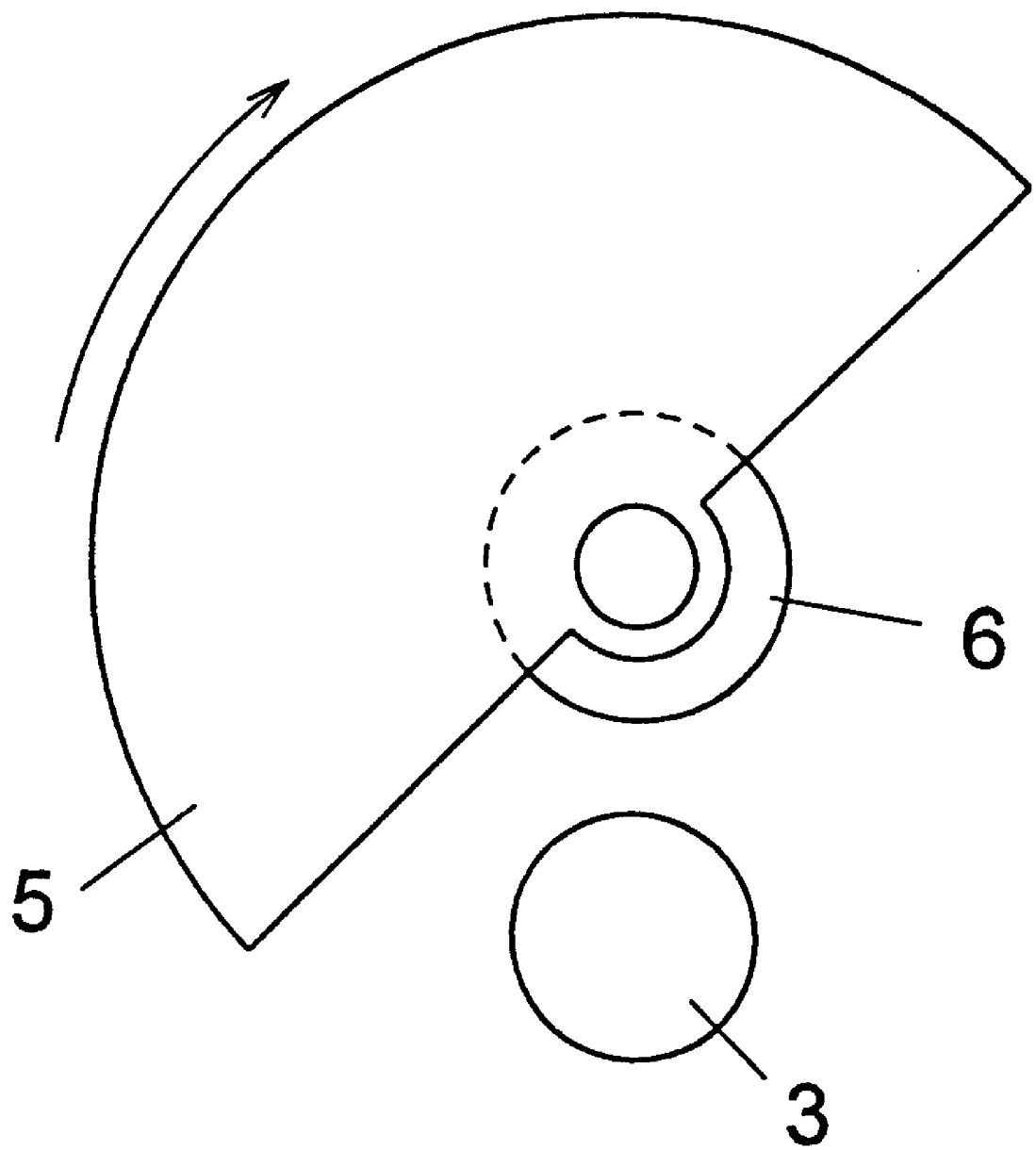
FIG. 28 depicts a structural drawing of a chopper in accordance with the prior art.
Figure 29:
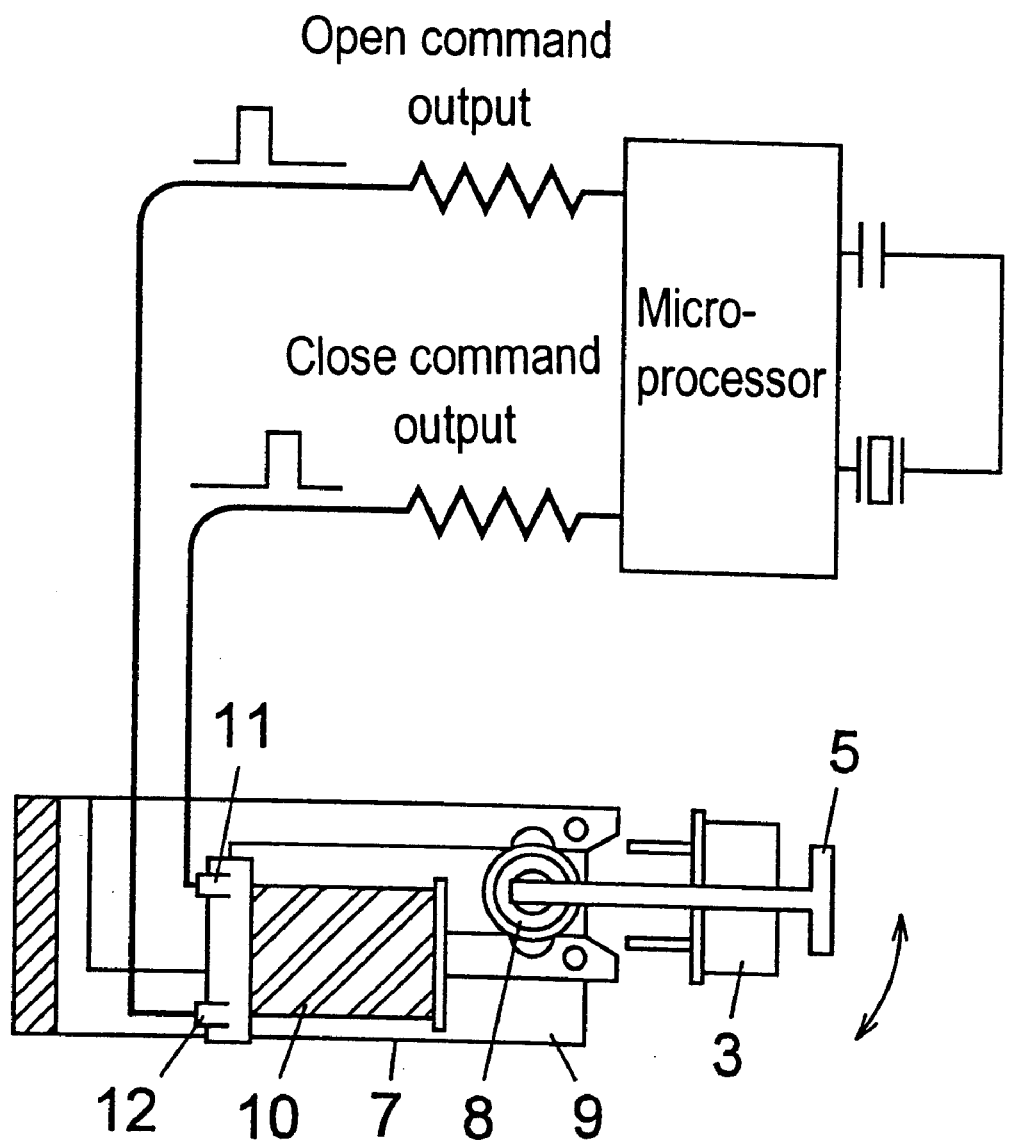
FIG. 29 is a structural drawing of the other chopper in accordance with the prior art.
Figures 30A, 30B:
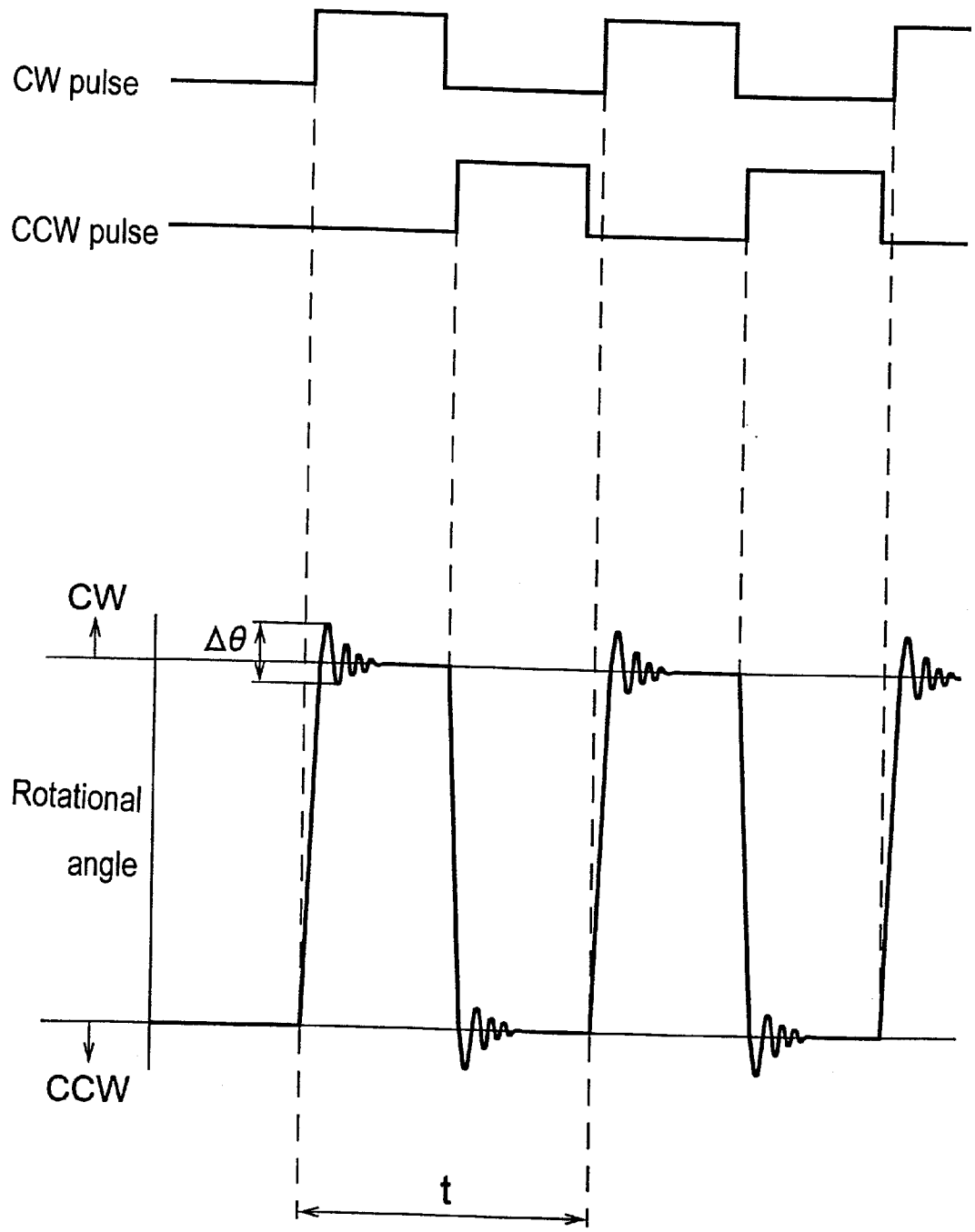
FIGS. 30A and 30B are timing charts depicting further exemplary operation in accordance with the prior art.

A fifteenth exemplary embodiment, as a different operation of the motor controller will be described next by referring to FIG. 24 through FIG. 26. FIG. 24 is a block diagram constituting the motor controller of the fifteenth exemplary embodiment of the present invention, FIG. 25 is a flowchart depicting an operation of the motor controller of this embodiment, and FIG. 26 is a circuit diagram for use in describing the same motor controller. In FIG. 24, a power supply controller 50 controls turning on and off of a power supply to the motor controller 31, which in turn controls a D. C. motor 6, and it includes a clock 47 for counting a lapse of time when it does not receive a temperature detection starting signal 46a from a thermometric switch 46.

An operation of the motor controller 31 will now be described concretely by referring to FIG. 25. First, when power supply to the motor controller 31 is turned on, a switching device 34 executes a positional alignment of a chopper 5 by operating a position aligning driver 32 in the step 132, and run the clock 47 to start counting in the step 147 at the same time. The motor controller 31 stands by, waiting for reception of a temperature detection starting signal 46a until the clock 47 completes counting of a predetermined time $t_3$ in the step 147A. When the thermometric switch 46 is depressed, and the motor controller 31 receives a temperature detection starting signal 46a during the standing-by period, the switching device 34 operates a temperature detecting driver 33 to start the temperature detection in the step 133. The clock 47 is set to start the counting again, and the same operation is repeated thereafter. The power supply controller 50 turns off the power supply to the motor controller 31 in the step 150, if the clock 47 completes counting of the predetermined time $t_3$ during the standing-by period of the motor controller 31 for reception of a temperature detection starting signal 46a in the step 147A. Therefore, the user shall start again by turning on the power supply to the motor controller 31, if he wishes to take a temperature detection after the power supply to the motor controller 31 is turned off.

The power supply controller 50 will be described next by referring to FIG. 26. The power supply controller 50 comprises (1) a microcomputer 51, (2) a rechargeable battery or a dry battery 52 defining a D. C. power supply, (3) a PNP type transistor 53, (4) resisters 54, 55 and 56, (5) diodes 57 and 58, and (6) a power supply switch 59. When the power supply switch 59 is depressed, in FIG. 26, a current flows through the resisters 54 and 55, the diode 57 and the power supply switch 59 to turn the transistor 53 on, and the power is supplied to the microcomputer 51 and the motor controller 31. The microcomputer 51 is able to keep the transistor 53 in a state of continuity by maintaining an output terminal 51a low in potential even after the power supply switch 59 is released, so as to continue the supply of power to the microcomputer 51 and the motor controller 31. On the other hand, an input terminal 51b of the microcomputer 51 is input with a low potential by a current flow from the transistor 53 to the resister 56 and the diode 58 when the power supply switch 59 is kept depressed, and a high potential is input if the power supply switch 59 is released.

In the normal usage, the microcomputer 51 keeps the supply of power to the microcomputer 51 and the motor controller 31 by maintaining the output terminal 51a low in potential after the power supply switch 59 is depressed. When the thermometric switch 46 for sending a temperature detection starting signal 46a is depressed, a current flows through the resistor 60 and the thermometric switch 46 to turn an input terminal 51c low in potential, so that the microcomputer 51 detects the thermometric switch 46 being depressed, and starts a temperature measurement. When the power supply switch 59 is depressed again, the microcomputer 51 turns off the power supply to the microcomputer 51 and the motor controller 31 by turning the output terminal 51a high in potential at a moment the power supply switch 59 is released.

Also, if the user has left the thermometer without depressing the power supply switch 59, leaving the power supply to the microcomputer 51 and the motor controller 31 to continue, the microcomputer 51 is able to turn off the power supply by turning the output terminal 51a high in potential in order to avoid unnecessary drain of the battery. This can be achieved by providing the microcomputer 51 with a clock 47 for counting a lapse of time, in which the thermometric switch 46 is not depressed, and turning the output terminal 51a high in potential, when the elapsed time exceeds a predetermined time.

Accordingly, the present embodiment is able to execute temperature detection within a short period of time, since a positional alignment of the chopper 5 is carried out when the power supply to the motor controller 31 is turned on. It is also able to execute accurate temperature detection within a short period of time, since the temperature detection can be continued without carrying out positional alignment of the chopper 5 until the clock 47 counts the predetermined time, in the case of taking the temperature detection consecutively. If the thermometer has been left for a long period of time without taking temperature detection, resulting in the chopper 5 to shift its position, the power supply to the motor controller 31 is turned off when the clock 47 counts the predetermined time. When taking a temperature detection again, the switching device 34 operates the position aligning driver 32 for executing a positional alignment of the chopper 5 by simply tuning on the power supply to the motor controller 31. The temperature detection is made with a succeeding temperature detection starting signal 46a after the foregoing operation, so as to realize accurate temperature detection at all the time. In addition, since the power supply is turned off automatically after a lapse of the predetermined time even if the power supply to the motor controller 31 is left on, it reduces the power consumption and improves convenience of use.

INDUSTRIAL APPLICABILITY

As has been described, the present invention offers the following advantages.

The thermometer calculates a temperature with a signal processor from the output of a light receptor, which receives only the infrared rays radiated directly from the eardrum and/or vicinity of it, and notifies the output with notification means, so that it is able to detect temperature of the eardrum accurately without getting an influence of radiant heats from other than those of the eardrum and/or vicinity of it.

The light receptor receives only the infrared rays radiated from the eardrum and/or vicinity of it and passes through a probe. The signal processor calculates a temperature from the output of the light receptor, and the notification means notifies the temperature resulted by the calculation. The infrared rays condensed by an optical condenser enter into an infrared-ray-receiving element in the light receptor. Since the infrared-ray-receiving element is arranged in a manner to receive only the infrared rays radiated directly from the eardrum and/or vicinity of it upon meeting the infrared rays condensed by the optical condenser, it is able to concentratively detect only the radiant rays from the eardrum and/or vicinity of it and passes through the probe, thereby resulting in an accurate temperature detection.

The radiation thermometer is also constructed in manner that the infrared-ray-receiving element is positioned away in the rearward from a focal point of the optical condenser. This enables the infrared-ray-receiving element to concentratively receive only the infrared rays radiated from the eardrum and/or vicinity of it and passes through the probe, and to limit the light-receiving region by directing the infrared rays radiated from an inner surface of the probe toward the outside of the infrared-ray-receiving element.

Also, the light receptor stored in the main body receives only the infrared rays radiated from the eardrum and/or vicinity of it and passes through the probe. Since the probe with a hollow interior does not contain a waveguide, and is detachably connected to the main body, the thermometer does not deteriorate accuracy in measured temperature due to temperature change of the waveguide. The thermometer does not pose a sanitary problem because the probe is replaceable, and it is easy to store since there is no protruding part when the probe is removed.

Further, the probe is provided with an opening at the tip so as to improve accuracy in measured temperature, since there is not any factor of the temperature deviations due to dispersion of the infrared transmittancy as in the case of using a cover overlaying the probe tip.

Moreover, since the probe is stored in a storage space when not in use, the main body can be in a shape that is easy to store, and there is less likeliness of losing the removed probe.

The thermometer is provided with a visually distinguishable plurality of probes, so that the user, to whom each probe is specifically assigned, can be identified, and replacing the probe can prevent a problem of contagion via the ear.

Furthermore, the thermometer has notification means comprising a vocal announcing device for notifying a temperature calculated based on an output from the light receptor that receives only the infrared rays radiated directly from the eardrum and/or vicinity of it. The thermometer can measure accurate body temperature irrespective of the length of time while it is inserted in the ear. And, measurement of temperature can be made even in a dark place or by a blind person, so as to improve convenience of use.

The thermometer is provided with a light-proof body for shielding the infrared rays entering into the infrared-ray-receiving element from an outside of the optical condenser, as well as a reflection suppressing means at the infrared-ray-receiving element side of the light-proof body. This structure prevents the infrared rays traveling toward an area other than the infrared-ray-receiving element from entering into the infrared-ray-receiving element due to reflection. The structure thus restricts a light-receiving region, and concentrates the infrared rays emitted from any part other than the eardrum and/or vicinity of it to the outside of the infrared-ray-receiving element, thereby attaining an accurate measurement of the body temperature without being influenced by temperature change of the probe.

The light-proof body is made of synthetic resin material having a high value of emissivity in the neighborhood of 0.9, so as to suppress reflection of the infrared rays. Condensation is not likely to occur on a surface of the light-proof body, since synthetic resin has low thermal conductivity and small thermal capacity. Accordingly, the thermometer can measure accurate body temperature without causing reflection and scattering of the infrared rays due to condensation.

The thermometer does not require a waveguide for shielding the infrared rays from the probe, and the optical system including the optical condenser need not have high thermal conductivity. Because the optical condenser is composed of a material having low thermal conductivity and small thermal capacity, condensation is not likely to occur on a surface of the optical condenser, so that the thermometer is able to measure accurate body temperature.

A synthetic resin is used for the material of the optical condenser. Since synthetic resin is generally known to have low thermal conductivity and small thermal capacity, it can reduce condensation on the surface of the optical condenser.

Also, the infrared rays condensed by the optical condenser enter into the infrared-ray-receiving element. The infrared-ray-receiving element is positioned in a region that is farther from the optical condenser than an intersection between a light path and the optical axis, but nearer to the optical condenser than an image point of a hypothetical end point formed via the optical condenser, where the light path is a path that extends from the hypothetical end point to the image point of the hypothetical end point formed via the optical condenser by passing through a rim of the optical condenser on the same side as the hypothetical end point. With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

The infrared rays condensed by the optical condenser enter into the infrared-ray-receiving element. Further, the infrared-ray-receiving element is positioned within a triangle configured in a meridional plane by an intersection between a light path and the optical axis, and two image points of a hypothetical end points formed via the optical condenser, wherein the light path is a path that extends from the hypothetical end point to the image point of the hypothetical end point formed via the optical condenser by passing through a rim of the optical condenser on the same side as the hypothetical end point. By adopting this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Also, the infrared rays condensed by the optical condenser enter into the infrared-ray-receiving element. Furthermore, the infrared-ray-receiving element is positioned farther away from the optical condenser than a focal point of the optical condenser by a distance of L3, which is derived from the formula 13, herein:

f is a focal distance of the optical condenser;

rs is a radius of the infrared-ray-receiving element;

rα is a distance between the hypothetical end point and the optical axis;

Lα is a distance between the hypothetical end point and the optical condenser; and r3 is a radius of the optical condenser.

With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Also, the infrared rays condensed by the optical condenser enter into the infrared-ray-receiving element. Moreover, the infrared-ray-receiving element is positioned in a region farther away from the optical condenser than an image point of a hypothetical end point formed via the optical condenser, where the hypothetical end point is a point at which a straight line drawn from the rim of the optical condenser toward the probe in a manner to be tangent to an inner surface of the probe on the same side as the rim of the optical condenser with respect to the optical axis crosses a plane of the probe tip. With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Also, the infrared rays condensed by the optical condenser enter into the infrared-ray-receiving element. And, the infrared-ray-receiving element is positioned in a region lying between two light paths that extend from a hypothetical end points to image points of the hypothetical end points formed via the optical condenser by passing through rims of the optical condenser on the opposite side of the hypothetical end point with respect to the optical axis, where the hypothetical end point is a point at which a straight line drawn from the rim of the optical condenser toward the probe in a manner to be tangent to an inner surface of the probe on the same side as the rim of the optical condenser with respect to the optical axis crosses a plane of the probe tip. By adopting this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

Also, the infrared rays condensed by the optical condenser enter into the infrared-ray-receiving element. And further, the infrared-ray-receiving element is positioned farther away from the optical condenser than a focal point of the optical condenser by a distance of L3, which is derived from the formula 22, wherein:

f is a focal distance of the optical condenser;

rs is a radius of the infrared-ray-receiving element;

rα is a distance between the hypothetical end point and the optical axis;

Lα is a distance between the hypothetical end point and the optical condenser; and r3 is a radius of the optical condenser.

With this structure, the infrared rays incident upon the optical condenser from the inner surface of the probe can be directed to the outside of the infrared-ray-receiving element, so as to limit the light-receiving region. As a result, the thermometer is able to concentratively detect only the infrared rays radiated from the eardrum and/or vicinity of it and passes through the probe.

The optical condenser comprises a refractive lens, so that the infrared rays condensed by the refractive lens enter upon the infrared-ray-receiving element.

Also, the optical condenser comprises a condensing mirror, so that the infrared rays condensed by the condensing mirror enter upon the infrared-ray-receiving element.

The condensing mirror deflects a first optical axis incident upon the condensing mirror into a second optical axis exiting from the condensing mirror and entering into the infrared-ray-receiving element. Therefore, if the probe and the main body are formed to have a bent angle in consideration of handiness of the radiation thermometer, as it is used by inserting into the ear canal, the optical system can be bent also in the same angle. As a result, the thermometer becomes convenient to use, and it can provide an accurate measurement of the body temperature since a direction of insertion becomes consistent because it is easy to insert into the ear canal.

A chopper driven by a D.C. motor stops at each of a light-admitting position and a light-blocking position in a path of the infrared rays from the subject being measured to the infrared-ray-receiving element by striking against the stopper provided at the stopping position. A light-admitting time and a light-blocking time are steadily controlled by way of driving the chopper, since the motor controller switches between the light-admitting position and the light-blocking position by alternately reversing the rotational direction of the D.C. motor, and the signal processor converts into a temperature of the subject being measured based on an output of the infrared-ray-receiving element. Also, the chopper can switch steadily between the light-admitting position and the light-blocking position even if it is substantially reduced in size, since it does not stagger at its stopping position, thereby attaining highly accurate measurement of the body temperature with a small size.

Further, the intervals for interrupting the path of the infrared rays is longer than a responding time constant of the infrared-ray-receiving element, so that the infrared-ray-receiving element produces a high output □ and improves an S/N ratio resulting in improved measuring accuracy of the body temperature.

The D.C. motor is controlled based on a predetermined power supply pattern, so as to switch the infrared rays between admission and blockage with the chopper.

Also, by alternately providing a positive power supply pattern and a negative power supply pattern, the D.C. motor is able to reverse the rotational direction alternately.

An initial supply of the power moves the chopper to a position of the stopper, and subsequent supply of reduced power keeps the chopper in that position, thereby reducing the power consumption.

Also, by adopting an intermittent supply of the power during a reduced power supply period, the power consumption can be reduced, and the circuit structure can be simplified.

By ceasing supply of the power during the reduced power supply period, the power consumption can be farther reduced.

Furthermore, a power is supplied at a very end of the reduced power supply period after a period of the ceased power, so as to reverse the D.C. motor after restriking the chopper against the stopper. This reduces the power consumption with a simple circuit structure, and precisely maintains the light-admitting time and the light-blocking time of the infrared rays to the infrared-ray-receiving element, thereby enabling an accurate measurement of the body temperature.

An initial power supply unit supplies the D.C. motor with initial power during an initial power supply period, which is longer than the sum of the time required for the chopper to reach the stopper and the time required to make a complete stop after bouncing back from the stopper, and a reduced power supply unit supplies the reduced power thereafter. Thus, the chopper stops reliably at the stopper position, and stably switches between the light-admitting position and the light-blocking position, thereby improving the measuring accuracy of body temperature while also reducing the power consumption.

With the stopper composed of a shock absorbing material, the thermometer stabilizes the chopping by alleviating the chopper from cutting into it or bouncing back, thereby improving measuring accuracy of the body temperature as well as reducing sound caused by the chopper striking the stopper.

Also, with the stopper composed of a soft rubber material, the thermometer stabilizes the chopping by alleviating the chopper from cutting into it or bouncing back, thereby improving measuring accuracy of the body temperature as well as reducing sound caused by the chopper striking the stopper.

With view restricting means for limiting a field of view for the infrared-ray-receiving element, the chopper can be reduced in size. Since the chopper is constructed in a size greater than the field of view for the infrared-ray-receiving element in the chopping position, a difference in the output of the infrared-ray-receiving element between the light-admitting mode and the light-blocking mode becomes large, so as to improve an accuracy in measuring the body temperature.

The view restricting means is composed of a material having low reflectivity on at least one surface facing toward the infrared-ray-receiving element in order to suppress reflection of the infrared rays from the view restricting means. This eliminates the infrared rays reflected by the view restricting means to enter into the infrared-ray-receiving element, and positively restricts the field of view for the infrared-ray-receiving element, so as to enable highly accurate measurement of the body temperature with a reduced size.

A moving angle of the chopper from a rest position in the light-blocking mode to a next position where the light begins to be admitted is equal to a moving angle of the chopper from a rest position in the light-admitting mode to another position where the light begins to be blocked. The motor controller outputs signals at regular intervals for alternately reversing the rotational direction of the D.C. motor. Accordingly, the light-admitting time and the light-blocking time for the infrared rays due to a motion of the chopper become equal, thereby obtaining a high output from the infrared-ray-receiving element, and highly accurate measurement of the body temperature.

A Fourier transform device calculates a signal component in a frequency equal to the frequency, with which the rotational direction of the D.C. motor is reversed alternately, by way of the discrete Fourier transform. Accordingly, a noise content other than the signal can be removed, and an accurate measurement of the body temperature can be taken, since harmonic noise component of high degrees, which is not completely suppressible by the discrete Fourier transform processing, is scarcely generated because the light-admitting time and the light-blocking time are equal.

A position aligning driver aligns a position of the chopper by driving the D.C. motor and striking the chopper against the stopper. And, a temperature detecting driver switches between the light-admitting mode and the light-blocking mode for the path of the infrared rays through the infrared-ray-receiving element by striking and stopping the chopper against the stopper by reversing the rotational direction of the D.C. motor alternately. A switching device switches the position aligning driver and the temperature detecting driver. Accordingly, the chopper is always maintained in the same position prior to a start of the measurements with the foregoing positional alignment. This can stabilize the light-admitting time and the light-blocking time with a motion of the chopper during measurement of the body temperature, thereby attaining an accurate measurement.

A clock counts a lapse of time in which it does not receive a temperature detection starting signal from a signaling device, and the switching device operates the temperature detecting driver to measure the body temperature if it receives the temperature detection starting signal before the clock completes counting of a predetermined time. The switching device operates the position aligning driver first to align a position of the chopper, and switches to the temperature detecting driver to measure the body temperature, if it receives the temperature detection starting signal after the clock has completed counting of the predetermined time. In the case of taking measurements of the body temperature repeatedly in a short period of time in which positional shift of the chopper from the last stopping position during the measurement is considered unlikely, the measurement can be repeated consecutively without executing the positional alignment of the chopper, so as to accomplish highly accurate measurements within a short period of time. Also, even if the chopper had shifted its position while the thermometer had been put aside without being used for a long period of time, accurate measurements can still be accomplished at all the time, since measurements of the body temperature is made only after executing a positional alignment of the chopper when resuming the measurement.

The switching device executes a positional alignment of the chopper by operating the position aligning driver when the power supply is turned on to the motor controller. It then measures the body temperature by operating the temperature detecting driver when it receives the temperature detection starting signal from the signaling device. Hence, the thermometer can accomplish highly accurate measurements efficiently within a short period of time, when taking measurements repeatedly in short intervals.

The clock counts a lapse of time in which it does not receive a temperature detection starting signal from the signaling device, and the power supply controller turns off the power supply to the motor controller when the clock completes counting of the predetermined time. This necessitates the power supply to the motor controller to be turned on again, if taking a measurement thereafter. Accordingly, the measurements of the body temperature can be made continuously without executing a positional alignment of the chopper, if repeated measurements are made in short intervals until the clock completes counting of the predetermined time, so that highly accurate measurements are accomplished in a short period of time. Also, the power supply to the motor controller is turned off when the clock completes counting of the predetermined time. The power supply to the motor controller needs to be turned on, when taking a measurement of body temperature again. Therefore, even if the chopper had shifted its position while the thermometer had been put aside without being used for a long period of time, turning on the power supply can cause the switching device to operate the position aligning driver for executing a positional alignment of the chopper. Since the measurements of body temperature is made with a subsequent temperature detection starting signal, accurate measurements can still be accomplished at all the time,. The structure also reduces the power consumption and improves convenience of use, since the power supply to the motor controller turns off automatically after a lapse of the predetermined time even when the power supply is unintentionally left on.

REFERENCE NUMERALS

1 Probe
2 Waveguide
3 Infrared-ray-receiving element
4 Signal processor
5 Chopper
6 D.C. or A.C. motor
7 Crystal clock movement
8 Permanent magnet
9 Core
10 Coil
11 First input terminal
12 Second input terminal
13 Main body
14 Flange
15 Storage space
16 Cover
17 Light receptor 18 Notification means
19 Numerical display device
20 Vocal announcing device
21 Optical condenser (Refractive lens or Condensing miller)
22 Light-proof body
23 Joint
24 Stopper
24a Light-blocking side barrier of stopper
24b Light-admitting side barrier of stopper
25 View-restricting means
26 Pinhole for the infrared rays to pass through
27 Temperature sensor
28 Amplifier
29 A/D converter
30 Temperature calculator
31 Motor controller
32 Position aligning driver
33 Temperature detection driving device
34 Switching device
35 Positive power supply pattern
36 Negative power supply pattern
37 D.C. motor shaft
38 Field of view
39a Initial power supply period in positive power supply pattern
39b Initial power supply period in negative power supply pattern
40a Reduced power supply period in positive power supply pattern
40b Reduced power supply period in negative power supply pattern
41 Fourier transform calculator
42 Sine value memory
43 Cosine value memory
44 Fourier coefficient calculator
45 Amplitude calculator
46 Signaling device (Thermometric switch)
46a Temperature detection starting signal
47 Clock
48 Memory
49 Judging means
50 Power supply controller
51 Microcomputer
51a Output terminal of microcomputer
51b Input terminal of microcomputer
51c Input terminal of microcomputer
52 D.C. power source (Rechargeable battery or Dry battery)
53 PNP transistor
54 Resistor
55 Resistor
56 Resistor
57 Diode
58 Diode
59 Power supply switch
60 Resistor

What is claimed is:

1. A radiation thermometer comprising:
   a probe through which infrared rays travel;
   a light receptor for a) receiving through said probe infrared rays radiated from at lest one of a human eardrum and an area adjacent said human eardrum; and b) avoiding receipt of infrared rays radiated from said probe, said light receptor including i) an optical condenser for condensing at least the infrared rays that pass through said probe; and ii) an infrared-ray-receiving element positioned to receive the infrared rays radiated from at least one of the eardrum and said area adjacent said eardrum upon receiving the infrared rays condensed by said optical condenser;
   wherein said infrared-ray-receiving element is positioned in a region that is farther from said optical condenser than an intersection between a light path and an optical axis, but nearer to said optical condenser than an image point of a hypothetical end point formed by said optical condenser, when viewed in a cross sectional plane including the optical axis of said optical condenser, where:
      said light path is a path that extends from the hypothetical end point to the image point of the hypothetical end point formed by said optical condenser by passing through a rim of said optical condenser on the same side as the hypothetical end point with respect to the optical axis; and
      said hypothetical end point is a point at which a straight line drawn from the rim of said optical condenser toward said probe in a manner to be tangent to an inner wall of said probe on the same side as the rim of said optical condenser with respect to the optical axis crosses a plane at a tip of said probe.

2. The radiation thermometer according to claim 1, further comprising a main body for storing said light receptor, wherein said probe has a hollow interior and is detachably connected to said main body.

3. The radiation thermometer according to claim 2, wherein said main body includes a storage space for storing said probe.

4. The radiation thermometer according to claim 2, wherein said probe is replaceable with a further probe.

5. The radiation thermometer according to claim 1, additionally comprising a signal processor for calculating a temperature from an output of said light receptor; and
   a vocal announcing device for outputting said temperature using voice.

6. The radiation thermometer according to claim 1, wherein said light receptor is provided with a light-proof body for preventing infrared rays which have not gone through said optical condenser from entering into said infrared-ray-receiving element, said light-proof body including a reflection suppressor at a side facing toward said infrared-ray-receiving element.

7. The radiation thermometer according to claim 6, wherein said light-proof body is composed of a synthetic resin.

8. The radiation thermometer according to claim 1, wherein said optical condenser is composed of a material having low thermal conductivity and a small thermal capacity.

9. The radiation thermometer according to claim 1, wherein said optical condenser is composed of a synthetic resin.

10. The radiation thermometer according to claim 1, wherein said infrared-receiving element is positioned within a triangle configured by an intersection between the light path and the optical axis, and two image points of the hypothetical end points formed by said optical condenser, when viewed in a cross sectional plane including the optical axis of said optical condenser, where:
   said light path is a path that extends from the hypothetical end point to an image point of the hypothetical end point formed by said optical condenser by passing through a rim of said optical condenser on the same side as the hypothetical end point with respect to the optical axis; and
   said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe.

11. The radiation thermometer according to claim 10, wherein said infrared-receiving element is positioned farther from said optical condenser than a focal point of said optical condenser by a distance of L3 given by:

$$\frac{f \times f}{L\alpha - f} - \frac{f}{L\alpha - f} \times \frac{L\alpha \times (r\alpha \cdot f - rs(L\alpha - f))}{r3 \times (L\alpha - f) + r\alpha \cdot f} < L3 \leq \frac{f \times f}{L\alpha - f}$$

where:
f is a focal distance of said optical condenser;
rs is a radius of said infrared-receiving element;
rα is a distance between the hypothetical end point and the optical axis, where said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe;
Lα is a distance between said hypothetical end point and said optical condenser; and
r3 is a radius of said optical condenser.

12. The radiation thermometer according to claim 1, wherein said optical condenser comprises a refractive lens.

13. The radiation thermometer according to claim 1, wherein said optical condenser comprises a condensing mirror.

14. The radiation thermometer according to claim 13, wherein said condensing mirror refracts a first optical axis incident upon said condensing mirror into a second optical axis exiting from said condensing mirror and entering into said infrared-receiving element.

15. The radiation thermometer according to claim 13, wherein said infrared-ray-receiving element is positioned farther from said optical condenser than a focal point of said optical condenser by a distance of L3 given by:

$$\frac{f \times f}{L\alpha - f} - \frac{f}{L\alpha - f} \times \frac{L\alpha \times (r\alpha \cdot f - rs(L\alpha - f))}{r3 \times (L\alpha - f) + r\alpha \cdot f} < L3 \leq \frac{f \times f}{L\alpha - f}$$

where:
f is a focal distance of said optical condenser;
rs is a radius of said infrared-ray-receiving element;
rα is a distance between the hypothetical end point and the optical axis, where said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe;
Lα is a distance between said hypothetical end point and said optical condenser; and
r3 is a radius of said optical condenser.

16. The radiation thermometer according to claim 2, wherein said infrared-ray-receiving element is positioned in a region that is farther from said optical condenser than an image point of the hypothetical end point formed by said optical condenser, when viewed in a cross sectional plane including the optical axis of said optical condenser, where:
said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe.

17. The radiation thermometer according to claim 16, wherein said infrared-receiving element is positioned in a region lying between two light paths that extend from the hypothetical end points to image points of the hypothetical end points formed by said optical condenser by passing through rims of said optical condenser on the opposite side of the hypothetical end point with respect to the optical axis, when viewed in a cross sectional plane including the optical axis of said optical condenser, where:
said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe.

18. The radiation thermometer according to claim 17, wherein said infrared-receiving element is positioned farther from said optical condenser than a focal point of said optical condenser by a distance of L3 given by:

$$\frac{f \times f}{L\alpha - f} \leq L3 < \frac{f \times f}{L\alpha - f} + \frac{f}{L\alpha - f} \times \frac{L\alpha \times (r\alpha \cdot f - rs(L\alpha - f))}{r3 \times (L\alpha - f) - r\alpha \cdot f}$$

where:
f is a focal distance of said optical condenser;
rs is a radius of said infrared-receiving element;
rα is a distance between the hypothetical end point and the optical axis, where said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe;
Lα is a distance between the hypothetical end point and said optical condenser; and
r3 is a radius of said optical condenser.

19. The radiation thermometer according to claim 16, further comprising a main body for storing said light receptor, wherein said probe has a hollow interior and is detachably connected to said main body.

20. The radiation thermometer according to claim 19, wherein said main body includes a storage space for storing said probe.

21. The radiation thermometer according to claim 19, wherein said probe is replaceable with a further probe.

22. The radiation thermometer according to claim 16, additionally comprising a signal processor for calculating a temperature from an output of said light receptor; and
a vocal announcing device for outputting said temperature using voice.

23. The radiation thermometer according to claim 16, wherein said light receptor is provided with a light-proof body for preventing infrared rays which have not gone through said optical condenser from entering into said infrared-ray-receiving element, said light-proof body including a reflection suppressor at a side facing toward said infrared-ray-receiving element.

24. The radiation thermometer according to claim 23, wherein said light-proof body is composed of a synthetic resin.

25. The radiation thermometer according to claim 16, wherein said optical condenser is composed of a material having low thermal conductivity and a small thermal capacity.

26. The radiation thermometer according to claim 16, wherein said optical condenser is composed of a synthetic resin.

27. The radiation thermometer according to claim 16, wherein said optical condenser comprises a refractive lens.

28. The radiation thermometer according to claim 16, wherein said optical condenser comprises a condensing mirror.

29. The radiation thermometer according to claim 28, wherein said condensing mirror refracts a first optical axis incident upon said condensing mirror into a second optical axis exiting from said condensing mirror and entering into said infrared-ray-receiving element.

30. The radiation thermometer according to claim 16, wherein said infrared-ray-receiving element is positioned farther from said optical condenser than a focal point of said optical condenser by a distance of L3 given by:

$$\frac{f \times f}{L\alpha - f} \leq L3 < \frac{f \times f}{L\alpha - f} + \frac{f}{L\alpha - f} \times \frac{L\alpha \times (r\alpha \cdot f - rs(L\alpha - f))}{r3 \times (L\alpha - f) - r\alpha \cdot f}$$

where:
- f is a focal distance of said optical condenser;
- rs is a radius of said infrared-ray-receiving element;
- rα is a distance between the hypothetical end point and the optical axis, where said hypothetical end point is a point at which a straight line drawn from the rim of said optical condenser toward said probe in a manner to be tangent to an inner surface of said probe on the same side as the rim of said optical condenser with respect to the optical axis crosses a plane at a tip of said probe;
- Lα is a distance between the hypothetical end point and said optical condenser; and
- r3 is a radius of said optical condenser.

* * * * *

UNITED STATES PATENT AND TRADEMARK OFFICE
CERTIFICATE OF CORRECTION

| | | |
|---|---|---|
| PATENT NO. | : 6,371,925 B2 | Page 1 of 1 |
| APPLICATION NO. | : 09/269530 | |
| DATED | : April 16, 2002 | |
| INVENTOR(S) | : Imai et al. | |

It is certified that error appears in the above-identified patent and that said Letters Patent is hereby corrected as shown below:

Column 55, line 60, "lest" should read --least--.

Column 57, line 37, "13" should read --1- --.

Column 57, line 60, delete "The radiation thermometer according to claim 2," and insert --A radiation thermometer comprising:

a probe through which infrared rays travel;

a light receptor for a) receiving through said probe infrared rays radiated from at lest one of a human eardrum and an area adjacent said human eardrum; and b) avoiding receipt of infrared rays radiated from said probe, said light receptor including i) an optical condenser for condensing at least the infrared rays that pass through said probe; and ii) an infrared-ray-receiving element positioned to receive the infrared rays radiated from at least one of the eardrum and said area adjacent said eardrum upon receiving the infrared rays condensed by said optical condenser;--

Signed and Sealed this

Twenty-second Day of May, 2007

JON W. DUDAS
*Director of the United States Patent and Trademark Office*